Nov. 18, 1969  A. C. HARRIMAN ET AL  3,478,379
LASTING MACHINE

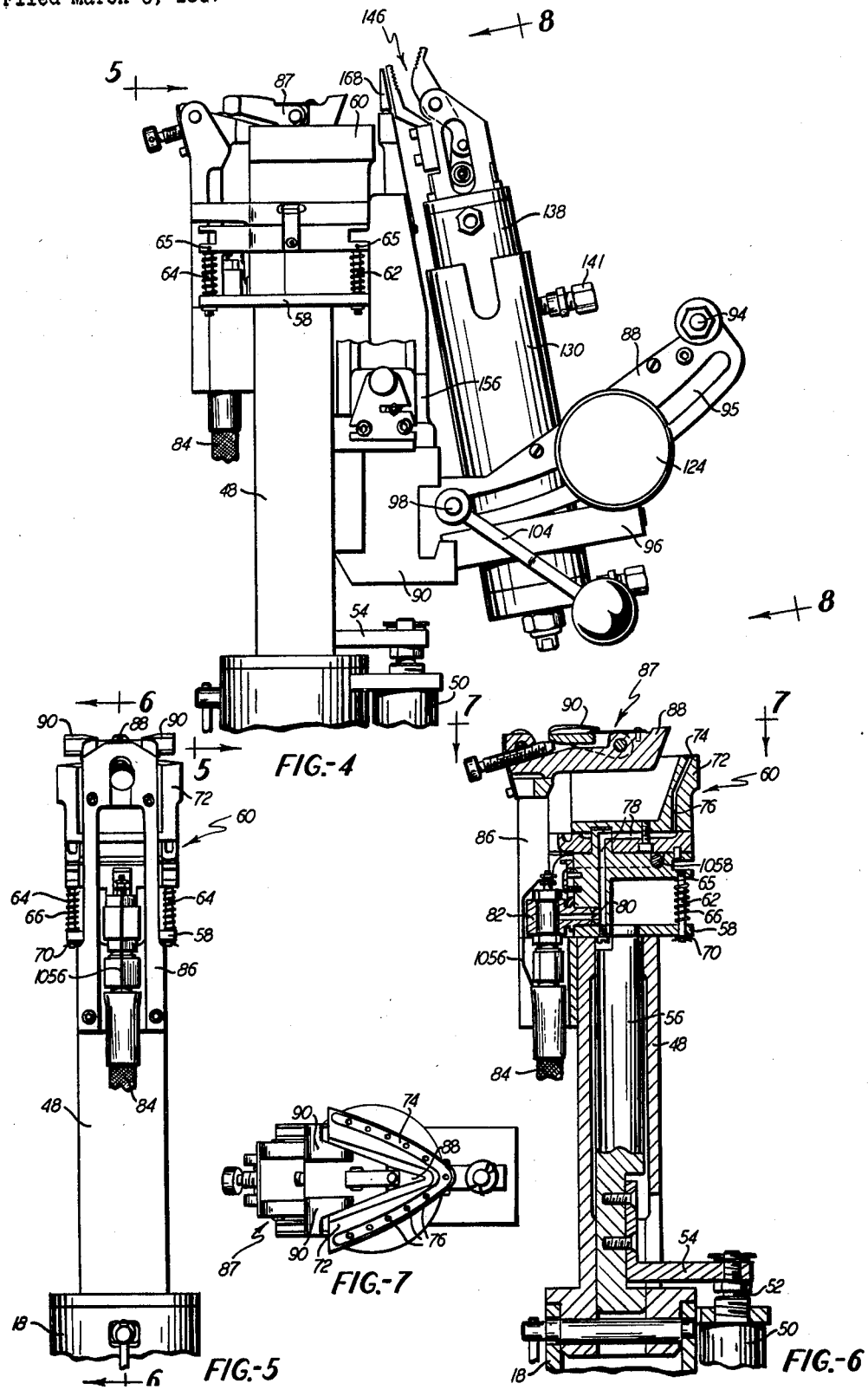

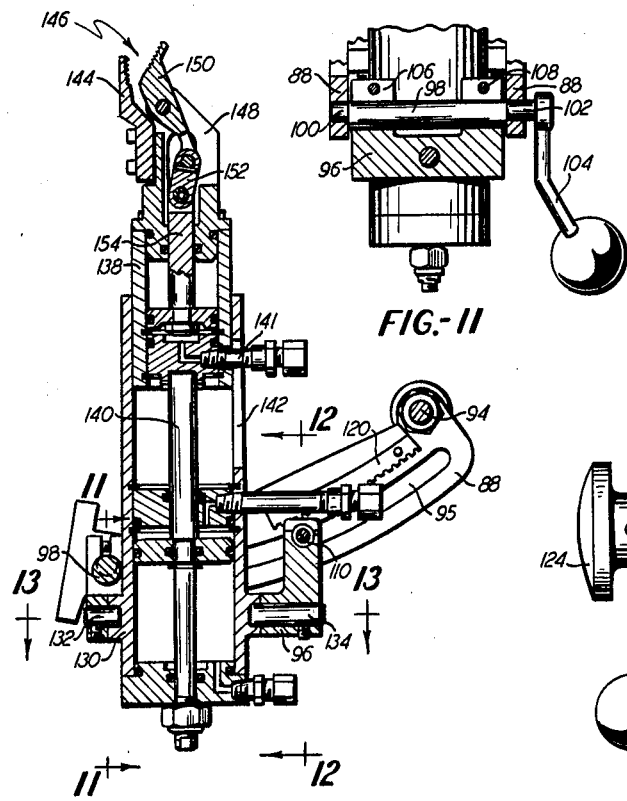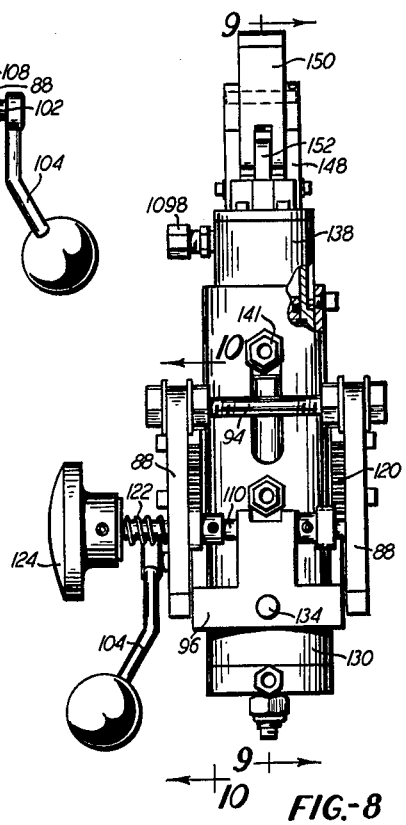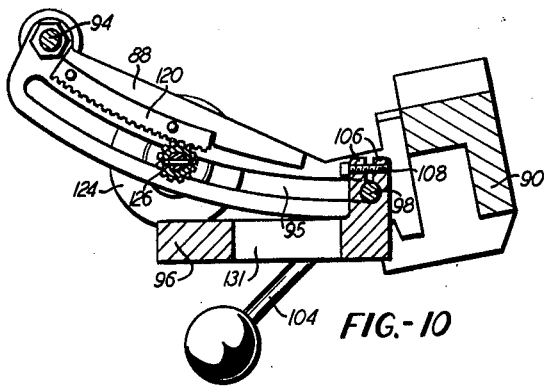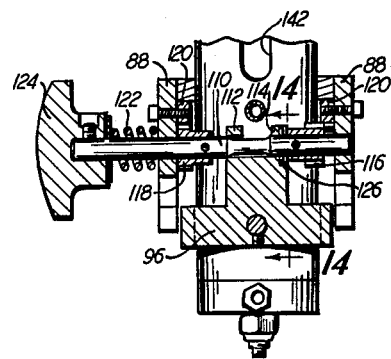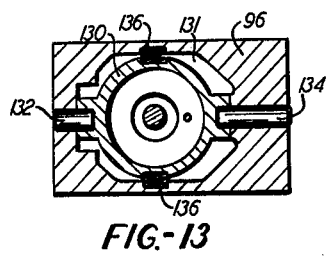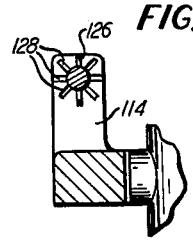

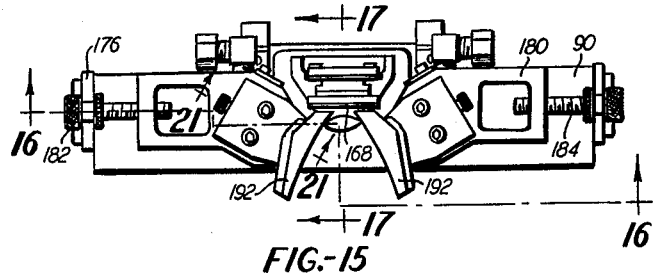
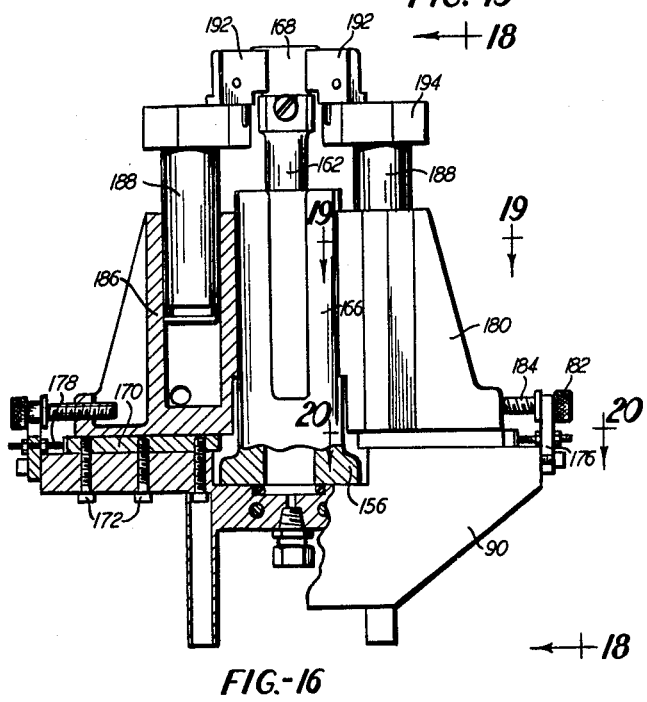
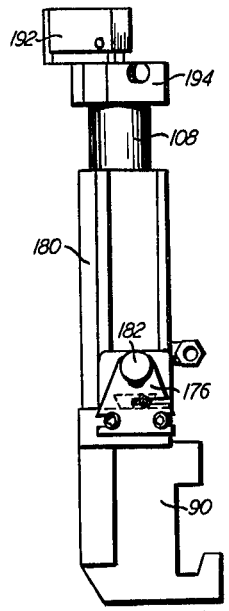
FIG.-15
FIG.-16
FIG.-18
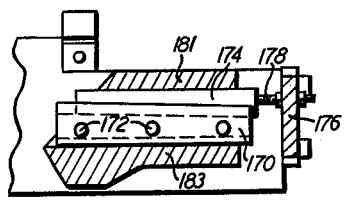
FIG.-20
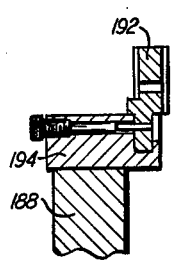
FIG.-21
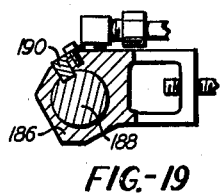
FIG.-19
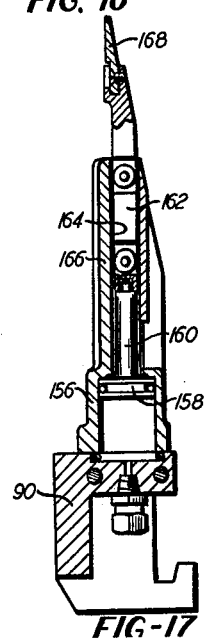
FIG.-17

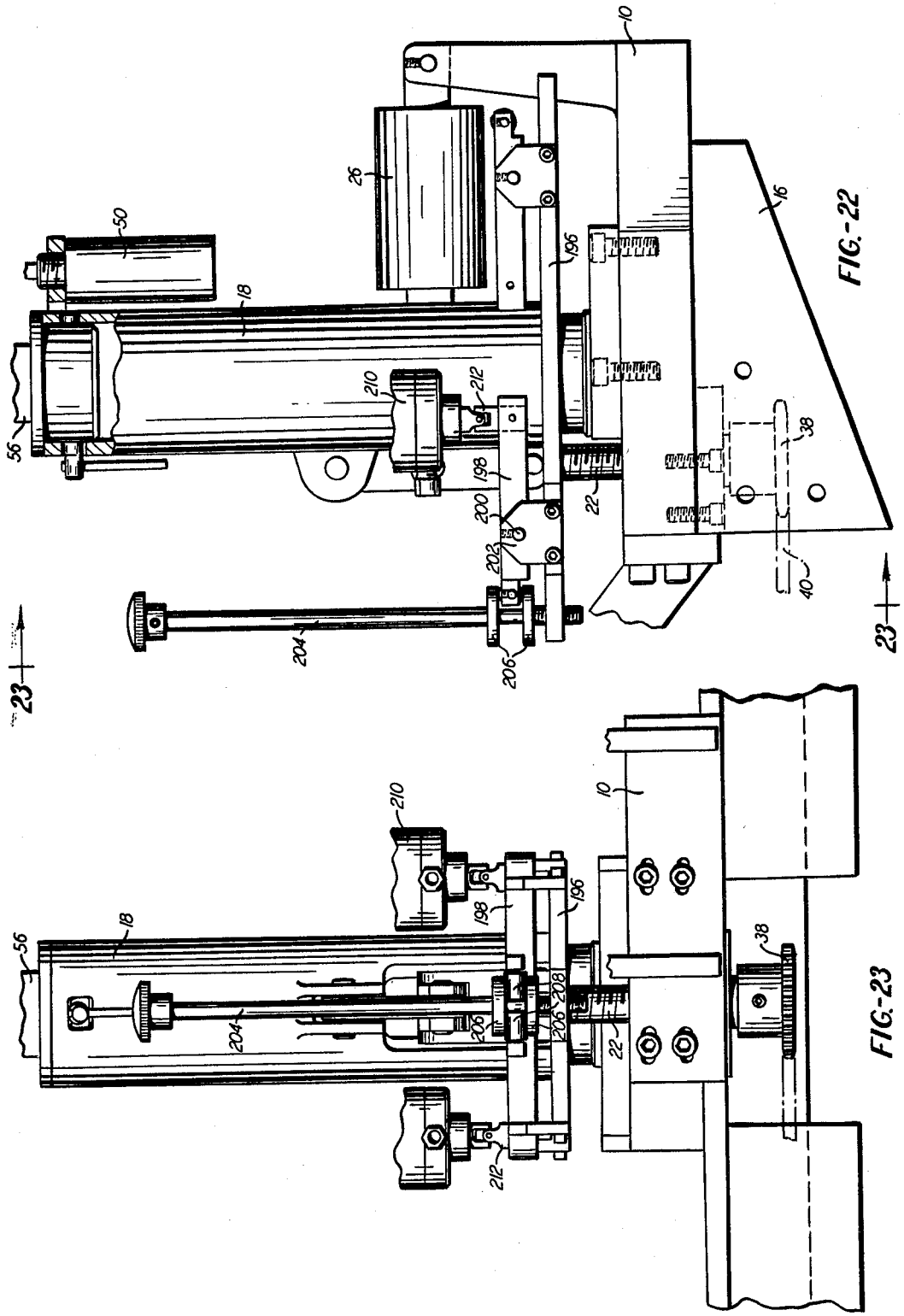

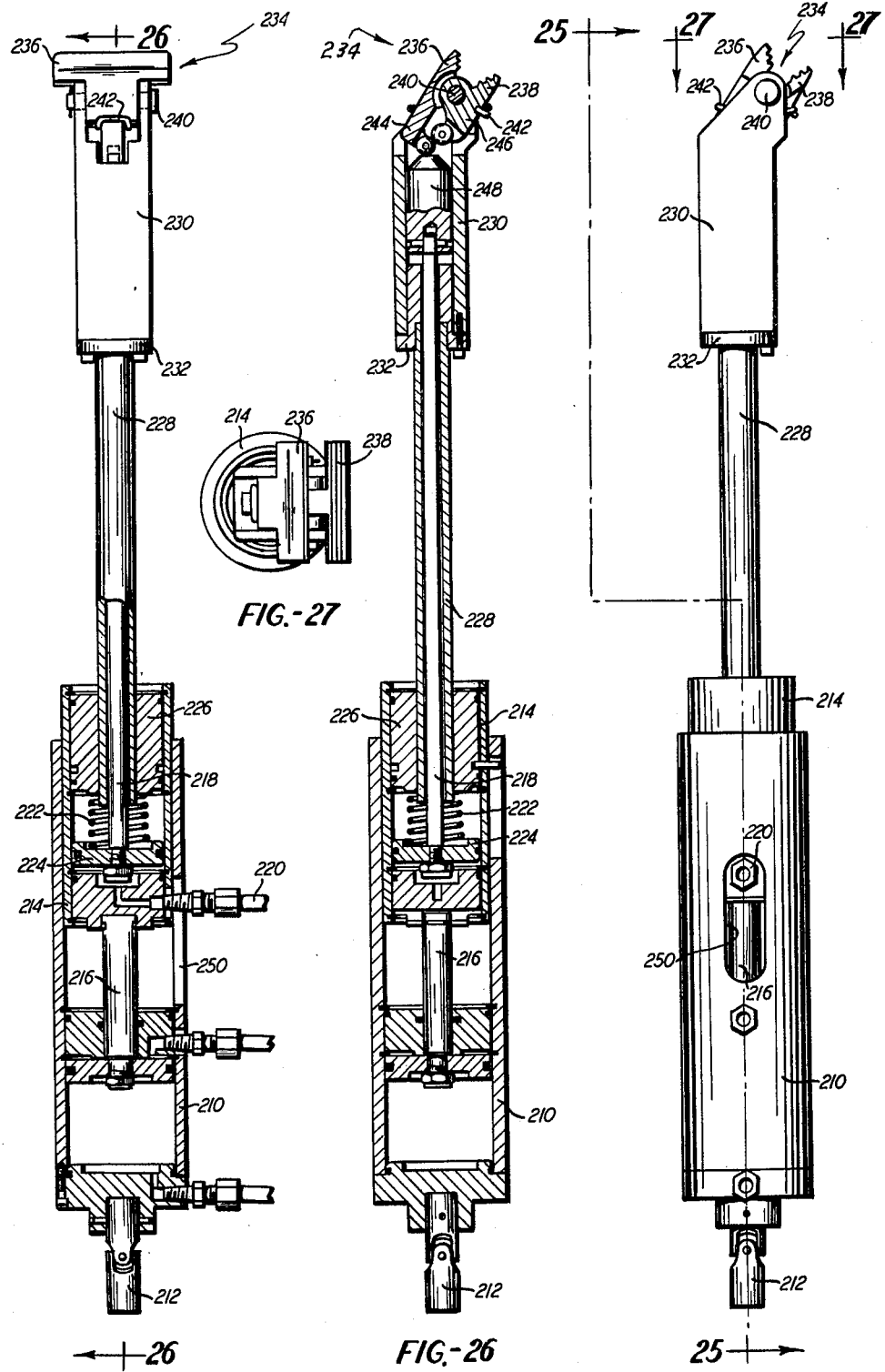

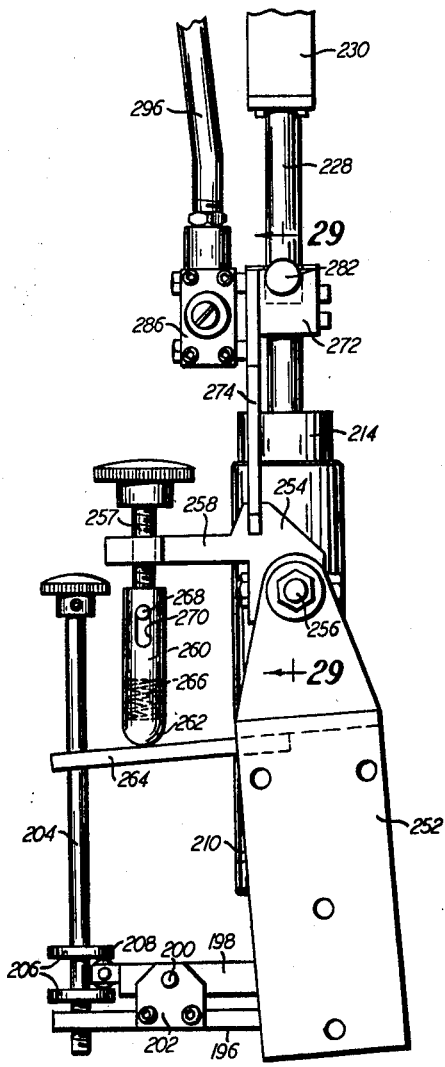
FIG.-28
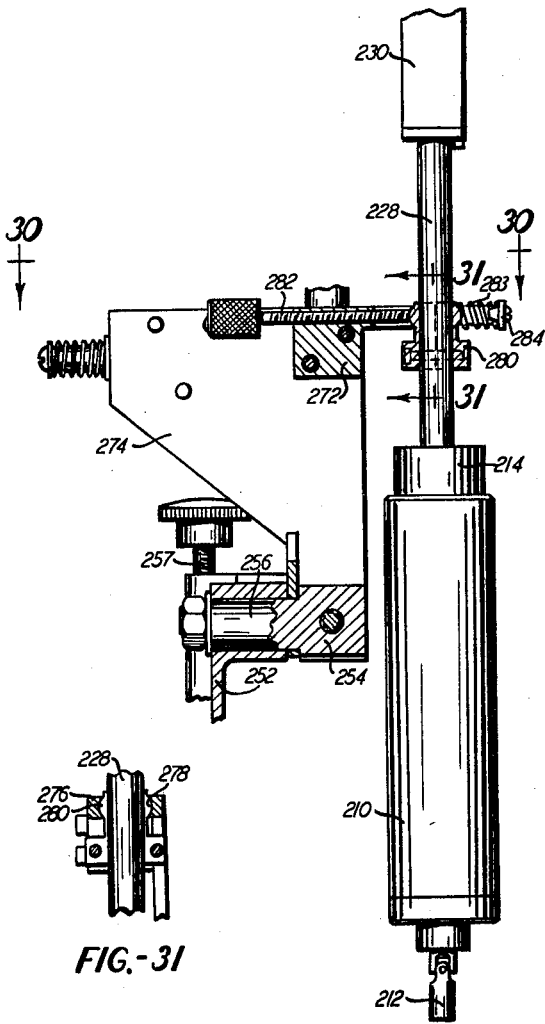
FIG.-31
FIG.-29
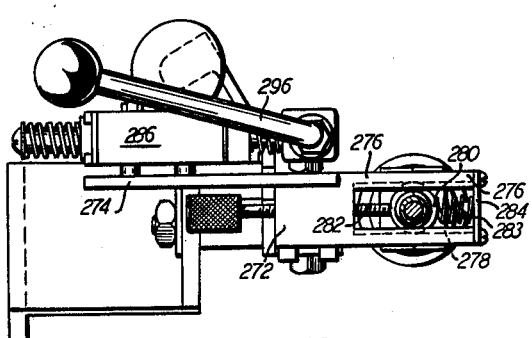
FIG.-30

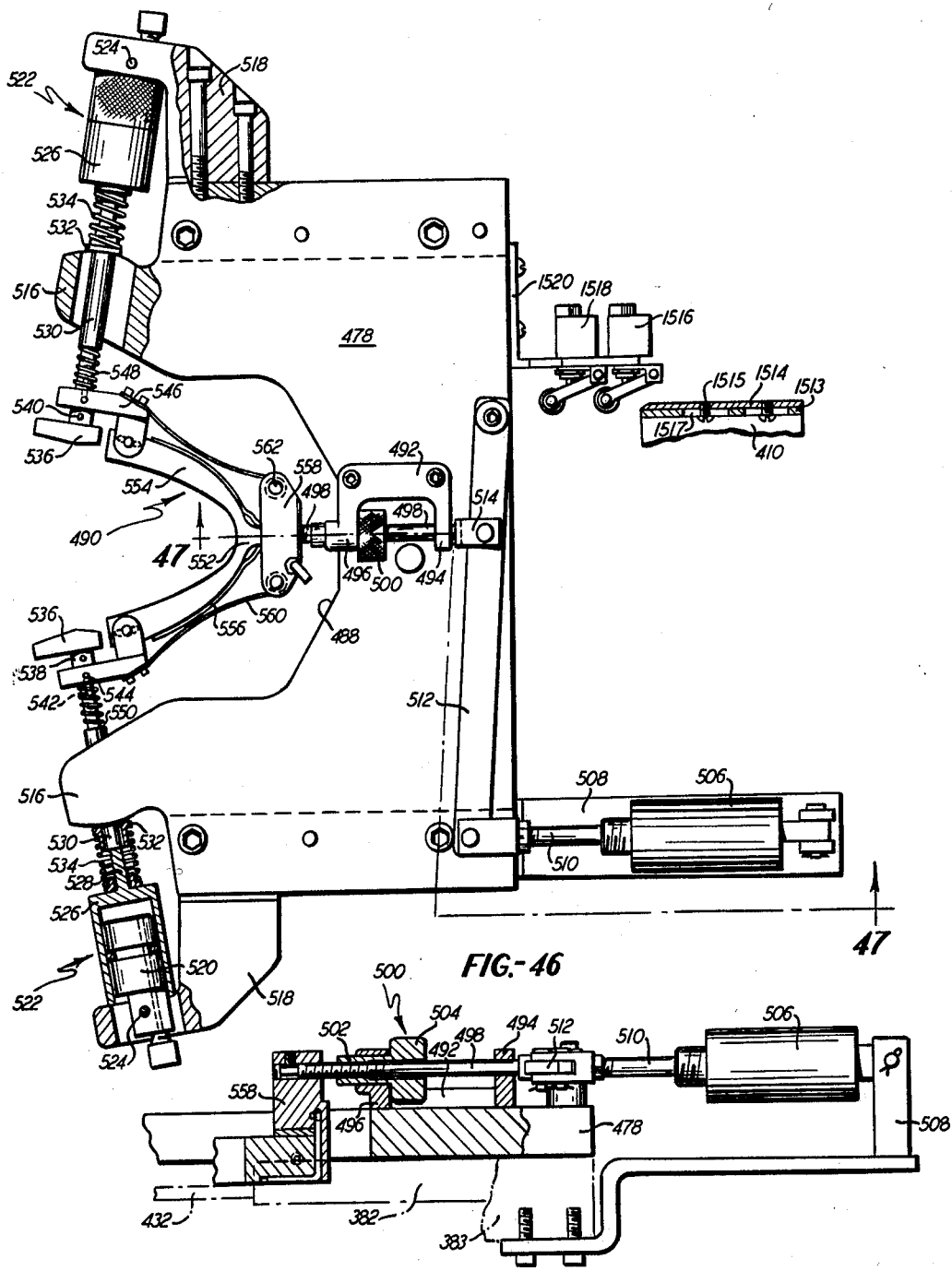

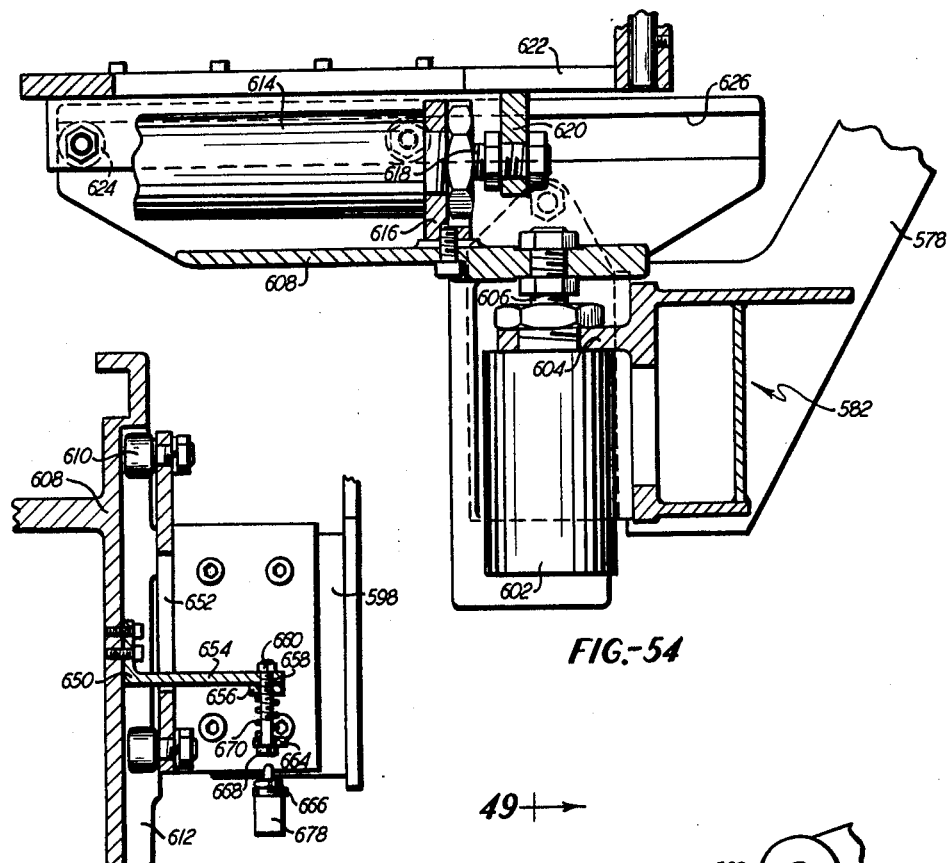
FIG.-54
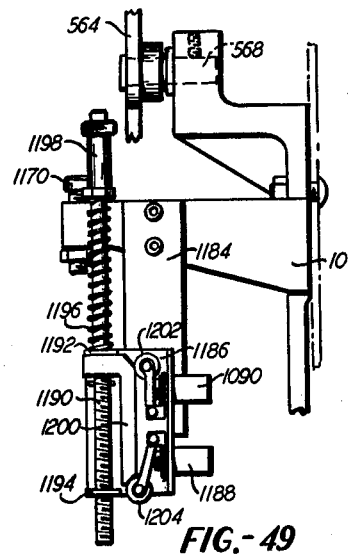
FIG.-53
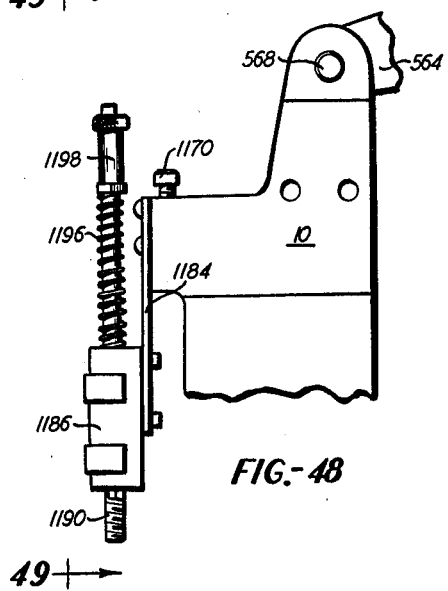
FIG.-48
FIG.-49

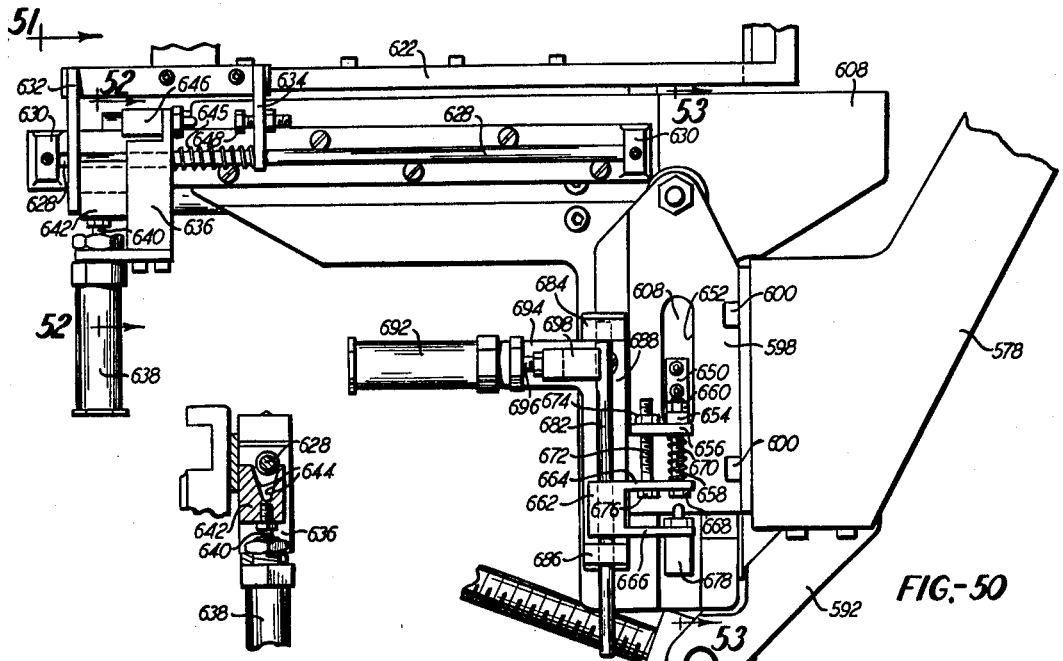

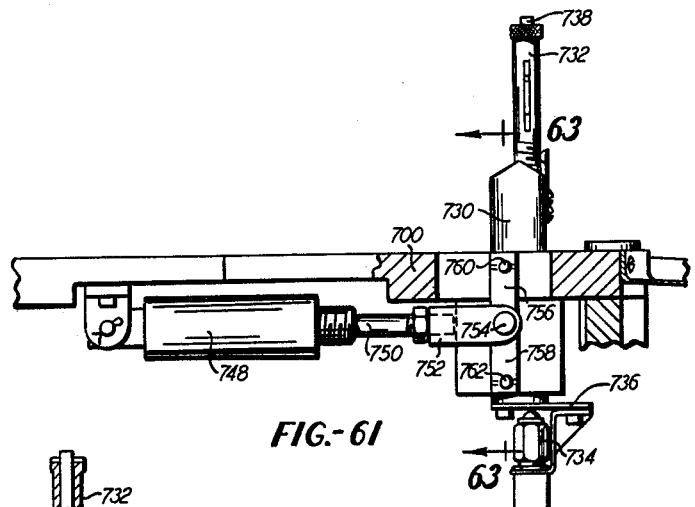
FIG.-61
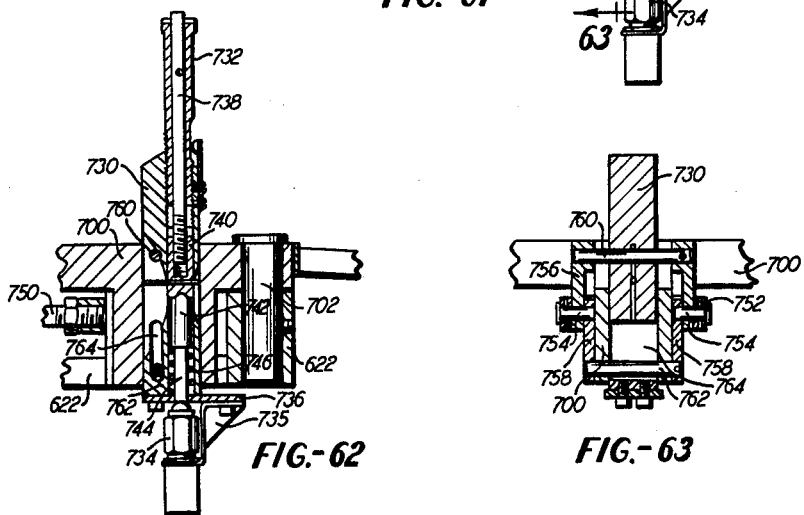
FIG.-62
FIG.-63
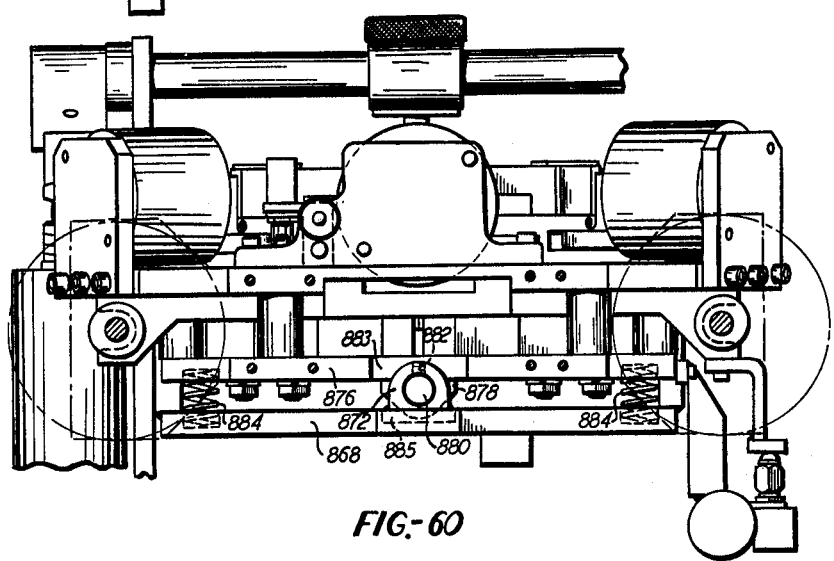
FIG.-60

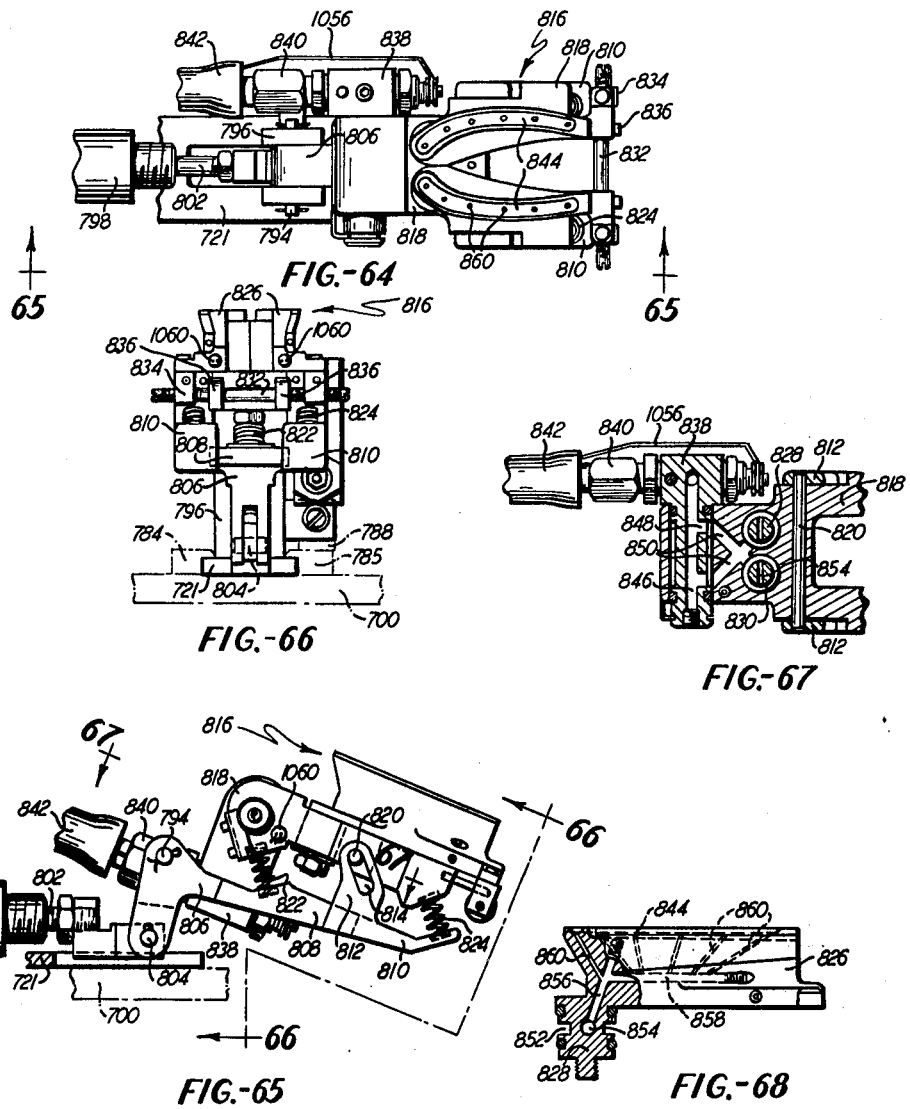

Filed March 8, 1967  31 Sheets-Sheet 23

Nov. 18, 1969  A. C. HARRIMAN ET AL  3,478,379
LASTING MACHINE

Filed March 8, 1967  31 Sheets-Sheet 25

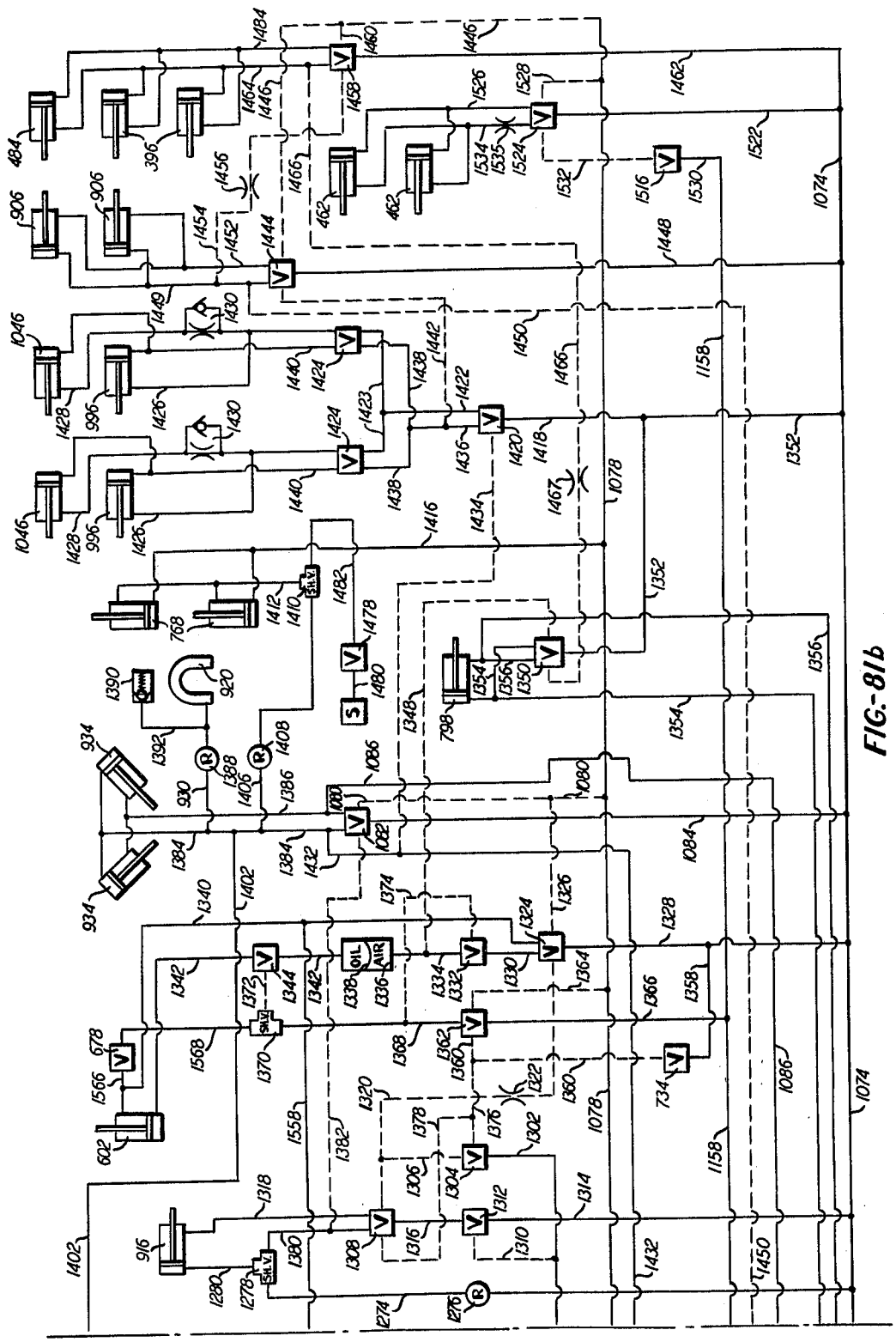

3,478,379
LASTING MACHINE

Allen C. Harriman, Brockton, and Karl F. Vornberger, Tewksbury, Mass., assignors to Jacob S. Kamborian, West Newton, Mass.
Filed Mar. 8, 1967, Ser. No. 621,514
Int. Cl. A43d 21/00
U.S. Cl. 12—10.1  54 Claims

ABSTRACT OF THE DISCLOSURE

There is disclosed herein a machine for wiping the toe and heel portions of a last-mounted shoe upper against the corresponding portions of a shoe insole located on the last bottom. The machine incorporates mechanism for applying cement to the toe and heel portions of the insole, mechanism for stretching the upper tightly about the last, mechanism for clamping the stretched upper against the last, and toe and heel wipers for wiping the toe and heel portions of the upper margin against the insole to cementitiously attach the wiped margin portions to the insole.

---

In one aspect, this invention deals with a machine for wiping selected portions of an upper margin, that is mounted on a last, against the corresponding portions of an insole located on the last bottom. An arrangement is provided for stretching the selected portion of the upper about the last prior to the wiping operation. The stretching operation is performed by a motor driven gripper, and an arrangement is provided to cause the gripper to be shifted along the last periphery to thereby relocate the gripped margin portion along the last.

The machine incorporates a front gripping means for gripping the toe end portion of the upper margin and a pair of side gripping means for gripping the forepart portions of the upper margin. The three gripping means are caused to move downwardly to stretch the upper about the last and the side gripping means can be moved along the last periphery to effect the relocation of the gripped forepart portions of the upper margin along the last periphery. A further aspect of the invention relates to a mounting of the front gripping means for movement in a plane transverse to the longitudinal dimension of the last so as to enable the front gripping means to shift in this transverse plane to accommodate itself to the relocation of the toe portion of the upper margin when the side gripping means are caused to relocate the gripped forepart portions of the upper margin.

The front and side gripping means are constituted by front and side pincers. The side pincers are so constructed as to be initially located in a heelward and outward direction and to move toewardly and inwardly during the downward stretching movements of the toe and side pincers. A further aspect of the invention is concerned with the construction of the side pincers that enables this toeward and inward movement to take place.

The machine incorporates wiping means mounted on a head. The head, in unison with the wiping means, is movable towards the last from a remote position to a working position and is also movable downwardly of the upper from the working position to a position suitable for wiping the upper margin against the insole. A further aspect of the invention relates to the mechanism for enabling these movements to take place.

The machine incorporates a heel section having heel wiping means for wiping the heel portion of the upper margin against the insole while the forepart portion of the shoe assembly, formed by the last, upper and insole, is supported in a particular location. A further aspect of the invention relates to an adjustable mounting of the heel section which enables the wiping means to be placed in parallel relation to the heel seat portion of the insole.

The heel section includes a wiper mount that incorporates the heel wiping means and a pad adapted to engage the heel portion of the shoe assembly. The wiper mount is initially located in a position that is remote from the heel portion of the shoe assembly when the shoe assembly has been supported in said particular location. A further aspect of the invention is concerned with a mechanism for moving the wiper mount from this remote position to a position suitable for wiping of the heel portion of the particular shoe assembly being worked on. The mechanism includes means for moving the wiper mount towards the heel of the shoe assembly until the pad engages the heel of the shoe assembly, stopping the pad movement in response to this engagement, then retracting the pad to provide clearance between the pad and the heel of the shoe assembly and then raising the wiper mount to a level suitable for wiping.

The machine incorporates wipers having divergent front side surfaces that are movable forwardly, in a wiping stroke, toward the shoe assembly and are also movable inwardly about a vertex to wipe the upper margin against the insole. During the wiping stroke, rear side surfaces of the wipers separate as a concomitant of the inward movement of the front side surfaces. A bedding tool is provided that is intended to be placed in the gap formed by the separation of the rear side surfaces. A further aspect of the invention relates to the construction and drive arrangement of the bedding tool. The bedding tool, which is initially located rearwardly of the rear side surfaces, is so constructed as to move forwardly under a yieldable force during the wiping stroke to bear against the separating rear side surfaces.

A knife is provided that is located between the wipers. A cutting edge of the knife is initially located rearwardly of the vertex and is projected forwardly of the vertex during the wiping stroke to cut into the upper material gathered by the wipers during the wiping stroke. Another aspect of the invention relates to the mechanism for driving the knife. An adjusting mechanism is provided to adjust the speed of the knife in relation to the component of forward movement of the wipers during the wiping stroke. In addition, the knife is caused to start its movement after the wipers have commenced their wiping stroke, and means are provided to adjust the time after the commencement of the wiping stroke that the knife starts its movement.

A further aspect of the invention relates to a mechanism for locating a work treating instrumentality in a desired position with respect to two successively introduced workpieces. A work engageable member is movable between a starting position and a terminal position towards a first workpiece that is supported on a support. The engagement of the work engageable member with the workpiece causes the work engageable member to stop its movement in a working position. Subsequently, after treatment of the workpiece, the work engageable member is retracted from the working position so that the first workpiece may be removed from the support and a second workpiece may be supported on the support. It is desirous, when moving the work engageable member into engagement with the second workpiece, that it does not start its movement from the starting position but from a position which will enable it to move through a shorter distance before engaging the second workpiece. A mechanism is therefore provided which retracts the work engageable member from the working position a prescribed distance to an intermediate position, the prescribed distance being less than the distance between the working position and the starting position.

Referring to the drawings:

FIGURE 4 is a side elevation of an arrangement for supporting the toe portion of the shoe assembly and for gripping and pulling over the toe end portion of the upper margin;

FIGURE 5 is a view taken on the line 5—5 of FIGURE 4;

FIGURE 6 is a view taken on the line 6—6 of FIGURE 5;

FIGURE 7 is a view taken on the line 7—7 of FIGURE 6;

FIGURE 8 is an elevation view of the mechanism for gripping and pulling over the toe end portion of the upper;

FIGURE 9 is a section taken on the line 9—9 of FIGURE 8;

FIGURE 10 is a view taken on the line 10—10 of FIGURE 8;

FIGURE 11 is a view taken on the line 11—11 of FIGURE 9;

FIGURE 12 is a view taken on the line 12—12 of FIGURE 9;

FIGURE 13 is a section taken on the line 13—13 of FIGURE 9;

FIGURE 14 is a view taken on the line 14—14 of FIGURE 12;

FIGURE 15 is a plan view of front and side retarders;

FIGURE 16 is a view taken on the line 16—16 of FIGURE 15;

FIGURE 17 is a section taken on the line 17—17 of FIGURE 15;

FIGURE 18 is a view taken on the line 18—18 of FIGURE 16;

FIGURE 19 is a view taken on the line 19—19 of FIGURE 16;

FIGURE 20 is a view taken on the line 20—20 of FIGURE 16;

FIGURE 21 is a section taken on the line 21—21 of FIGURE 15;

FIGURE 22 is a side elevation showing a mounting for an arrangement for gripping and pulling over the forepart portions of the upper;

FIGURE 23 is a view taken on the line 23—23 of FIGURE 22;

FIGURE 24 is an elevation of a portion of the arrangement for gripping and pulling over the forepart portions of the upper;

FIGURE 25 is a view taken on the line 25—25 of FIGURE 24;

FIGURE 26 is a view taken on the line 26—26 of FIGURE 25;

FIGURE 27 is a view taken on the line 27—27 of FIGURE 24;

FIGURE 28 is an elevation of another portion of the arrangement for gripping and pulling over the forepart portions of the upper;

FIGURE 29 is a view taken on the line 29—29 of FIGURE 28;

FIGURE 30 is a view taken on the line 30—30 of FIGURE 29;

FIGURE 31 is a view taken on the line 31—31 of FIGURE 29;

FIGURE 46 is a plan view of a shoe conforming arrangement;

FIGURE 47 is a view taken on the line 47—47 of FIGURE 46;

FIGURE 48 is a view of a valve actuating arrangement;

FIGURE 49 is a view taken on the line 49—49 of FIGURE 48;

FIGURE 50 is a side elevation of a heel head and a heel slide that form a part of the heel section of the machine;

FIGURE 51 is a view taken on the line 51—51 of FIGURE 50;

FIGURE 52 is a view taken on the line 52—52 of FIGURE 50;

FIGURE 53 is a view taken on the line 53—53 of FIGURE 50;

FIGURE 54 is a view taken on the line 54—54 of FIGURE 51;

FIGURE 60 is a front elevation of the back-up support plate, the back-up plate, the heel hold-down and the wiper mount;

FIGURE 61 is a side elevation of a height sensing mechanism in the heel section of the machine;

FIGURE 62 is a section of the height sensing mechanisms;

FIGURE 63 is a view taken on the line 63—63 of FIGURE 61;

FIGURE 64 is a plan view of the heel cement applicator;

FIGURE 65 is a view taken on the line 65—65 of FIGURE 64;

FIGURE 66 is a view taken on the line 66—66 of FIGURE 65;

FIGURE 67 is a view taken on the line 67—67 of FIGURE 65;

FIGURE 68 is a view, partially in section, of an applicator plate of the heel cement applicator;

Figure 81A:
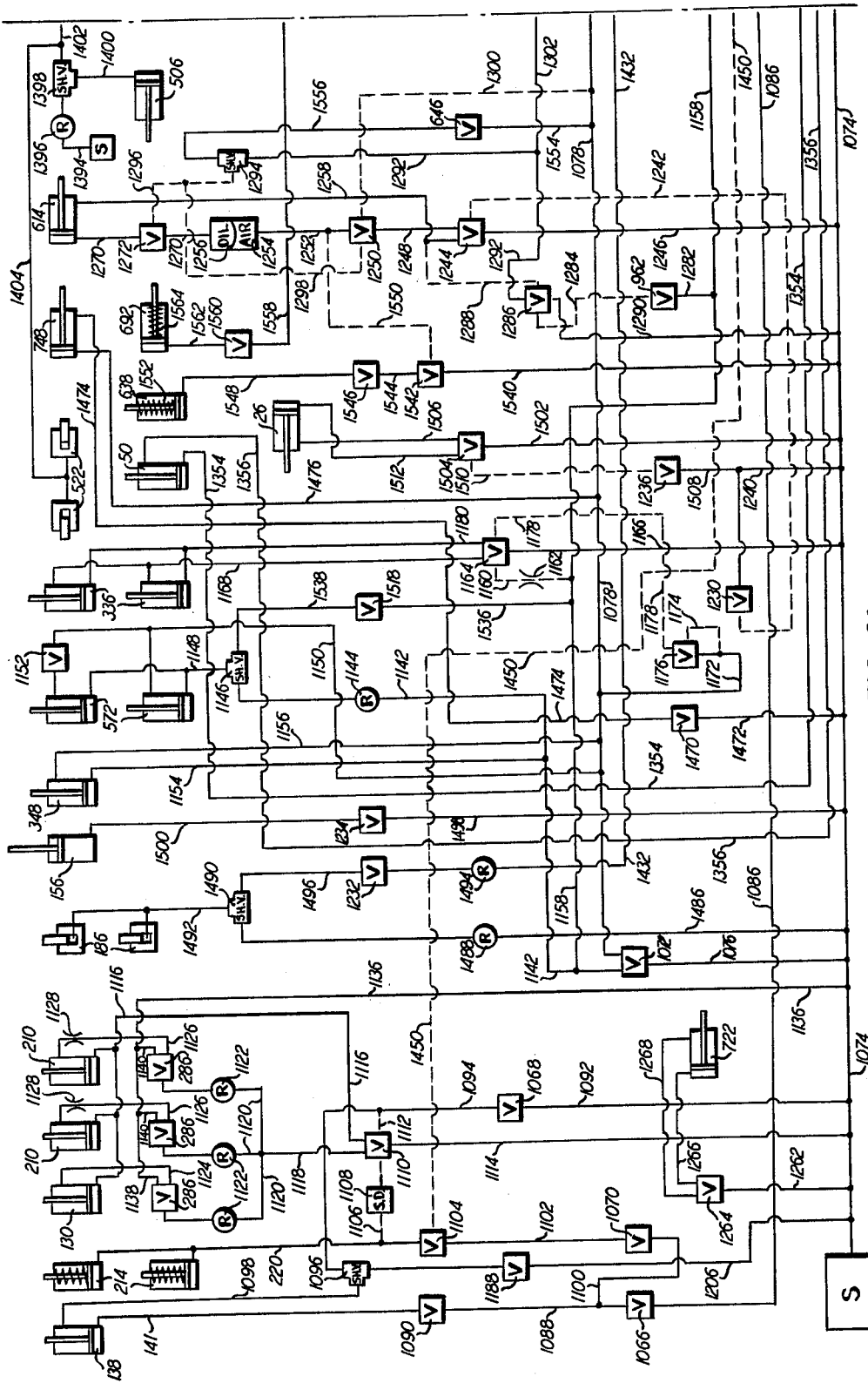
Figure 82:
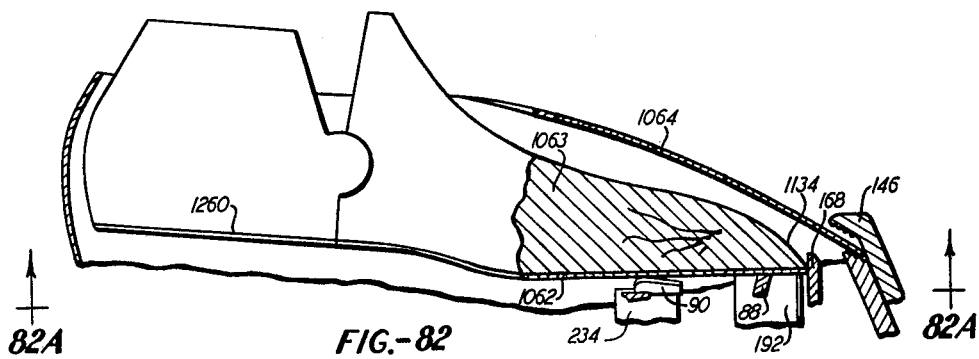
Figure 82A:
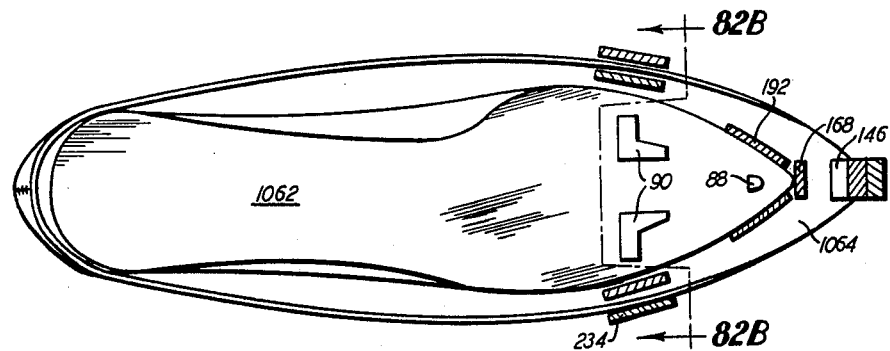
Figure 82B:
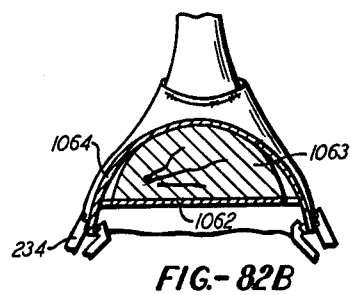
Figure 83:
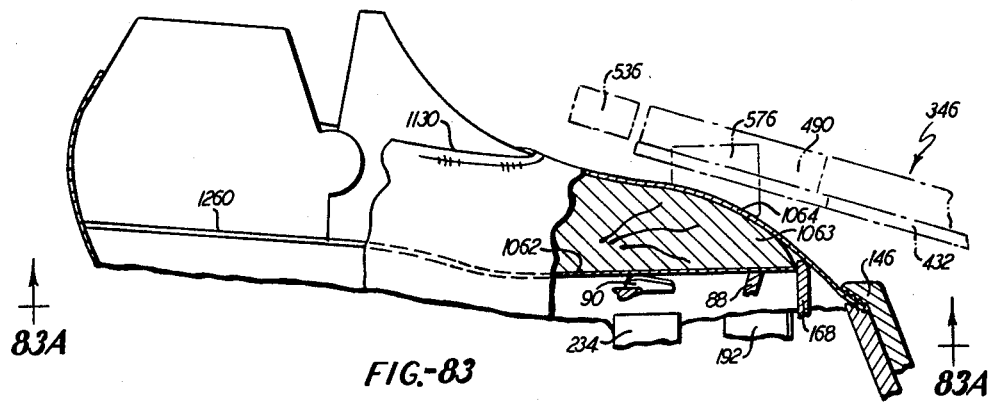
Figure 83A:
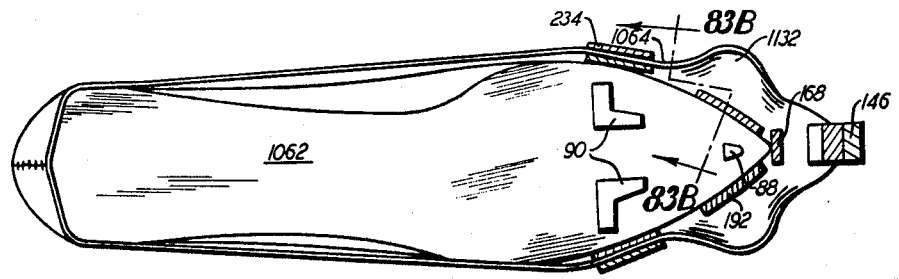
Figure 84:
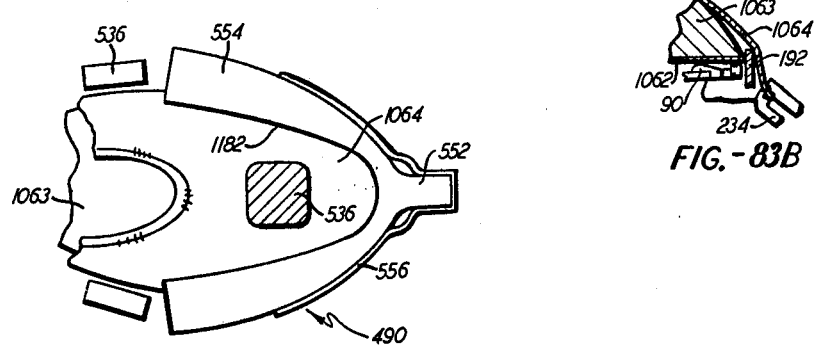
Figure 83B:
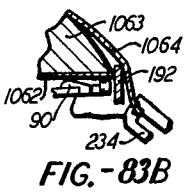
Figure 85A:
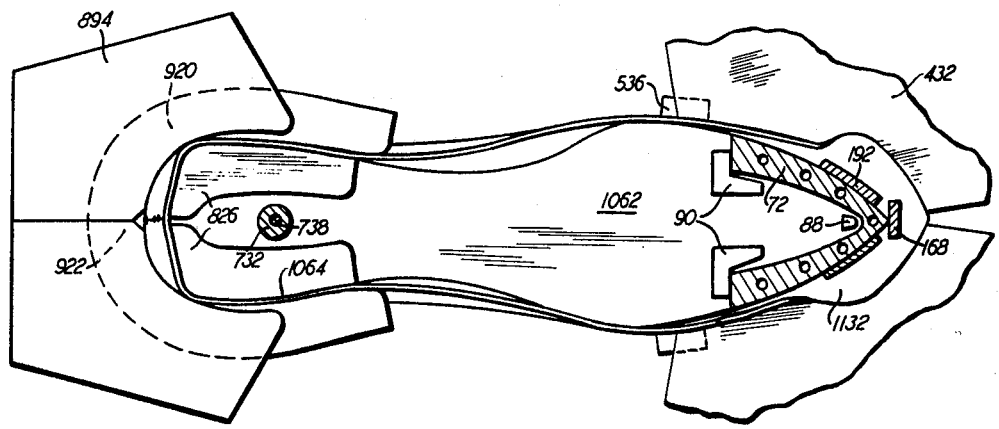
Figure 85:
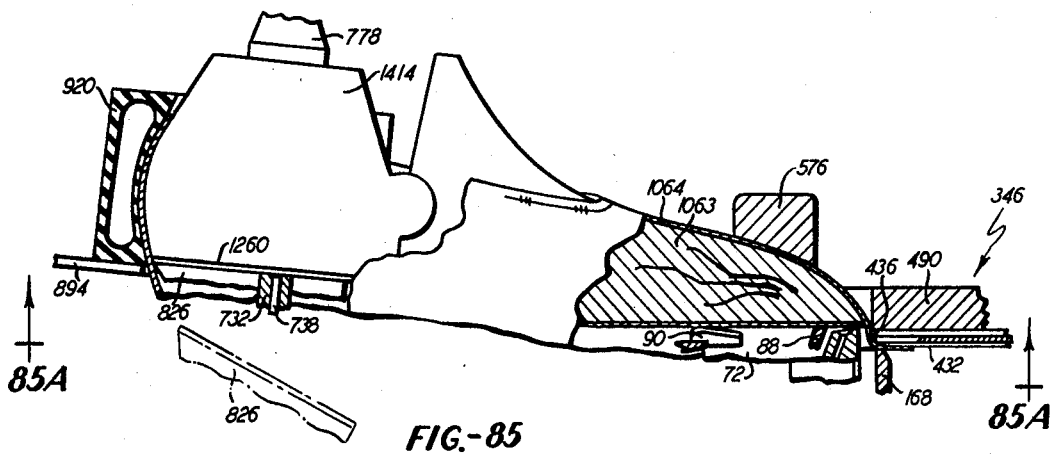
Figure 86:
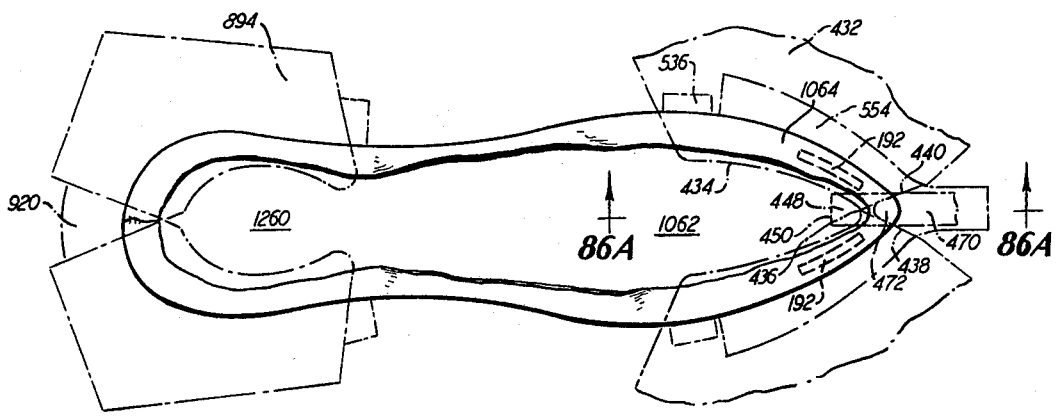
Figure 86A:
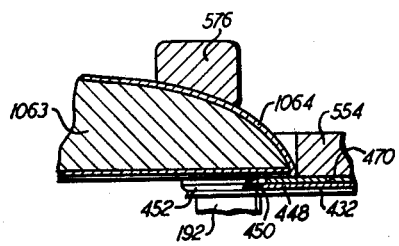

FIGURES 81a and 81b constitute a diagram of the machine control circuit;

FIGURE 82 is a representation of a shoe assembly in the machine at the beginning of a machine cycle;

FIGURE 82A is a view taken on the line 82A—82A of FIGURE 82;

FIGURE 82B is a view taken on the line 82B—82B of FIGURE 82A;

FIGURE 83 is a representation of the shoe assembly in the machine after the toe and forepart portions of the upper have been stretched about the last;

FIGURE 83A is a view taken on the line 83A—83A of FIGURE 83;

FIGURE 83B is a view taken on the line 83B—83B of FIGURE 83A;

FIGURE 84 is a representation of the shoe conforming arrangement operating on the shoe assembly;

FIGURE 85 is a representation of the shoe assembly as it appears in the machine before a heel wiping and a toe wiping operation;

FIGURE 85A is a view taken on the line 85A—85A of FIGURE 85;

FIGURE 86 is a representation of the shoe assembly as it appears in the machine at the completion of the wiping operations; and FIGURE 86A is a view taken on the line 86A—86A of FIGURE 86.

Figure 1:
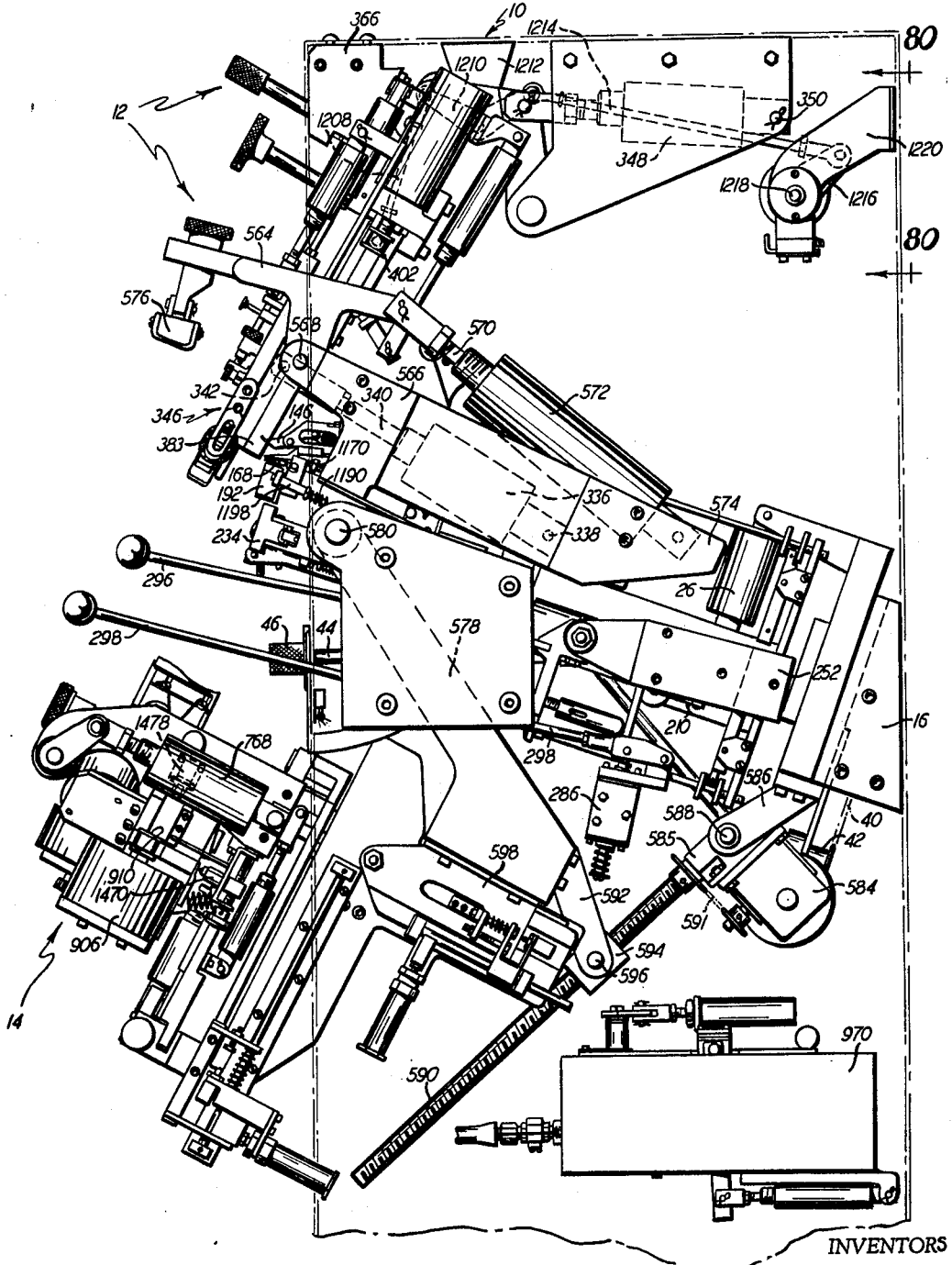
FIGURE 1 is a side elevation of the machine.

As seen in FIGURE 1, the machine includes a frame 10 in which are mounted a toe section 12 for pulling over the upper on the last and wiping the toe portion of the upper margin against the insole and heel section 14 for wiping the heel section of the upper margin against the insole. The frame incorporates a base 16 having a toe post 18 (FIGURES 1 and 2) extending outwardly therefrom. For convenience of operation, the machine is inclined downwardly extending from the toe section 12 towards the heel section 14. However, parts extending in the direction of the longitudinal axis of the toe post 18 will be referred to as extending vertically and parts extending in a direction that is at right angles to the longitudinal axis of the toe post 18 will be referred to as extending horizontally. The operator is intended to be located to the left of the machine as seen in FIGURE 1, and a direction extending toward the operator (right to left in FIGURE 1) will be referred to as "forward" while a direction extending away from the operator (left to right in FIGURE 1) will be referred to as "rearward."

Figure 2:
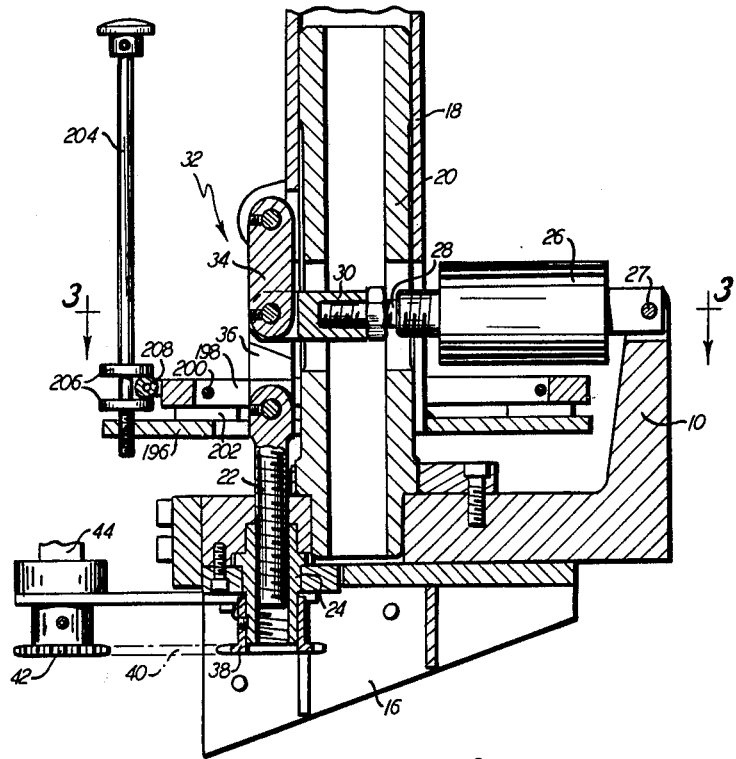
FIGURE 2 is a side elevation, in section, of a toe post mounting.
Figure 3:
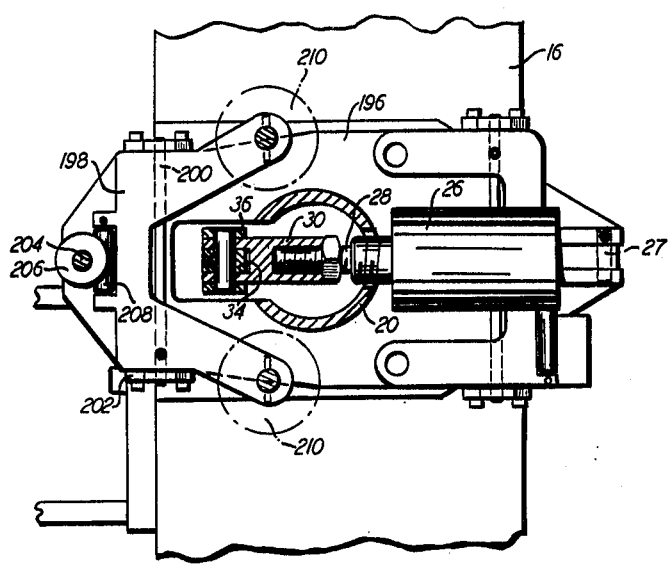
FIGURE 3 is a view taken on the line 3—3 of FIG. 2.

Referring to FIGURES 2 and 3, the toe section includes a boss 20 that is secured to the frame 10 and extends upwardly and vertically thereof. A bolt 22 is threaded into a nut 24 that is rotatably mounted in the frame 10. The toe post 18 is slidably mounted on the boss 20 for vertical movement. An air operated motor 26 is pivoted to the frame 10 on a pin 27 and has a piston rod 28 extending rearwardly thereof that is secured to a link 30 of a toggle linkage 32. The toggle linkage 32 includes a link 34 that is pivoted to the toe post 18 and the link 30 and a link 36 that is pivoted to the screw 22 and the link 30. A sprocket wheel 38, secured to the nut 24, is connected by a chain 40 to a sprocket wheel 42. The sprocket wheel 42, which is rotatably mounted in the frame 10, is connected by a linkage 44 (FIGURE 1) to a knob 46. The knob 46 is rotatably mounted in the frame so that rotation of this knob, through the linkage 44, sprocket wheel 42, chain 40, and sprocket wheel 38 causes rotation of the nut 24 to thereby raise or lower the bolt 22 and the toggle linkage 32 to thereby adjust the vertical position of the toe post 18 and the parts carried thereby. During this adjustment, the motor 26 will swing about the horizontal axis of the pin 27.

As shown in FIGURES 4 and 5, a toe post extension 48 is secured to the toe post 18 to extend upwardly thereof. An air operated motor 50 is secured to the toe post 18. The piston rod 52 of the motor 50 is secured, by way of a flange 54, to a bar 56 that is slidably mounted for vertical movement in the toe post extension 48. A mount 58 is secured to the top of the bar 56. A toe applicator-support 60, located above the mount 58, is connected to the mount 58 by means of a front pin 62 and a pair of rear pins 64. Each of the pins 62, 64 is pivotally secured to the toe applicator-support 60 by a pivot pin 65 and extends through the mount 58. A compression spring 66 is entwined about each pin 62 and extends between the mount 58 and the applicator-support 60. A washer 70 is secured to each pin 62 below the mount 58. The springs 66 urge the applicator-support upwardly to an extent determined by the bearing of the washers 70 against the bottom of the mount 58.

The top of the toe applicator-support 60 is formed into a forked extruding section 72 that is complementary in shape to the margin of the toe portion of the shoe to be lasted. A groove 74 in the top of the extruding section 72 is connected by orifices 76 with a passage 78. The passage 78 is in communication with a passage 80 in an adapter 82 that is secured in the applicator-support 60. A hollow, flexible conduit 84 is secured to the adapter 82.

An insole rest mount 86, bolted to the post extension 48, has an insole rest 87 mounted thereon. The insole rest 87 comprises a toe rest member 88 and a pair of forepart rest members 90.

Referring to FIGURES 4 and 9–14, a pair of spaced bars 88 extend forwardly and upwardly of the toe post extension 48 and are rigidly connected to the toe post extension by a block 90 (FIGURE 4). The bars 88 are maintained in spaced relation by a tie bolt 94 extending between them and each bar has a forwardly and upwardly curved slot 95. A housing 96 is located between the bars 88. A pin 98 (FIGURE 11), rotatably mounted in the front of the housing, has eccentric ends 100 and 102 that are slidably received in the slots 95. A handle 104 is secured to the pin end 102. The pin 98 is received between spaced ears 106 in the housing 96 which are adjustable towards and away from each other by screws 108 (FIGURE 10) to thereby restrain the rotation of the pin 98 in the housing 96.

A pin 110 is rotatably and slidably mounted in a pair of spaced flanges 112 and 114 in the rear of the housing 96. The pin 110 is slidably received in the slots 95 and has spaced gears 116 and 118 (FIGURE 12) pinned thereto that are adapted to mesh with racks 120 which are secured to the bars 88. The pin 110 is urged leftwardly (FIGURE 12) by a compression spring 122 interposed between the left bar 88 and a knob 124 secured to the left end of the pin 110. A rod 126, that extends radially of the pin 110, is normally urged leftwardly by the spring 122 into one of a plurality of grooves 128 (FIGURE 14) in the flange 114 to thereby lock the pin 110 against rotary movement. A rightward movement (FIGURE 12) of the pin 110 against the force of the spring 122 causes the rod 126 to clear the notches 128 so that a rotation of the knob 124 will cause the gears 116, 118 to mesh with the racks 120 and thereby move the housing 96 along the bars 88.

An air operated motor 130, which serves as a front pincers retainer, is located within an aperture 131 in the housing 96 and is pivoted to the housing 96 by pins 132 and 134 (FIGURE 13) for swinging movement about a forwardly and rearwardly extending axis and is yieldably urged about the axis of the pins 132 and 134 to a median position within the aperture by compression springs 136 that are interposed between the motor 130 and the housing 96. An air operated motor 138 is secured to the upper end of the piston rod 140 (FIGURE 9) of the motor 130. An inlet line 141 of the motor 130 is slidably guided in a slot 142 of the motor 130 to thereby preclude rotation of the motor 138 about the axis of the piston rod 140. A fixed jaw 144 of a front pincers 146 is secured to a mounting bracket 148 that is fixed to the top of the motor 138. A movable jaw 150 of the front pincers 146 is pivoted to the bracket 148 and is connected by linkage 152 to the piston rod 154 of the motor 138.

Referring to FIGURES 4 and 15–21, a cylinder 156 is secured to the block 90 forwardly of the bars 88. A piston 158 is vertically movable in the cylinder 156 and is secured to a piston rod 160. A bar 162, connected to and extending upwardly of the piston rod 160, is slidable in a vertical guideway 164 formed in an extension 166 of the cylinder 156. A front retarder 168 is affixed to the top of the bar 162.

A gib 170 is bolted to the block 90 forwardly of the cylinder 156 on each side of the applicator-support 60 and the insole rest 87 by means of headed bolts 172. A gib 174 is positioned alongside each gib 170. The adjacent faces of the gibs have inclined mating surfaces. A strut 176 is secured to each outer end of the block 90. A screw 178 is rotatably mounted in each strut 176 and is threaded into its associated gib 174. A column 180 is slidably mounted on each set of gibs 170, 174 for inward and outward movement by way of flanges 181 and 183 (FIGURE 20) that embrace the gibs 170, 174. A knob 182, rotatably mounted in each strut 176, has an inwardly directed screw 184 secured thereto that is threaded into a column 180. Normally, the gibs 174 are wedged between the flanges 181 and the gibs 170 to thereby lock the columns 180 in place. When it is desired to shift a column 180 inwardly or outwardly to thereby shift the position of the below described parts carried by the column, the associated screw 178 is manipulated to move the associated gib 174 rightwardly (FIGURE 20) to thereby unlock the column. After this the column is shifted along its associated gibs by rotation of its associated knob 182 and is again locked in place by manipulating the screw 178 to move the gib 174 leftwardly (FIGURE 20). A cylinder 186 is formed in each column 180, and a piston 188 is mounted in each cylinder 186 for vertical movement. A spline 190 (FIGURE 19) secured to each cylinder 186 extends into a vertical groove in each piston 188 to preclude swinging of the pistons 188 about their vertical axes. A side retarder 192 is removably mounted on a block 194 that is secured to the top of each piston 188 (see FIGURE 21).

Referring to FIGURES 2, 3, 22 and 23, a plate 196 is welded to the bottom of the toe post 18. A base 198 is pivoted to the plate 196 for swinging movement in a vertical plane on a pivot pin 200 that is secured at its ends to brackets 202. The brackets 202 are bolted to the plate 196. A shaft 204, threaded into the plate 196, has a pair of spaced sleeves 206 secured thereto that embrace rollers 208. The rollers 208 are mounted at the front of the base 198. Thus, rotation of the shaft 204 causes height-wise swinging movement of the back of the base 198 about the axis of the pin 200.

An air actuated motor 210 is connected to the base 198 on each side of the toe post 18 by means of a universal joint 212. Referring to FIGURES 24–27, an air actuated motor 214 is slidably mounted for heightwise movement in each motor 210 and is connected to the piston rod 216 of its associated motor 210. The piston rods 218 of the motors 214 are raisable by the admission of pressurized air into these motors through lines 220 and are lowered by return springs 222 interposed between piston 224 of the motors 214 and a block 226 at the top of each of these motors. Each piston rod 218 extends upwardly of a motor 214 through a tube 228 that is secured at its bottom to a block 226. The top of each tube 228 is secured to a bracket 230 by means of a coupling 232. A side pincers 234 is mounted on each bracket 230. Each pincers 234 comprises an upper jaw 236 and a lower jaw 238 that are swingable about a pin 240 mounted in a bracket 230. Elastic bands 242 extending about the jaws 236 and 238 serve to yieldably urge the jaws to open position. The jaws 236 and 238 respectively have downwardly extending legs 244 and 246 having rollers thereon that are positioned above a cone-shaped cam 248 secured to the top of each piston rod 218. Each cam 248 is slidable in a bracket 230. Each line 220 is slidable in a slot 250 in its associated motor 210 to preclude rotation of the motors 214 about their axes.

Referring to FIGURES 28–31, a brace 252 (see also FIGURE 1) is secured to the frame 10 alongside each motor 210. A mount 254 is mounted on each brace 252 for swinging movement about the axis of a pin 256 that extends transversely of the machine. A screw 257 is threaded through a forwardly extending leg 258 of each mount 254. A plunger 260, secured to the bottom of each screw 257, is slidable in an abutment cup 262. The cups 262 normally bear against ledges 264 extending forwardly of the braces 252. The plungers 260 are urged upwardly of the cups 262 by compression springs 266, interposed between the bottoms of the plungers 260 and the cups 262. Pins 268 on each plunger are movable heightwise in slots 270 in each cup 262, and the bearing of these pins against the tops of these slots limits the extent that the plungers are urged upwardly of the cups by the springs 266. The springs 266 thus act to urge the mounts 254 and the below described parts constrained by the mounts clockwise (FIGURE 28) about the axes of the pins 256.

A housing 272 is secured to an upwardly extending leg 274 of each mount 254. A pair of spaced limbs 276 on the housing 272 have inwardly facing recesses 278 (FIGURES 30 and 31) which act as gibs to slidably guide a collar member 280. A stop bolt 282 is threaded into each housing 272 and extends rearwardly thereof between the limbs 276. Each collar 280 is yieldably urged outwardly along its associated limbs 276 by a compression spring 283 that is interposed between a collar 280 and a plate 284 that straddles the back of each pair of limbs 276. Each collar 280 slidably guides a tube 228 for heightwise movement.

A valve 286 is secured to each mount leg 274 (FIGURES 28 and 30) and an identical valve 286 is secured to the frame 10 (FIGURE 1).

Figure 32:
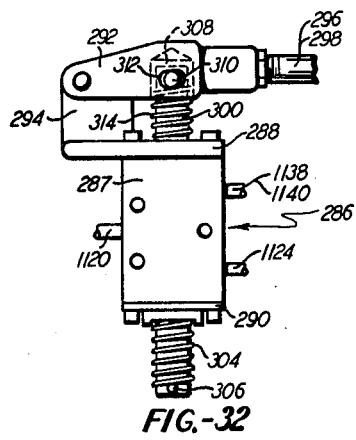
FIGURE 32 is a view of a control valve used to increase or decrease the downwardly directed force applied to the upper by the arrangement for gripping and pulling over the toe end and forepart portions of the upper.

The valves 286 are constructed similarly to those disclosed in Patent No. 3,233,261. As shown in FIGURE 32, each of these valves comprises a valve housing 287 having cap plates 288 and 290. A lever 292 is pivoted to a lug 294 formed in the cap plate 288. A handle 296 is secured to the levers 292 of those of the valves 286 mounted on the mount legs 274 and a handle 298 (FIGURE 1) is secured to the lever 292 of the valve 286 that is secured to the frame 10. A spool 300 is slidably mounted in a bore 302 (FIGURES 33–35) in the housing 287 and extends beyond the cap plates 288 and 290. A compression spring 304 is coiled about the spool 300 between the cap plate 290 and a pin 306 projecting out of the lower end of the spool. The upper end of the spool is received in a recess 308 in the lever 292. A pin 310, projecting out of the upper end of the spool within the recess 308, is slidably received in slots 312 formed in the lever 292. A compression spring 314 is coiled about the spool 300 between the cap plate 288 and the pin 310. The valve housing 287 has a port 316 located midway of its length, a port 318 above the port 316 and a port 320 located below the port 316. Air lines, described more fully below, enter the ports 316, 318, and 320. The valve spool 300 has lands 322, 324, and 326 that have a diameter corresponding to the diameter of the bore 302 so as to be snugly slidable in the bore. An annular chamber 328 is formed between the lands 322 and 324, an annular chamber 330 is formed between the lands 324 and 326, and an annular chamber 332 is formed below the lands 326. A conduit 334 connects the chambers 328 and 330.

Figure 33:
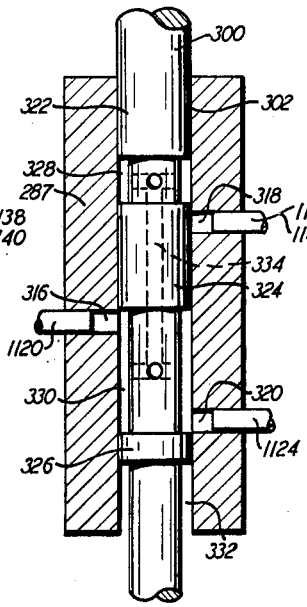

The springs 304 and 314 serve to normally position the valve spool 300 in a median position wherein the port 318 is blocked by the land 324 and the ports 316 and 320 are in communication through the chamber 330 as shown in FIGURE 33. A downward movement of the handle 296 or 298 as seen in FIGURE 32 will move the spool 300 downwardly from the FIGURE 33 position to the FIGURE 34 position wherein the land 324 blocks the port 316 and the ports 318 and 320 are in communication by way of the chamber 328, the conduit 334 and the chamber 330. An upward movement of the handle 296 or 298 as seen in FIGURE 32 will cause the spool 300 to move upwardly from the FIGURE 33 position to the FIGURE 35 position wherein the port 320 is in communication with the atmosphere through the chamber 332, the port 318 is blocked by the land 334, and fluid entering the port 316 will be trapped by the lands 322, 324 and 326.

Referring to FIGURES 1 and 36–39, a pair of air operated motors 336, only one of which is shown in FIGURE 1, are pivoted to the frame 10 on pivot pins 338. The upwardly extending piston rods 340 of the motors 336 are pivotally connected by front pivot pins 342 to the front portion of a toe head 346. Rearwardly of the motors 336, an air operated motor 348 is pivotally connected to the frame 10 on a pivot pin 350. The upper end of the piston rod 352 of the motor 348 is secured to a clevis 354 and the clevis is pivotally connected to the mid-portion of an angled lever arm 356 by a pivot pin 358. The lower end of the lever arm 356 is pivoted on the frame 10 by a pivot pin 360. The upper end of the lever arm 356 is formed into two branches 362, and each branch is pivotally connected to a rib 365 on the toe head 346 by a back pivot pin 364.

Figure 39:
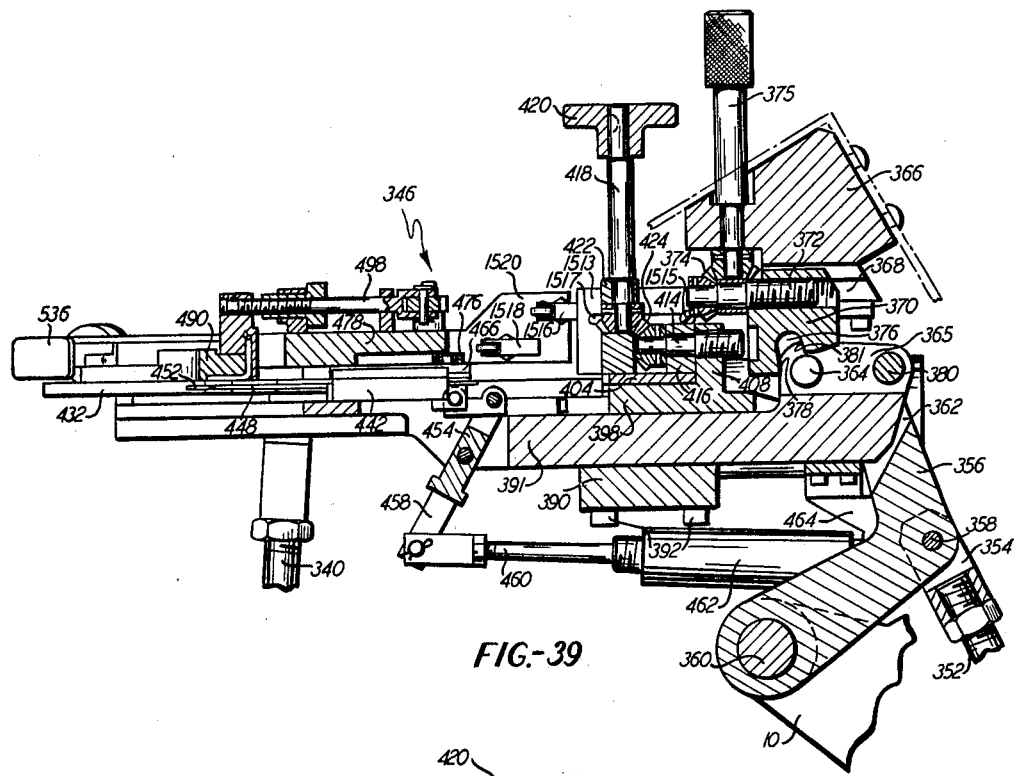
FIGURE 39 is a view taken on the line 39—39 of FIGURE 37.
Figure 38:
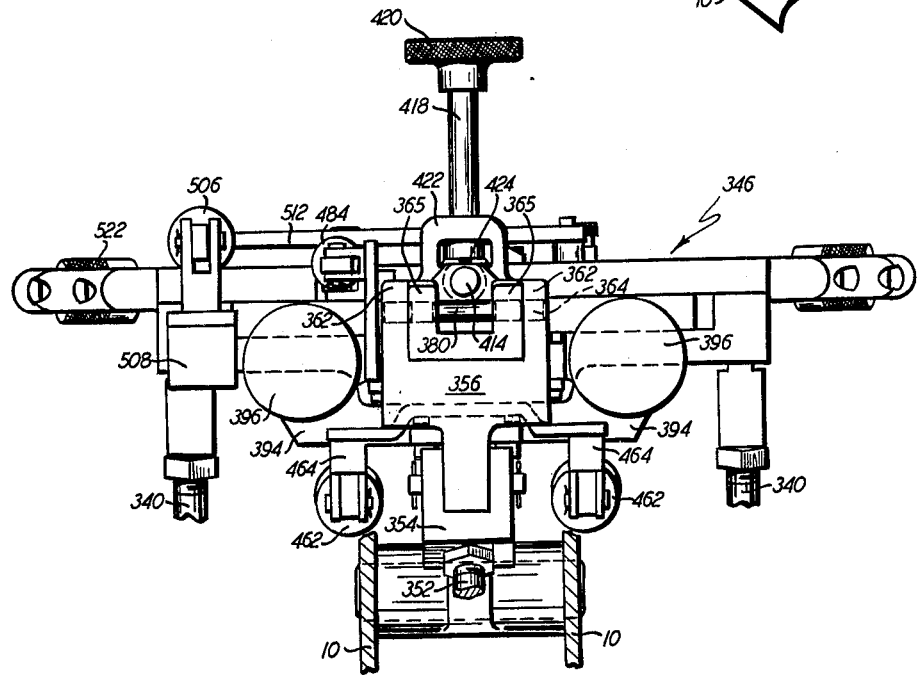
FIGURE 38 is a view taken on the line 38—38 of FIGURE 36.
Figure 40:
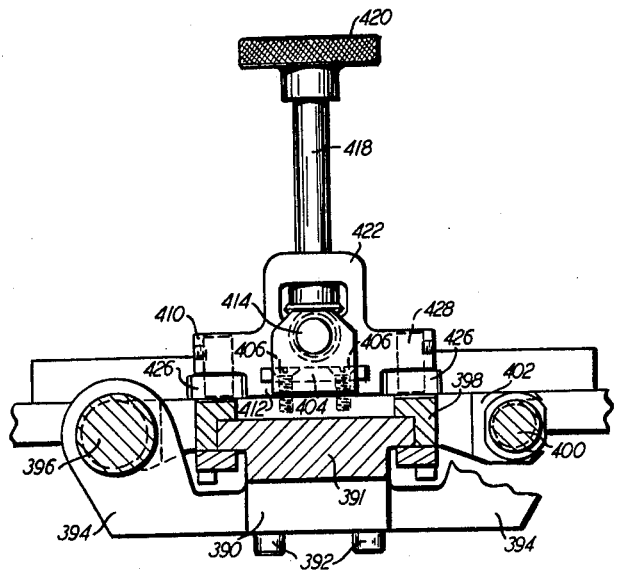
FIGURE 40 is a view taken on the line 40—40 of FIGURE 37.
Figure 42:
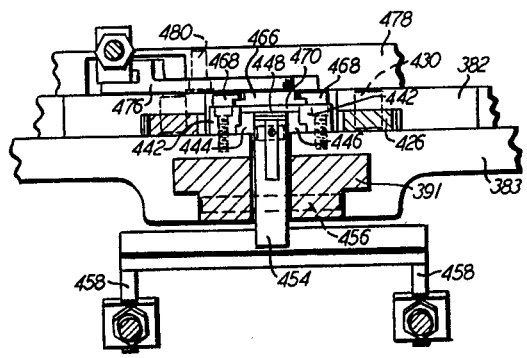
FIGURE 42 is a view taken on the line 42—42 of FIGURE 37.

A corner beam 366 of the frame 10 has a pair of spaced gibs 368 secured thereto, only one of which is shown in FIGURE 39. A block 370 (FIGURE 39), slidably mounted on the gibs 368 for forward and rearward movement, is located between the ribs 365. A shaft 372, which is threaded into the block 370, is connected by mitre gearing 374 to a rod 375 that is rotatably mounted in the beam 366. The block 370 has a notch 376 in its bottom. The front wall 378 of the notch 376 is in registry with a bar 380 that straddles the ribs 365. The bottom of the rear wall 381 of the notch 376 is at a higher level than the bar 380 when the parts are in the FIGURE 39 position.

A pair of symmetrically disposed toe wiper cams 382 (FIGURE 37) are slidably supported on a block 383 at the front end of the toe head 346. The block 383 has pins 384 upstanding therefrom that extend into slots or cam tracks 386 and 388 formed in the wiper cams 382.

Figure 41:
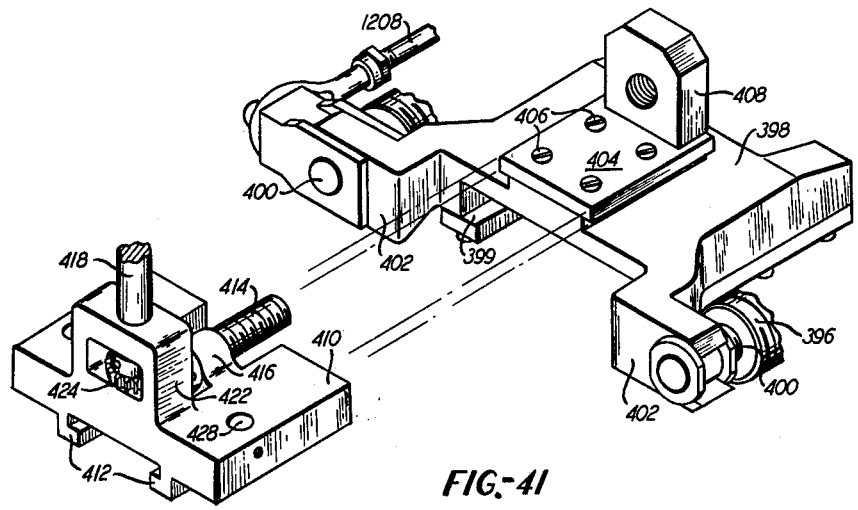
FIGURE 41 is an exploded view of a portion of the toe head.

A block 390 is secured to the bottom of a neck 391 formed at the mid-portion of the head 346 by bolts 392. The block 390 has laterally extending ears 394 located on opposite sides thereof, and an air operated motor 396 is secured to each of the ears. A primary slide 398 is slidably mounted on the neck 391 for forward and rearward movement by gibs 399 (FIGURE 41). The piston rods 400 of the motors 396 are each secured to a laterally extending ear 402 of the primary slide 398. A gib plate 404 is secured to the top of the primary slide 398 by screws 406. A rib 408 extends upwardly of the back of the primary slide 398. A secondary slide 410 is slidably mounted on the gib plate 404 by means of gibs 412. A shaft 414 is threaded into the rib 408 and is rotatable in an ear 416 located at the back of secondary slide 410.

A rod 418, having a knob 420 secured to its top, is rotatably mounted in an ear 422 located at the front of the secondary slide 410. The shaft 414 and the rod 418 are connected by mitre gearing 424. Thus, it can be seen that the secondary slide 410 can be moved forwardly and rearwardly with respect to the primary slide 398 by rotation of the knob 420. A link 426 is pivoted to each side of the secondary slide 410 by a pivot pin 428 to extend forwardly of the secondary slide. The front of each link 426 is pivotally connected to a wiper cam 382 by a pivot pin 430.

Figure 37:
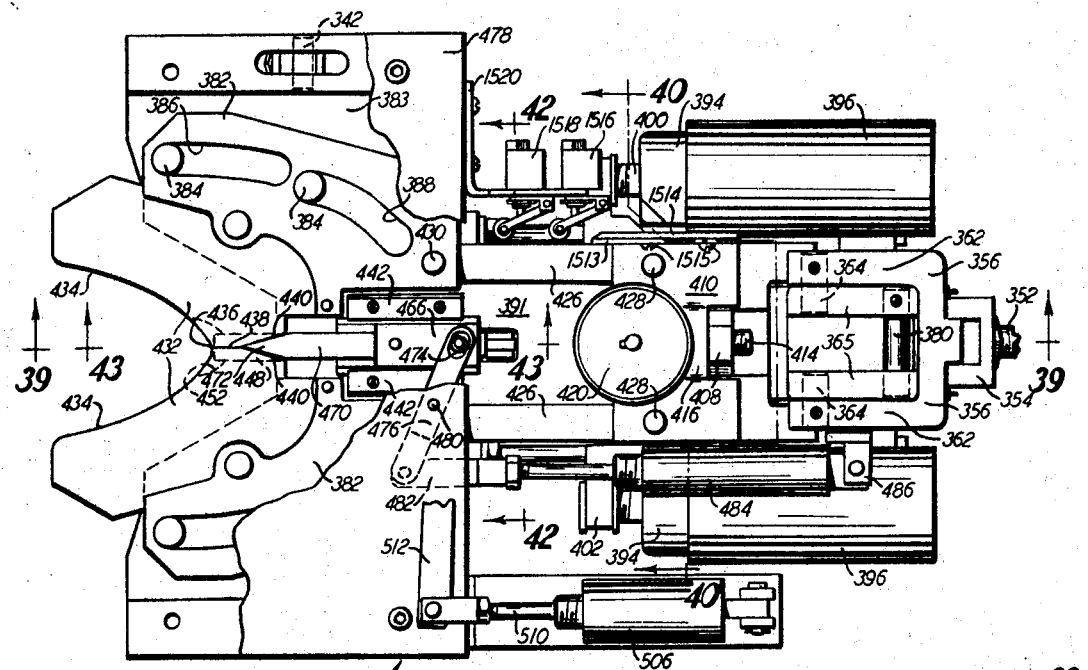
FIGURE 37 is a view taken on the line 37—37 of FIGURE 36.
Figure 36:
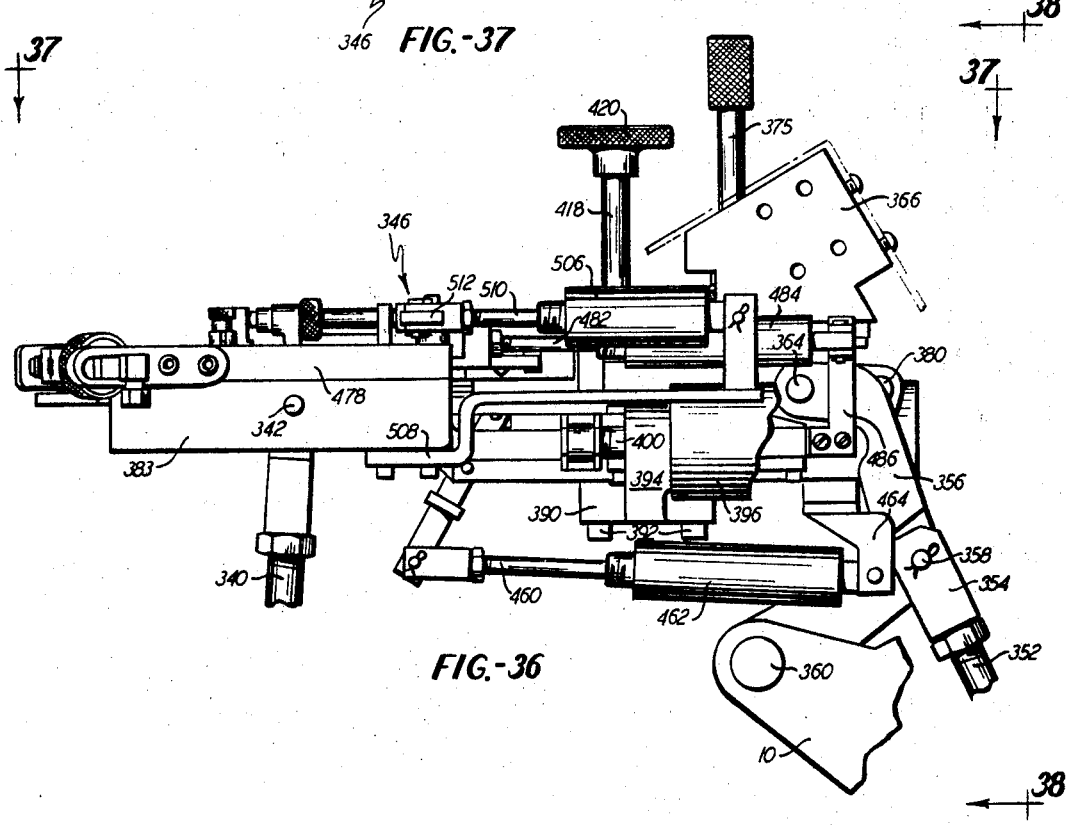
FIGURE 36 is a side elevation of a toe head in the machine.
Figure 43:
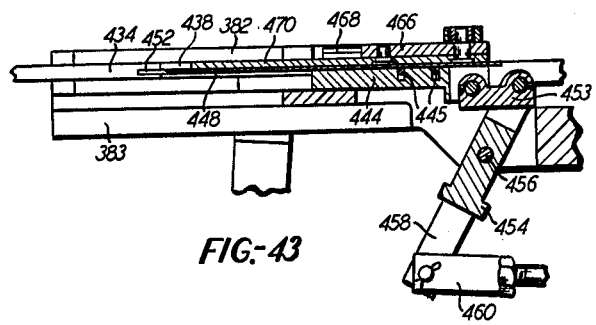
FIGURE 43 is a view taken on the line 43—43 of FIGURE 37.
Figure 44:
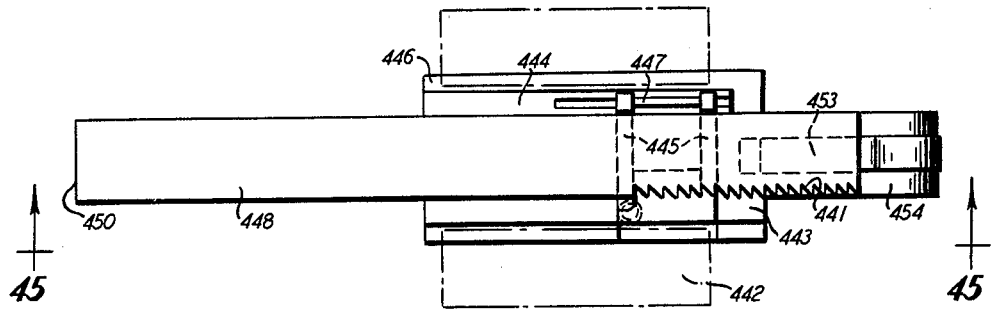
FIGURE 44 is a plan view of the knife.
Figure 45:
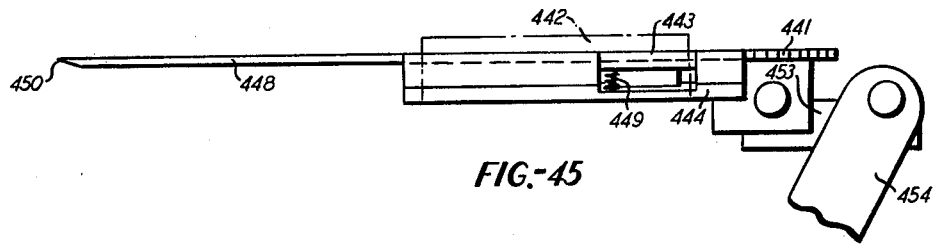
FIGURE 45 is a view taken on the line 45—45 of FIGURE 44.

Toe wipers 432 are connected to and extend forwardly of the wiper cams 382. The wipers 432 are flat plates having front side surfaces 434 that diverge forwardly from a vertex 436 (FIGURE 37). Rearwardly of the vertex 436, the wipers 432 have rear side surfaces 438 that abut each other in the FIGURE 37 position (see FIGURE 43). Rearwardly of the side surfaces 438, the wipers 432 have back side surfaces 440 that diverge rearwardly from the rear side surfaces 438. Rearwardly of the back side surfaces 440, the contiguous faces of the back portions of the wipers 432 and the wiper cams 382 are separated sufficiently to accommodate the below described parts therebetween.

Referring to FIGURES 37 and 42–45, a pair of spaced bars 442 are bolted to the block 383 rearwardly of the wipers 432 in the separation between the back portions of the wipers 432 and the wiper cams 382. A knife carrier 444 is slidably supported on the block 383 between the bars 442 and is constrained for forward and rearward movement by gibs 446 on the knife carrier. A knife 448, having a sharpened front edge 450, is located on top of the knife carrier 444 and extends forwardly thereof. The knife has a plurality of ratchet teeth 441 at one of its side that are engageable by a pawl 443. The pawl is pivotally mounted by way of links 445 to a pin 447 that is mounted to the carrier 444 and the pawl is resiliently urged into locking engagement with a selected group of the ratchet teeth 441 by a compression spring 449. Thus, by lowering the pawl 443 against the force of the spring 449, the pawl may be disengaged from the ratchet teeth 441, at which time the position of the knife 448 may be adjusted lengthwise of the carrier 444. The front of the knife 448 extends into slots 452 provided in the adjoining side surfaces 434, 438, and 440 of the wipers 432 between the top and bottom surfaces of the wipers. The back of the knife carrier 444 is pivoted to a link 454. The link 454 is pivoted intermediate its ends to the block 383 by a pivot pin 456. The bottom of the link 454 is formed into two spaced limbs 458, and each limb 458 is pivotally connected to the piston rod 460 of an air actuated motor 462. Each motor 462 is pivoted to a hanger 464 that is secured to the neck 391 of the toe head 346 (see FIGURES 36 and 38).

Referring to FIGURES 36, 37, 42 and 43, a bedding tool carrier 466 is slidably mounted for forward and rearward movement on gibs 468 formed in the bars 442 above the gibs 446. A bedding tool 470 is secured to the bottom of the carrier 466 and extends forwardly thereof between the wiper back side surfaces 440. The top of the bedding tool 470 is coplanar with the tops of the wipers 432 and the front of the bedding tool has a tapered nose 472. The back of the carrier 466 is connected by a pin and slot connection 474 to a lever 476. The lever 476 is pivotally connected intermediate its ends to a cover block 478, that is bolted to and extends above the block 383, by a pivot pin 480. The end of the lever 476 remote from the carrier 466 is pivotally connected to the piston rod 482 of an air actuated motor 484. The motor 484 is pivoted to a bracket 486 which is secured to the toe head 346. The cover block serves to preclude upward movement of the wiper cams 382.

Referring to FIGURES 46 and 47, the cover block 478 has a cut-out 488 at its forward end to accommodate a flexible shoe conforming yoke or pad 490. A U-shaped bracket 492, having a rear leg 494 and a front leg 496, is bolted to the top of the block 478. A stud 498 extends forwardly through the legs 494 and 496 of the bracket 492 and has a stop nut 500 threaded thereon, the stop nut having a forwardly extending sleeve portion 502 that is slidably contained within the front leg 496 and a collar portion 504 that is contained between the legs 494 and 496. An air actuated motor 506 is pivotally connected to a bracket 508 that is bolted to the block 383. The piston rod 510 of the motor 506 is pivotally connected to one end of a drive bar 512, the other end of the drive bar 512 being pivoted to the cover block 478. The rearwardly protruding end of the stud 498 is pivotally connected by means of a clevis 514 to the drive bar 512 at a point intermediate the ends of the drive bar so that upon actuation of the motor 506 the drive bar may pivot in a forward-rearward direction thereby effecting forward-rearward movement of the stud 498. The limit of forward movement of the stud 498 is governed by the position of the stop nut 500 thereon, forward movement of the stud 498 terminating upon engagement of the collar portion 504 of the stop nut with the back surface of the front leg 496. Mounted to the forwardly extending end of the stud 184, in a manner described below, is the yoke 490.

The block 478 is formed into inner flanges 516 at the forward ends of the cut-out 488 and outer flanges 518 that are bolted to the cover block 478. The piston 520 of an air actuated motor 522 is pivotally secured to each flange 518 by a pin 524 to extend inwardly thereof and a cylinder 526 is slidable on each piston 520. Each cylinder 526 has a screw 528 extending inwardly thereof that is threaded into a bar 530, the bars 530 being slidably mounted in the inner flanges 516. A sleeve 532 is slidably mounted on each bar 530 to bear against the exterior of the inner flange 516, and compression springs 534 interposed between the sleeves and the cylinders 526 serve to yieldably urge the cylinders and the bars 530 outwardly with the cylinders abutting against the outer flanges 518. A rubber bumper 536 is mounted on a mount 538 that in turn is pivotally secured to the inner end of each bar 530 by a pin 540. Slots 542, formed on the bars 530 outwardly of the bumpers 536 and the pins 540, receive pins 544 that are secured to brackets 546. Compression spring 548 interposed between shoulders 550 on the bars 530 and the brackets 546 serve to yieldably urge the brackets inwardly with the pins 544 engaging the inner ends of the slots 542.

The yoke 490 is of substantially U-shaped configuration and has a bight 552 and a pair of legs 554 extending forwardly of the bight and on opposite sides thereof. The yoke 490 is made of a flexible, deformable material such as Teflon and has a pair of bowed springs 556 extending exteriorally of each yoke leg from the bight forwardly thereof. The bight 552 of the yoke is received in a socket of a bracket 558, the bracket 558 being in turn secured to the forwardly extending end of the stud 498. Each bracket 546 has a spring arm 560 secured thereto and extending rearwardly thereof that is entwined at its rear end on a pin 562 located in the bracket 558. The yoke 490 is located in the machine directly above the toe wipers 432.

As shown in FIGURE 1, a lever 564, located on one side of the machine, is pivoted to a bracket 566 that is secured to the frame 10 for swinging movement about the axis of a pin 568. The lever 564 includes a downwardly extending arm that is pivoted to the piston rod 570 of an air actuated motor 572. The motor 572 is pivotally mounted on a bracket 574 that is secured to the frame 10. The parts 564, 566, 568, 570, 572 and 574 are duplicated on the other side of the machine. Each of the levers 564 has an upwardly and forwardly extending arm, and secured between these arms is a toe hold-down 576.

Referring to FIGURES 1, 50, 51 and 54, the heel section 14 comprises a pair of arms 578, each of which is pivoted to a side of the frame 10 on a pivot pin 580 to extend downward and forwardly thereof. The pivot pins 580 are located in the vicinity of the applicator-support 60 and the insole rest 87. A brace 582 (FIGURE 54) is secured to and straddles the bottoms of the arms 578. A reversible electric motor 584 (FIGURE 1) is mounted on a bracket 585. The bracket 585 is pivotally connected to a lug 586 that is secured to the frame 10 by a pivot pin 588. A threaded bolt 590 is rotatably mounted in the bracket 585 and extends forwardly thereof. A chain 591 connects the motor 584 and the bolt 590 to thereby effect rotation of the bolt in response to operation of the motor. A hanger 592, that is bolted to the brace 582, has a nut 594 pivoted thereto by a pivot pin 596. The nut 594 is threaded onto the bolt 590.

A heel mount 598 is connected to the brace 582 by bolts 600. An air actuated motor 602, secured to a flange 604 on the brace 582, has an upwardly extending piston rod 606 that is secured to a heel head 608. Rolls 610, secured to the heel mount 598, are received in tracks 612 in the heel head 608 to thereby guide the heel head for heightwise movement in response to actuation of the motor 602.

An air actuated motor 614, secured to a rib 616 of the heel head 608, has a rearwardly extending piston rod 618 that is secured to a hanger 620 of a primary or heel slide plate 622. Rolls 624, secured to the heel slide 622, are received in tracks 626 in the heel head 608 to thereby guide the heel slide for forward-rearward movement in response to actuation of the motor 614.

Referring to FIGURES 50–52, a shaft 628 is pinned at its ends to mounts 630 secured to the heel head 608. The shaft 628 extends in a forward-rearward direction. A front hanger 632 and a back hanger 634, that are spaced from each other and that are secured to the heel slide 622, are slidably mounted on the shaft 628. A bracket 636 is slidably mounted on the shaft 628 between the hangers 632 and 634. A spring return air actuated motor 638, secured to the bracket 636, has an upwardly directed piston rod 640. A brake 642, secured to the piston rod 640, has upwardly divergent surfaces 644 (FIGURE 52) that straddle the shaft 628. The brake 642 is positioned alongside the bracket 636 between this bracket and the hanger 632. In a lowered position of the piston rod 640, the surfaces 644 are spaced from the shaft 628. A raising of the piston rod 640, in response to an actuation of the motor 638, causes the surfaces 644 to bear against the shaft 628 for reasons set forth below. A compression spring 645, entwined about the shaft 642 between the bracket 636 and the hanger 634, yieldably urges the bracket 636 and the brake 642 forwardly to a position where the brake bears against the bracket 632. A motor control, that takes the form of a valve 646 mounted on the bracket 636, is in registry with a valve actuating stud 648 mounted in the bracket 634.

Referring to FIGURES 50, 51 and 53, an angle 650, secured to the heel head 608, extends through a cut-out 652 in the heel mount 590. The angle 650 has a horizontal leg 654 to which a bar 656 is welded. A headed bolt or stud 658 is threaded through the leg 654 and bar 656 and is secured in position by a nut 660. A bracket 662, located below the bar 656, has spaced upper and lower limbs 664 and 666. The lower end of the bolt 658 extends slidably through the limb 664 with the head 668 of the bolt 658 bearing against the bottom of the limb 664. A compression spring 670 is entwined about the bolt 658 and extends between the bar 656 and the limb 664. A headed bolt 672 is threaded through the bar 656 and is secured in position by a nut 674. The lower end of the bolt 672 extends slidably through the limb 664 with the head 676 of the bolt 672 bearing against the bottom of the limb 664. A motor control valve 678 is secured to the limb 666 in alignment with the bolt head 668. The bracket 662 is secured by a pin 680 to a shaft 682. The shaft 682 is slidable in mounts 684 and 686. The mounts 684 and 686 are secured to a plate 688. The plate 688 is secured to the heel mount 598 by spacers 690. A spring return air actuated motor 692, secured to a flange 694 of the plate 688, has a rearwardly directed piston rod 696. A brake 698, secured to the piston rod 696, has rearwardly divergent surfaces, similar to the surfaces 644 of the brake 642 (FIGURE 52), that straddle the shaft 682. In a forward position of the piston rod 696, the rearwardly divergent surfaces of the brake 698 are spaced from the shaft 682. A rearward movement of the piston rod 696, in response to an actuation of the motor 692, causes the rearwardly divergent surfaces of the brake 698 to bear against the shaft 682 for reasons set forth below.

Referring to FIGURES 55, 56, 58, 59 and 62, an adjustment plate 700 is pivotally mounted for swinging movement on a pin 702 that extends upwardly from the back of the heel slide 622. A rib 704, that is secured to and extends upwardly of the front of heel slide 622, has a groove 706 which slidably receives a tail 708 of the adjustment plate 700. A screw 710, having left hand threads and right hand threads thereon, is rotatably mounted in housings 712 and 714 that are bolted to the opposite ends of the rib 704. A stop member 716 is screwed onto each of the left and right hand threads of the screw 710. The bottom of the stop members 716 bear against the top of the rib 704 to prevent rotation of the stop members about the axis of the screw 710 and the stop members can be moved toward and away from each other by rotating a knob 718 pinned to an end of the screw. The stop members 716 are each in registry with a trunnion 720 that is secured to a base 721. The base 721 is adjustably mounted on the adjustment plate 700 in the manner described below. An air actuated motor 722, that is pivoted to the housing 714 by a pin 724, has a rearwardly extending piston rod 726. The piston rod 726 is pivotally connected to the adjustment plate 700 by a pivot pin 728.

Referring to FIGURES 61–63, a heel rest housing 730 is slidably mounted for heightwise movement at the rear of the adjustment plate 700. A heel rest 732 is secured to the housing 730 and extends upwardly thereof. A valve 734 is secured to a mount 735 which is secured to a plate 736. The plate 736 is bolted to the bottom of the housing 730. A height sensing pin 738 is slidably mounted in the heel rest 732 for heightwise movement. The bottom of the pin 738 is screwed into a sleeve 740 that is slidably mounted in the housing 730 for heightwise movement. The sleeve 740 rests on the head of a plunger 742 that is also slidably mounted in the housing 730 for heightwise movement. The plunger 742 has a downwardly extending stem 744 that extends through a hole in the plate 736 and is in alignment with the valve 734. A compression spring 746, entwined about the plunger stem 744 and interposed between the head of the plunger 742 and the plate 736, acts to yieldably urge the plunger 742, the sleeve 740 and the height sensing pin 738 upwardly to the FIGURE 62 position wherein the top of the height sensing pin is located above the top of the heel rest 732.

An air actuated motor 748 is pivoted to the adjustment plate 700. The piston rod 750 of the motor 748 is secured to a clevis 752. The clevis 752 is pivotally connected by means of pins 754 to the bottoms of toggle links 756 and the tops of toggle links 758. The tops of the toggle links 756 are pivoted to the heel rest housing 730 by a pin 760 and the bottoms of the toggle links 758 are pivoted to the adjustment plate 700 by a pivot pin 762. The pin 762 extends through a heightwise directed slot 764 in the housing 730. Thus, actuation of the motor 748 acts to raise and lower the heel rest 732 and the sensing pin 738 with respect to the adjustment plate 700.

Figure 57:
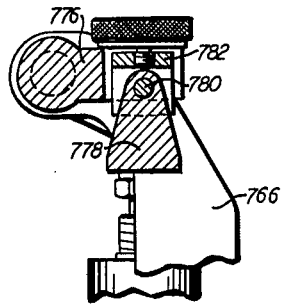
FIGURE 57 is a view taken on the line 57—57 of FIGURE 56.
Figure 55:
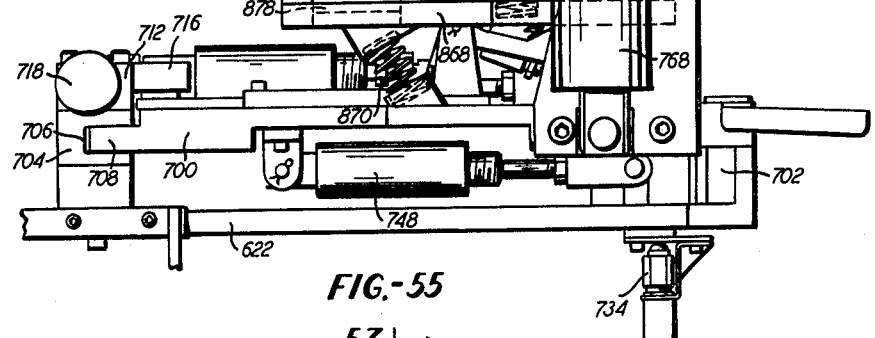
FIGURE 55 is a side elevation of the heel slide, an adjustment plate, a back-up support plate, a back-up plate and a heel hold-down that form a part of the heel section of the machine.
Figure 56:
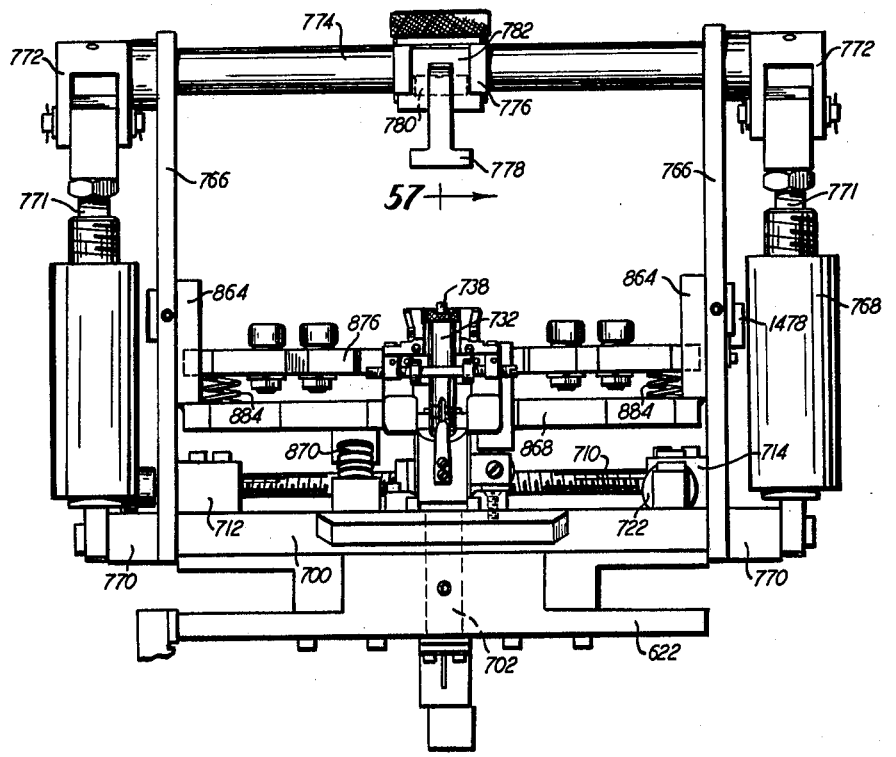
FIGURE 56 is a view taken on the line 56—56 of FIGURE 55.
Figure 58:
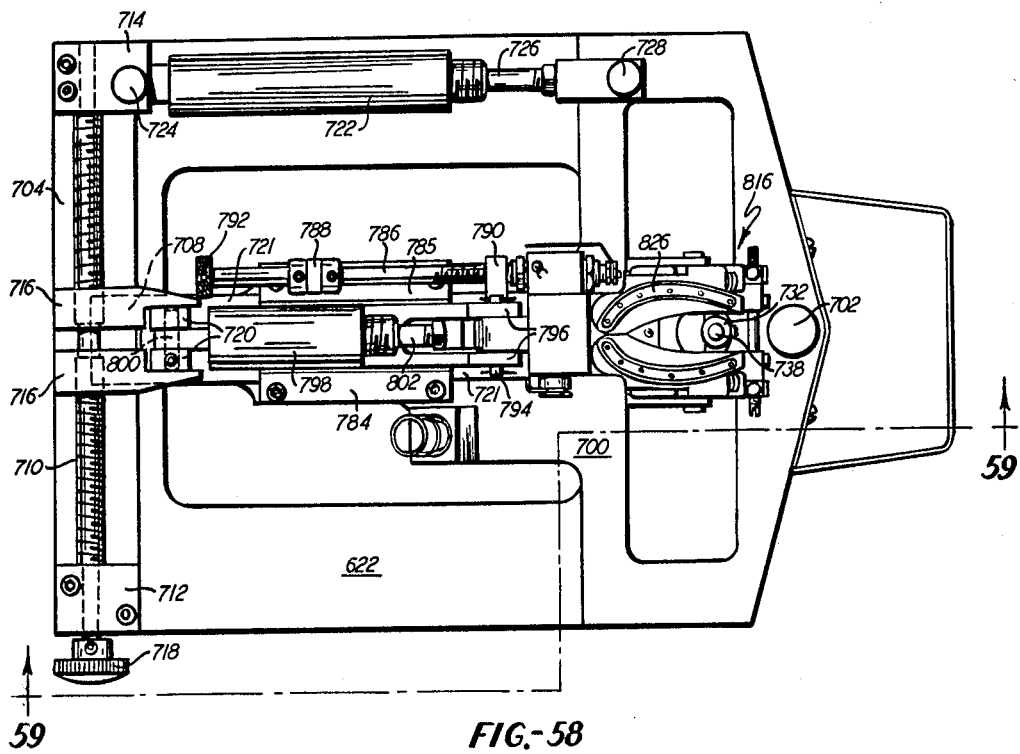
FIGURE 58 is a plan view of the heel slide, the adjustment plate and a heel cement applicator.
Figure 59:
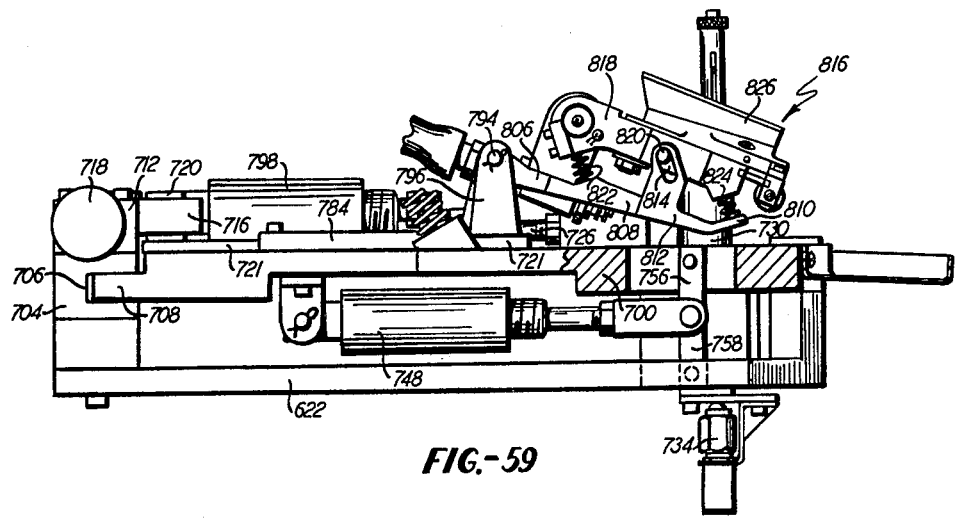
FIGURE 59 is a view taken on the line 59—59 of FIGURE 58.
Figure 69:
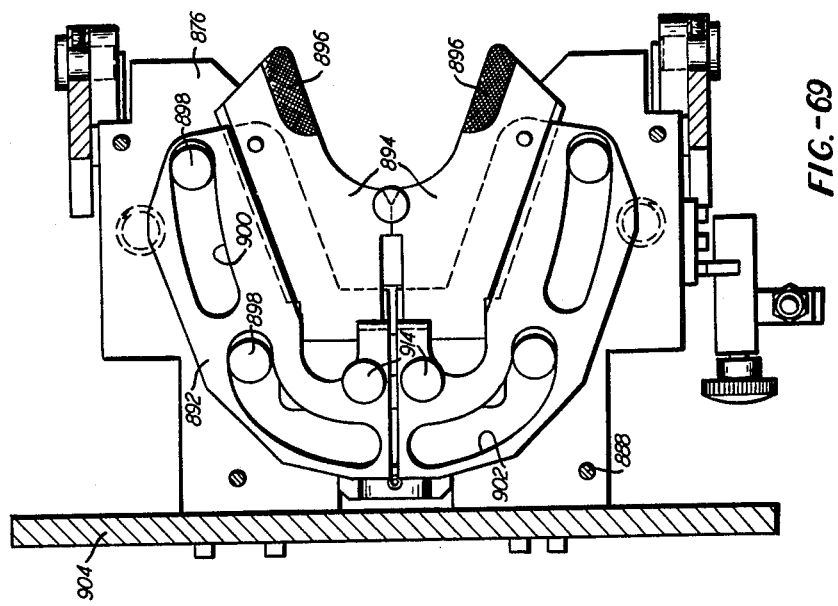
FIGURE 69 is a plan view of the heel wiping means.
Figure 70:
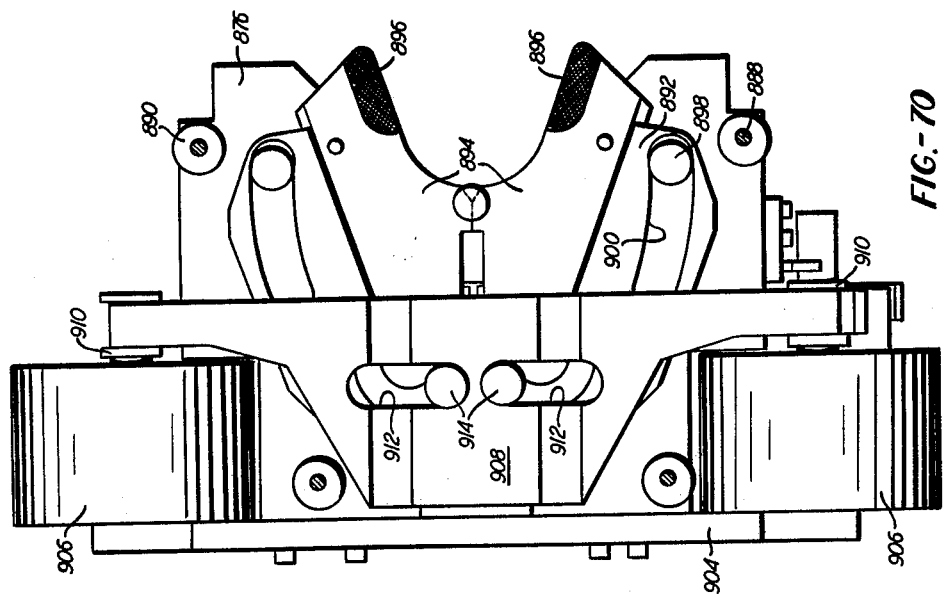
FIGURE 70 is a plan view of the heel wiping means together with its drive means.

Referring to FIGURES 55–57, an upright 766 is bolted to the back of each side of the adjustment plate 700. An air actuated motor 768 is pivoted to a lug 770 that is secured to and extends outwardly of each upright 766. The upwardly extending piston rod 771 of each motor 768 is pivoted to the back of a link 772. The front of each link 772 is pinned to a rod 774 that is rotatably mounted in the tops of the uprights 766. A hold-down mount 776 is rigidly connected to the mid-portion of the rod 774 and extends rearwardly thereof. A heel hold-down 778 is pivotally mounted on a pin 780 in a clevis 782 that forms a part of the mount 776.

Referring to FIGURES 58, 59 and 64–68, a pair of gibs 784 and 785, bolted to the adjustment plate 700, slidably guide the base 721 for forward-rearward movement. A rod 786, rotatably mounted in a hub 788 that extends upwardly from the gib 785, is threaded into a lug 790 that extends laterally from the base 721. A rotation of a knob 792, pinned to the rod 786, will therefore adjust the forward-rearward position of the base 721.

A pivot pin 794 is mounted to straddle a pair of lugs 796 that extend upwardly of the back of the base 721. An air actuated motor 798 is pivotally mounted on a pin 800 that straddles the trunnions 720. The rearwardly directed piston rod 802 of the motor 798 is connected by a pin 804 to a downwardly extending arm of a two armed lever 806 extends rearwardly of the pin 794 and is formed two arms on the pivot pin 794. The second arm of the lever 806 evtends rearwardly of the pin 794 and is formed into a heel applicator mount 808. The mount 808 is formed into a pair of rearwardly extending spaced mount extension 810. Each mount extension has an upwardly extending ear 812 with a slot 814 therein.

A heel cement applicator 816 is located above the applicator mount 808, 810. The heel applicator comprises a support plate 818. A pin 820 extends through the support plate 818 and is received in the slots 814. A front compression 822 is interposed between the support plate 818 and the mount 808 and a back compression spring 824 is interposed between each support plate 818 and each mount extension 810. The springs 822, 824 act to floatingly mount the applicator 816 on the applicator mount 808, 810 with the pin 820 bearing against the tops of the slots 814. A pair of spaced applicator plates 826 are pivoted to the front of the support plate 818 by means of depending prongs 828 in the applicator plates that are received in holes 830 in the support plate. A rod 832, having left and right threads at its opposite ends, is screwed by means of these threads into lugs 834 that depend from the fronts of the applicator plates 826. The rod 832 may be rotated by wheels 836 secured thereto to thereby swing the applicator plates toward and away from each other about the axes of the prongs 828. A hub 838 is rotatably mounted in the support plate 818. The hub 838 is secured to a hollow adaptor 840 that in turn is secured to a hollow flexible conduit 842. The conduit 842 is constructed similarly to the conduit 84. Communication between the adapter 840 and troughs 844 at the top of each applicator plate 826 is provided by the passages 846 and 848 in the hub 838, the passages 850 in the support plate 818, a peripheral slot 852 (FIGURE 68) in the prongs 828, passages 854, 856, 858 in the applicator plates 826 and orifices 860 in the applicator plates 826.

Referring to FIGURES 55, 56 and 60 a hanger 864 is pivoted to each upright 766 by a pin 866. A back-up support plate 868 is welded to and extends forwardly between the bottoms of the hangers 864. A spring 870, interposed between the adjustment plate 700 and the support plate 868, acts to yieldably urge the support plate upwardly about the transverse axes of the pins 866. A pair of spaced trunnions 872 and 874 extend upwardly of the support plate 868. A back-up plate 876, located spacedly above the support plate 868, has a downwardly extending trunnion 878 that is situated between the trunnions 872 and 874. A forwardly-rearwardly extending bar 880 is secured in holes in the trunnions 872, 874 by set screws 882 and extends through a hole in the trunnion 878 thus mounting the back-up plate for swinging movement about the axis of the bar 880. Cut-outs are provided in the back-up plate 876 to accommodate the trunnions 872 and 874, the cutout 883 for the trunnion 872 being shown in FIGURE 60. A groove 885 (FIGURE 60) is provided in the support plate 868 to accommodate the trunnion 878. A spring 884 is located on each side of the bar 880 and each spring 884 is interposed between the support plate 68 and the back-up plate 876.

Figure 71:
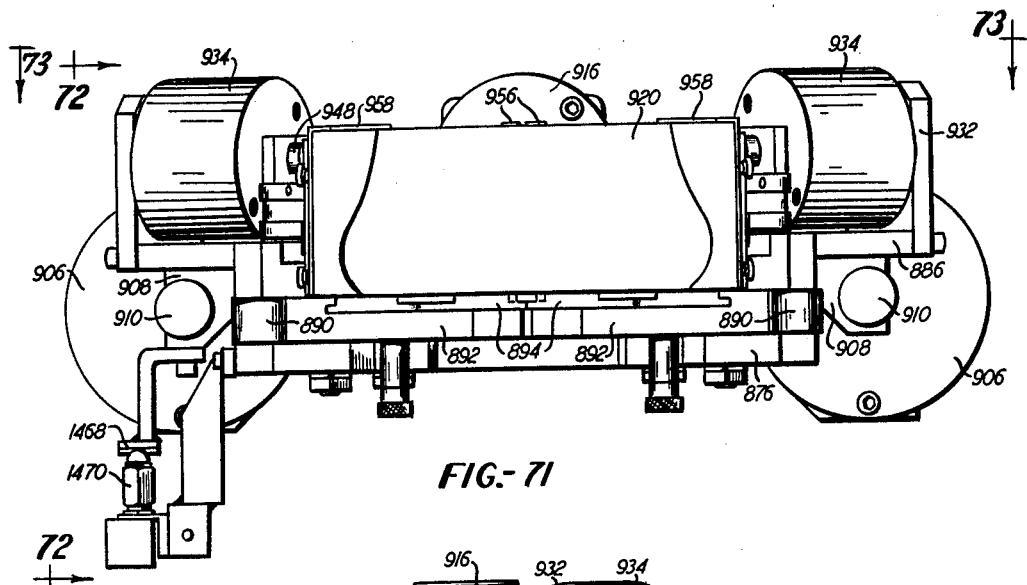
FIGURE 71 is a back elevation of the wiper mount.
Figure 72:
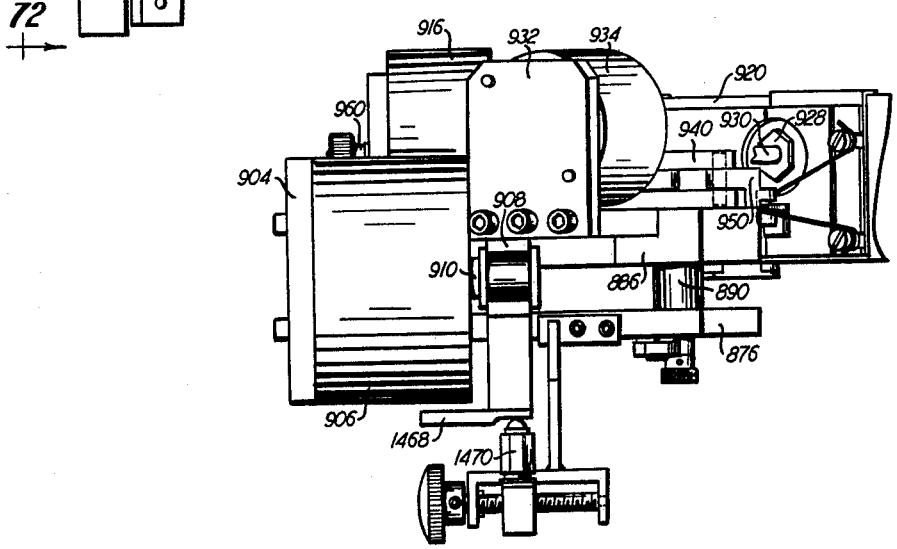
FIGURE 72 is a view taken on the line 72—72 of FIGURE 71.

Referring to FIGURES 69-73, a cover plate 886 is located spacedly above and is bolted to the back-up plate 876 by means that include bolts 888 (FIGURE 73) and spacers 890 (FIGURES 71 and 72). A pair of symmetrically disposed heel wiper cams 892 are slidably mounted between the back-up plate 876 and the cover plate 886. Heel wipers 894, having rearwardly divergent surfaces 896, are attached to the cams 892. Pins 898, secured to and extending upwardly of the back-up plate 876, extend into slots or cam tracks 900 and 902 formed in the wiper cams 892. A rib 904 is secured to the front of the cover plate 886 and an air actuated motor 906 is secured to each end of this rib. A bridge 908 is secured at its ends to the rearwardly extending piston rods 910 of the motors 906. A pair of transverse slots 912 are formed in the bridge 908, and each of these slots receives a pin 914 that extends upwardly of a wiper cam 892.

The plates 876 and 886 form a heel wiper mount.

Figure 73:
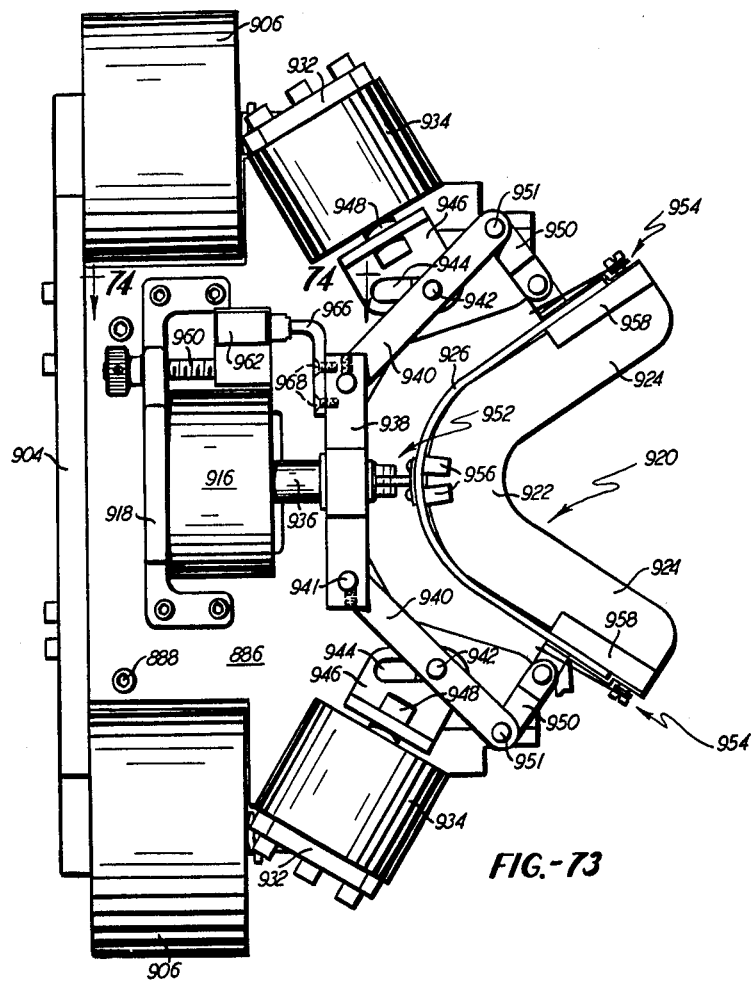
FIGURE 73 is a view taken on the line 73—73 of FIGURE 71.

Referring to FIGURES 71-74, an air actuated pad bight motor 916 is secured to a rib 918 that is bolted to the cover plate 886. A heel clamp pad 920, formed from a yieldable material such as rubber, is located rearwardly of the motor 916. The pad 920 is a substantially U-shaped member having a bight 922 and a pair of legs 924 extending rearwardly from the bight. A band 926, formed from a relatively unyieldable material, extends about the outer periphery of the clamp pad 920. The pad 920 has a hollow interior, and a fitting 928 and an air line 930 (FIGURE 72) provides communication between a source of compressed air and the interior of the pad. A rib 932 is bolted to each side of the cover plate 886 and an air actuated pad leg motor 934 is secured to each rib 932. The rearwardly directed piston rod 936 of the motor 916 is secured to a strap 938 that extends laterally of the piston rod 936 towards the motors 934. The front of a link 940 is pivoted to each end of the strap 938 by a pivot pin 941 with the links 940 extending rearwardly and outwardly of the strap. The midportion of each link 940 has a pin member 942 that is slidable in a slot 944 formed in a cam 946. Each cam 946 is secured to the rearwardly and inwardly directed piston rod 948 of its associated motor 934. The parts are so constructed that the longitudinal axes of the slots 994 are parallel to the longitudinal axis of the piston rod 936. A rearwardly and inwardly directed link 950 is pivoted to the rear of each link 940 by a pin 951. The rear of the piston rod 936 is connected to the strap 926 and the pad bight 922 by a pad bight connection 952 and the rear of each link 950 is connected to the strap 926 and its associated pad leg 924 by a pad leg connection 954. The connections 952 and 954 are similar to the connections shown in pending application Ser. No. 528,430 filed Feb. 18, 1966. The connection 952 includes shelves 956 and each connection 954 includes a shelf 958. The shelves 956 and 958 overlie the pad 920 and the pad 920 rests on the heel wipers 894 thereby enabling the pad to be restrained against heightwise movement. A screw 960, rotatably mounted in the rib 918, is threaded into a valve 962 for controlling the motor 916 as described below. The valve 962 rests on the cover plate 886. The valve operator 964 (FIGURE 74) of the valve 962 is in alignment with a valve actuating cam 966, and the cam 966 is secured to the strap 938 by screws 968 (FIGURE 73).

A cement pot 970 is secured to each side of the machine frame 10, one of these cement pots being shown in FIGURE 1 and the other cement pot not being shown. One of the cement pots is adapted to supply molten thermoplastic cement to the extruding section 72 of the applicator-support 60 and the other of the cement pots is adapted to supply molten thermoplastic cement to the applicator plates 826 of the heel applicator 816.

Referring to FIGURES 75-79, each cement pot includes a primary well chamber 972 and a secondary well chamber 974 that are separated by a wall 976. A hole 978 in the wall 976 provides communication between the chambers 972 and 974. A shaft 980, extending transversely over the chamber 972, is rotatably mounted in a pair of hangers 982 and 983 that are respectively secured to walls 984 and 986 that form a part of the enclosure for the chamber 972. A lever 988, secured to the shaft 980 to extend downwardly of the exterior of the cement pot, is pivoted to a clevis 990 by a pin 992. The clevis 990 is secured to the piston rod 994 of an air actuated motor 996 and the motor 996 is pivoted to a flange 998 that is secured to the cement pot 970. A block 1000 is secured to the lever 988. A stop stud 1002, that is threaded into a flange 1004 of the wall 984, is in alignment with the block 1000. A lever 1008 is pinned to the shaft 980 and extends downwardly thereof into the well chamber 972 through a slot 1010 in the floor of the chamber 972. A prong 1012 at the bottom of the lever 1008 extends into a clevis 1014 formed in a plunger 1016, and the plunger 1016 is slidably mounted in a bore 1018 located in the cement pot 970 below the well chamber 972. A valve 1020 is rotatably mounted in the floor 1021 of the well chamber 974. The bottom of the valve 1020 intersects spaced passages 1022, 1024, and 1026 that are located in the chamber floor 1021, the chamber floor 1021 forming a valve housing. The passage 1022 is in communication with the bore 1018. The passage 1024 is in communication with an adapter 1028. The passage 1026 intersects a passage 1030 that extends upwardly from the passage 1026 to communicate with the well chamber 974. The valve 1020 has three ports 1032, 1034 and 1036 that are at the same level as the passages 1022, 1024 and 1026. The port 1032 is relatively wide and the ports 1034 and 1036 are relatively narrow. One end of an arm 1038 is secured to top of the valve 1020. The other end of the arm 1038 is pivotally connected by a pin and slot connection 1040 to a clevis 1042. The clevis 1042 is secured to the piston rod 1044 of an air actuated motor 1046. The motor 1046 is secured to the hanger 983. Electric heating elements 1048, 1050 (FIGURE 78) and 1052 (FIGURE 77) are mounted in the cement pot 970. A coupling 1054 is secured to each adapter 1028. The end of the conduit 84 remote from the applicator-support 60 is secured to the coupling 1054 of one of the cement pots 970 and the end of the conduit 842 remote from the heel applicator 816 is secured to the coupling 1054 of the other of the cement pots 970.

In the preparation of the machine, the aforementioned machine parts are adjusted where necessary to accommodate them to the particular size and shape of shoe and last being operated on.

Figure 74:
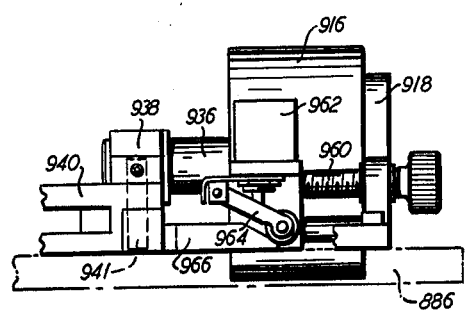
FIGURE 74 is a view taken on the line 74—74 of FIGURE 73.
Figure 75:
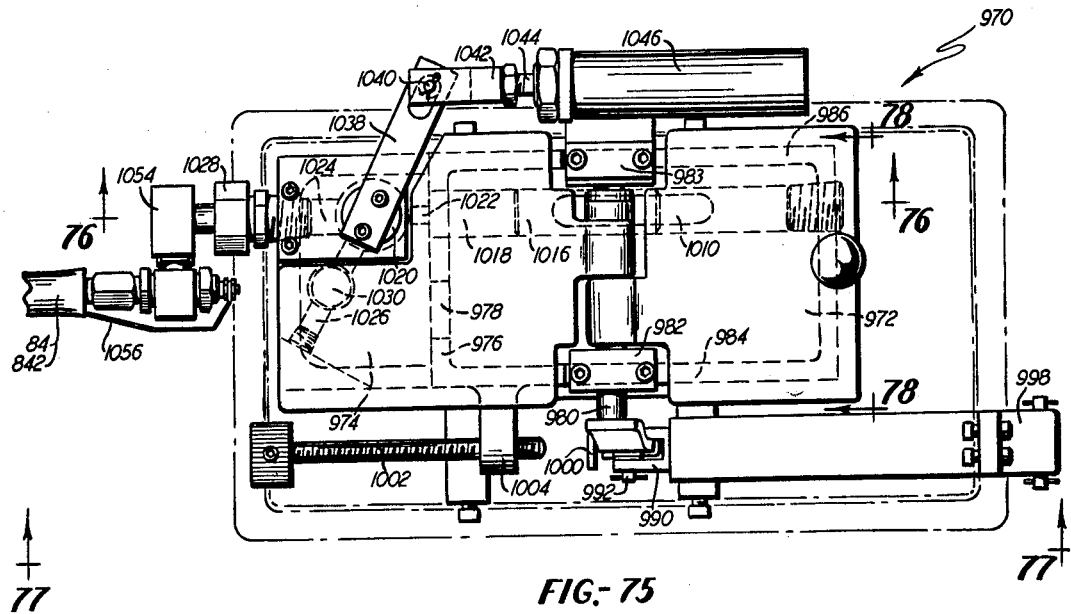
FIGURE 75 is a plan view of a cement pot.
Figure 77:
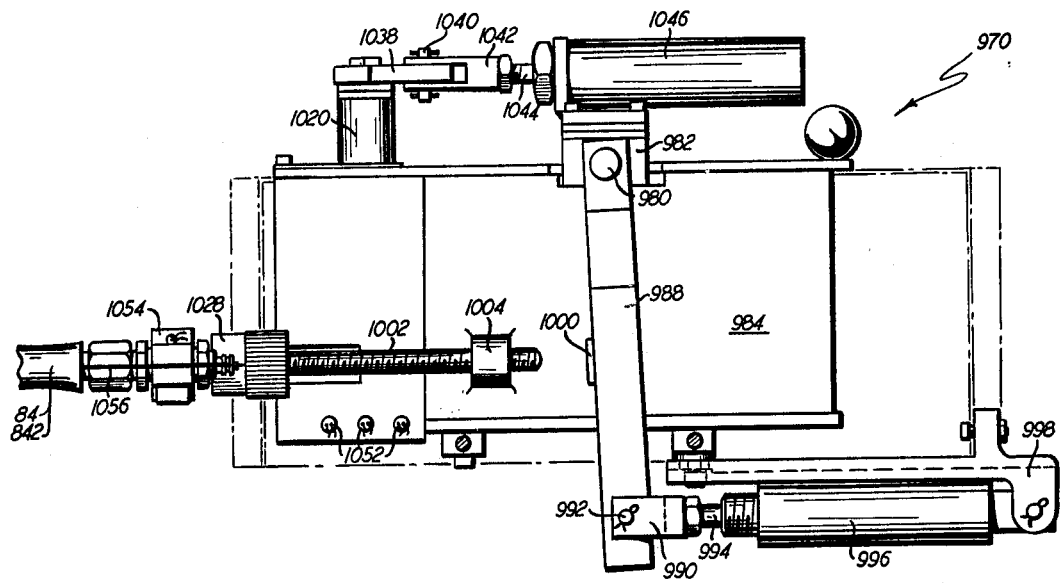
FIGURE 77 is a view taken on the line 77—77 of FIGURE 75.
Figure 76:
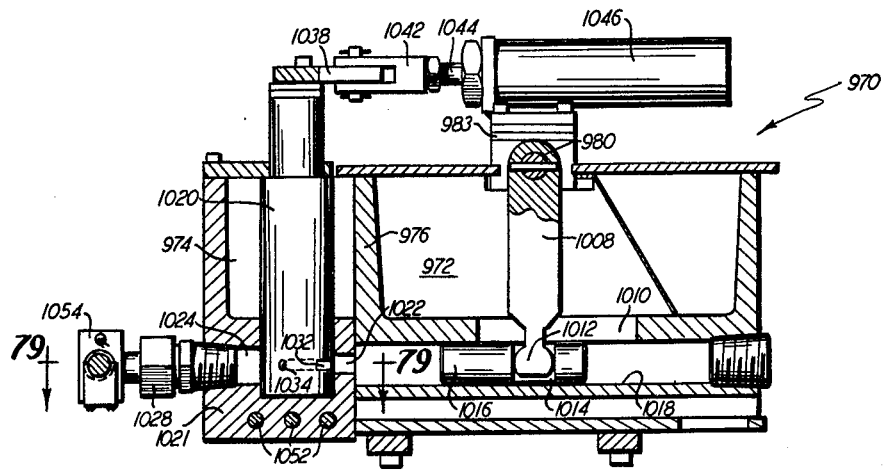
FIGURE 76 is a view taken on the line 76—76 of FIGURE 75.
Figure 78:
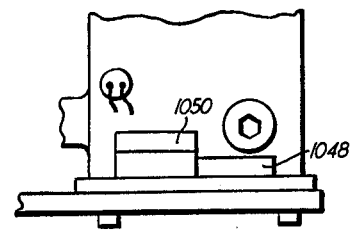
FIGURE 78 is a view taken on the line 78—78 of FIGURE 75.

In the idle condition of the machine: the piston rod 28 is retracted into the motor 26 to maintain the toe post 18, the toe post extension 48 and the insole rest 87 in a raised position; the piston rod 52 is retracted into the motor 50 to maintain the toe applicator-support 60 in a lowered position below the level of the insole rest 87 as shown in FIGURE 6; the piston rod 140 of the motor 130 is in a raised position to maintain the front pincers 146 in an upper position; the piston rod 154 of the motor 138 is in a lowered position to maintain the jaws 144, 150 of the front pincers 146 open; the front retarder 168 is held in a raised position by pressurized air entering the cylinder 156; the side retarders 192 are held in a raised position by pressurized air entering the cylinders 186 under relatively low pressure; the motors 210 are held in an outward position with the tubes 228 being caused to bear against the bolts 282 by the springs 283 and are held by gravity in a forward position with the cups 262 bearing against the ledges 264 due to the inclination from the vertical of the motors 210 and the side pincers 234 carried thereby (FIGURE 1); the piston rods 216 of the motor 210 are in an elevated position and the motors 214 are in a lowered position with respect to the piston rods 216 so that the side pincers 234 are in a raised position with their jaws open; the valves 286 are maintained in their median FIGURE 33 position; the piston rods 340 are projected out of the motors 336 and the piston rod 352 is retracted into the motor 348 to maintain the toe head 346 in a rearward and raised position; the piston rods 400 are retracted into the motors 396 to maintain the toe wipers 432 in a retracted position; the piston rods 460 are projected out of the motors 462 to maintain the knife 448 in a retracted position; the piston rod 482 is projected out of the motor 484 to maintain the bedding tool 470 in the retracted position shown in FIGURE 37 with the bedding tool nose 472 between the back side surfaces 440 of the toe wipers 432; the piston rod 510 is projected out of the motor 506 under the yieldable force of pressurized air entering the motor 506 under relatively low pressure to thereby yieldably urge the bight 552 of the yoke 490 forwardly with the nut 500 bearing against the front bracket leg 496; the yoke legs 554 are yieldably urged inwardly with respect to the bars 550 under the influence of the springs 548; the cylinders 526 of the motors 522 bear against the outer flanges 518 with no pressurized air entering the motors 522, thus maintaining the bumpers 536 outward of the inner peripheral wall of the yoke 490; the piston rods 570 are retracted into the motors 572 to maintain the toe holddown 576 in a raised position; the piston rod 606 is retracted into the motor 602 to maintain the heel head 608 and the parts carried thereby in a lowered position; the piston rod 618 is retracted into the motor 614 so that the heel slide 622 and the parts carried thereby are in a forward position; the piston rod 640 is retracted into the motor 638 so that the brake 642 does not bear against the shaft 628; the piston rod 696 is retracted into the motor 692 so that the brake 698 does not bear against the shaft 682; the piston rod 750 is projected out of the motor 748 so that the heel rest 732 and the height sensing pin 738 are in an upper position with respect to the adjustment plate 700; the piston rods 771 are projected out of the motors 768 to maintain the heel hold-down 778 in a raised position; the piston rod 802 is retracted into the motor 798 to maintain the heel applicator 816 in a lowered position; the piston rods 910 are retracted into the motors 906 to maintain the heel wipers 894 in a retracted position; the piston rod 936 is projected out of the motor 916 under relatively low pressure to maintain the bight 922 of the heel clamp pad 920 in a rearward position with the cam 966 in the FIGURE 74 position wherein it is not actuating the valve 962; there is no air entering the pad 920 through the air line 930 so that the pad is in a deflated condition; the piston rods 948 are retracted into the motors 934 so that the legs 924 of the heel clamp pad 920 are in their most open position; and the piston rods 994 are retracted into the motors 996 and the piston rods 1044 are retracted into the motors 1046 so that the cement pots 970 are in the condition shown in FIGURES 75–77 and 79.

Figure 79:
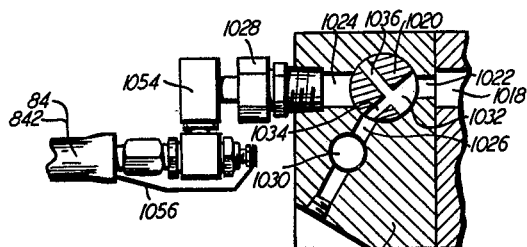
FIGURE 79 is a view taken on the line 79—79 of FIGURE 76.

Before starting the machine, solid thermoplastic cement is placed in the primary well chambers 972 of the two cement pots 970 wherein the cement melts and flows through the holes 978 into the secondary well chambers 974 and from thence through the passages 1030 and 1026, the ports 1034 and 1032 of the valves 1020 and the passages 1022 into the bores 1018 to fill up the space that is forward of the plungers 1016. The motors 996 and 1046 are then manually actuated in the manner described below to reciprocate the piston rods 994 and 1044. The forward movement of each piston rod 1044 serves to swing its associated valve 1020 counterclockwise as seen in FIGURE 79 to place the passages 1022 and 1024 in communication and block the passage 1026. The forward movement of each piston rod 994 acts to move its associated plunger 1016 forwardly to thereby expel the molten cement through the valves 1020 and into the conduit 84 or 842. The rearward movement of each piston rod 1044 serves to swing its associated valve 1020 clockwise to the FIGURE 79 position wherein the passage 1024 is blocked by the valve 1020 and the passages 1026 and 1022 are in communication through the valve 1020. The rearward movement of each piston rod 994 serves to move its associated plunger 1016 to its FIGURE 76 position to enable molten cement to flow from its associated secondary well chamber 974, through the passages 1030 and 1026, the valve 1020 and the passage 1022 into the bore 1018 to again fill up the space that is forward of the plunger 1016.

Thus the reciprocations of the motors 996 and 1046 associated with the conduit 84 causes the molten cement to be pumped through the conduit means formed by the conduit 84, the adapter 82, and the passages 80 and 78 (FIGURE 6) to fill the orifices 76 and the groove 74 in the top of the extruding section 72. The reciprocations of the motors 996 and 1046 associated with the conduit 842 causes the molten cement to be pumped through the conduit means formed by the conduit 842, the adapter 840, the passages 846, 848 850, 854, 856, and 858 and the slots 852 (FIGURES 64 and 68) to fill the orifices 860 and the troughs 844 in the top of the applicator plates 826.

An electrically heated resistor wire 1056 (FIGURES 5, 6, 64, 67, 75, 77 and 79) is located in each conduit 84 and 842 to maintain the cement molten during its passage through these conduits. Electric heating elements, that include the heating element 1058 (FIGURE 6), maintain the cement molten during its passage through the toe applicator-support 60. Electric heating elements 1060 (FIGURES 65 and 66) maintain the cement molten during its passage through the heel applicator 816.

Referring to FIGURES 82, 82A and 82B, a shoe assembly is presented bottom-down to the machine. The shoe assembly comprises a shoe insole 1062 located on the bottom of a last 1063, as by being tacked thereto, and a shoe upper 1064 draped loosely over the last. The insole is brought to bear against the tops of the toe rest 88 and the forepart rests 90. The outer periphery of the toe portion of the last is caused to bear against the front retarder 168 and the side retarders 192 so that the retarders act as gauges to accurately locate the shoe assembly in the machine. The toe end of the upper margin is inserted between the open jaws of the front pincers 146 and the forepart portions of the upper margin are inserted between the open jaws of the side pincers 234. The upper is so draped about the last that its margin can extend below the insole an amount that corresponds to the width of the lasting margin to be wiped against the insole.

The control system for the machine is shown in the schematic circuit diagram of FIGURES 81 and 81*b*. The control system includes shuttle valves that are conventional items that have two inlet ports and one exit port. The shuttle valves are so constructed that air of different pressures may enter the two inlet ports and the air emanating from the exit port will have the pressure of the higher of the two pressures entering the inlet port. The control system also includes a sequencing device that is a conventional item so constructed as to offer resistance to the passage of air therethrough so that the air will follow an alternative path other than through the sequencing device if one is available. When such an alternative path is not available or is blocked, the air will go through the sequencing device. Pressure lines are drawn as solid lines and pilot lines are drawn as dashed lines in FIGURES 81*a* and 81*b*.

The machine control system includes a source of air under pressure labelled S and four operator manipulated valves labelled 1066, 1068, 1070 and 1072. In the idle condition of the machine, pressurized air passes from the source S through lines 1074 and 1076, the valve 1072, a line 1078 and a pilot line 1080 to a valve 1082 to maintain this valve in shifted condition.

The operator starts the machine cycle by causing valves 1066 and 1068 to be shifted. This causes air to pass from the line 1074 through a line 1084, the valve 1082, a line 1086, the valve 1066, a line 1088, a valve 1090 and the line 141 (FIGURES 8 and 9) into the motor 138 to thereby raise the piston rod 154 and cause the jaws of the front pincers 146 to close on the toe end portion of the upper margin. Prior to the shifting of the valve 1068, the jaws of the front pincers 146 had been maintained open by air passing from the line 1074 through a line 1092, the valve 1068, a line 1094, a shuttle valve 1096 and a line 1098 to the motor 138. During the actuation of the motor 138 to close the jaws of the front pincers 146, the air above the piston of this motor egresses through the line 1098, the shuttle valve 1096 and the line 1094 and is exhausted to atmosphere from the valve 1068.

If the operator is not satisfied with the way the pincers 146 have grasped the upper he may return the valves 1066 and 1068 to their original positions to thereby open this pincers.

Assuming that he is satisfied with the closure of the front pincers 146 on the upper 1064, the operator causes the valve 1070 to be shifted while the valves 1066 and 1068 remain shifted. This causes air to pass from the valve 1066 through a line 1100, the valve 1070, a line 1102, a valve 1104 and the line 220 (FIGURE 25) to the motors 214 to actuate these motors to raise the cone-shaped cams 248 and cause the jaws 236 and 238 of the side pincers 234 to close and grip the forepart portions of the upper margin.

The shifting of the valve 1070 also causes air to pass from the line 220 through a pilot line 1106 to a sequencing device 1108. After the motors 214 have been actuated, the air passes from the sequencing device 1108 to the left side of a valve 1110 as seen in FIGURE 81a to shift this valve. Prior to the shifting of the valve 1068 and in the idle condition of the machine, air had passed through the valve 1068, the line 1094 and a pilot line 1112 to the right side of the valve 1110 to maintain the valve in its idle position in which position air had passed from the line 1074 through a line 1114, the valve 1110 and a line 1116 to the motors 130 and 210 to thereby cause these motors to respectively maintain the front pincers 146 and the side pincers 234 in their upper positions as depicted in FIGURES 82 and 82B. The shifting of the valve 1110 by the air passing from the sequencing device 1108 enables the air that is above the pistons of the motors 130 and 210 to be vented to atmosphere through the line 1116 and the valve 1110 and enables air to pass from the line 1114 through the valve 1110, a line 1118, branch lines 1120, and low pressure regulators 1122 to the ports 316 (FIGURES 32–35) of each of the valves 286 and through these valves to their ports 320. From the valve ports 320 the air passes at a relatively low pressure that is less than full line pressure as determined by the pressure regulators 1122, through a line 1124 to the motor 130 and through lines 1126 to the motors 210 to actuate these motors. A restrictor valve 1128 in each of the lines 1126 causes the motors 210 to be actuated after the motor 130. The actuation of the motor 130 causes the front pincers 146 to move downwardly and rearwardly away from the last to stretch the toe portion of the upper margin about the toe end of the last and the subsequent actuation of the motors 210 causes these motors to move the side pincers 234 downwardly to stretch the forepart portions of the upper margin about the last. The machine now comes to a stop with the shoe engaging parts in the position shown in FIGURES 83, 83A and 83B.

Referring to FIGURES 83, 83A and 83B, the aforesaid downward and readward movement of the front pincers 146 causes the upper 1064 to be pulled and stretched about the toe end of the last and also in a heel to toe direction with the upper dragging about the front retarder 168. The downward movement of the side pincers 234 causes the upper at the forepart to be stretched tightly about the last 1063 with the upper dragging about the side retarders 192. The universal joints 212 enable the motors 210 and the side pincers 234 carried thereby to swing rearwardly towards the toe of the shoe assembly and inwardly of the shoe assembly during the downward movement of the side pincers. Due to the inclination from the vertical of the motors 210 as shown in FIGURE 1, these motors and the side pincers are normally tilted from the vertical to a position where the cups 262 engage the ledges 264 (FIGURE 28), and the cups ride off the ledges during the toeward movement of the motors 210 and side pincers 234. The collars 280 (FIGURES 29 and 30) move inwardly away from the bolts 282 against the forces of the springs 283 during the inward movements of the motors 210 and side pincers 234. These toeward and inward movements are occasioned by the direction of pull of the front pincers 146, and the mounting of the side pincers 234 that permits their toeward and inward movement prevents the side pincers from fighting against the front pincers during their upper stretching movements. The result of the aforesaid pincers movements is a tight stretching of the upper about the toe and forepart of the last with the topline 1130 (FIGURE 83) of the upper stretching tightly on the last. During the movement of the pincers 146 and 234, the toe end portion of the upper 1064 is forced about the front retarder 168 (FIGURE 83) and forces the front retarder down to some extent against the yieldable force provided by the pressurized air in the cylinder 156, and the forepart portions of the upper are forced about the side retarders 192 (FIGURE 83B) and force the side retarders down to some extent against the yieldable force provided by the pressurized air in the cylinders 186. The front retarder 168, by engaging the toe end of the last, prevents rearward or toeward movement of the shoe assembly during the stretching movement of the front pincers 146, and the side retarders 192, by engaging the sides of the last, prevent lateral movement of the shoe assembly during the stretching movement of the side pincers 234. Since the front pincers 146 and side pincers 234 are driven in their stretching movements by yieldable forces created by air under pressure, they terminate these movements when the stretching forces are equalized by the resistance to stretching of the upper. The portions of the stretched upper margin between the front and side pincers are outspread into dog ears 1132 (FIGURE 83A).

As stated above, the upper is dragged about the front retarder 168 and the side retarders 196 during the stretching movement of the pincers 146 and 234. This precludes the upper from dragging along the marginal edges of the insole 1062 during its stretching movement. Since the insole is usually tacked to the last bottom in locations that are inward of the insole marginal edges, the dragging of the upper along the insole marginal edges would tend to force the insole marginal edges away from the last bottom which would be undesirable during the subsequently performed wiping operation. The pincers 146 and 234 should initially be located close enough to the last 1063 in a horizontal direction to enable them, in their stretching movement, to stretch the upper about the last as described above. However, if the pincers are initially located too close to the last for the particular thickness of upper material used and for the particular resistance to sliding movement or coefficient of friction of upper material used, the upper would grab unduly against the retarders during the stretching of the upper about the last by the pincers. In order to set the initial horizontal distance of the pincers with respect to the retarders for the particular type and thickness of upper utilized, the initial position of the front pincers 146 may be adjusted by manipulating the handle 104

(FIGURES 8–12) to thereby cause the eccentric pin 98 to swing the housing 96 about the axis of the pin 110 and the initial position of the side pincers 234 may be adjusted by manipulating the bolts 282 (FIGURES 29 and 30).

The optimum angle of the path of downward and rearward movement of the front pincers 146 is dependent on the contour of the centerline of the top of the tip portion of the last which is designated by number 1134 in FIGURE 82. This angle should be substantially parallel to the angle that the tip centerline makes with the last bottom at the toe end extremity of the last. In order to adjust this angle of the path of movement of the front pincers 146, the knob 124 (FIGURES 8–10, 12 and 14) is manipulated as described above to move the housing 96 along the bars 88.

The operator may at this time inspect the upper on the last, and if he finds that the top line 1130 is not properly centered or located on the last for the subsequently performed toe wiping operation he may, through actuation of the valves 286, increase or diminish the downwardly directed pressure of each of the pincers 146 and 234 to thereby relocate the position of the upper 1064 on the last 1063.

Figure 34:
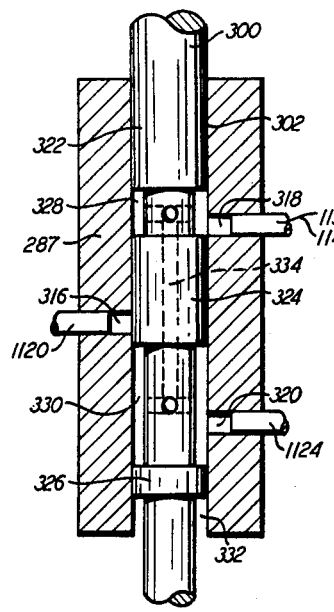
FIGURES 33, 34 and 35 show the valve of FIGURE 32 in three different positions.

Referring to FIGURES 32–35, an actuation of the lever 292 for one of the valves 286 to move the valve from the FIGURE 33 to the FIGURE 34 position provides communication between the ports 318 and 320 and blocks the port 316. When this is done with valve 286 for the motor 130, the low pressure is flowing through the line 1120 for that valve is blocked at the valve and air under full line pressure flows from the line 1074 through a line 1136 and a branch line 1138, the ports 318 and 320 of the valve 286 and the line 1124 to the motor 130 to force the front pincers 146 downwardly under high pressure. When the lever 292 for a valve 286 for one of the motors 210 is caused to move that valve from the FIGURE 33 to the FIGURE 34 position, the low pressure air through the line 1120 for that valve is blocked at the valve and air under full line pressure flows from the line 1136 through a branch line 1140 to the associated motor 210 to force the associated side pincers 234 downwardly under high pressure.

Figure 35:
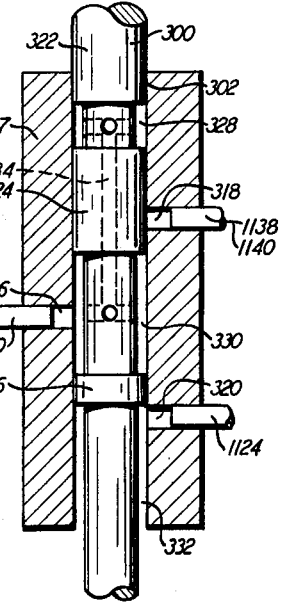

An actuation of a lever 292 to move the associated valve 286 to the FIGURE 35 position provides communication between the port 320 and the annular chamber 332 and blocks the ports 316 and 318. When this is done with the valve 286 for the motor 130, the pressurized air in the motor 130 is vented to atmosphere through the line 1124, the port 320 and the chamber 332 of that valve so that the pressure forcing the front pincers 146 downwardly is released. When the lever 292 for a valve 286 for one of the motors 210 is caused to move that valve to the FIGURE 35 position, the pressurized air in the associated motor 210 is vented to atmosphere through the line 1126, the port 320 and the chamber 332 of that valve, so that the pressure forcing the associated side pincers 234 downwardly is released.

The lever 292 associated with the motor 130 for the front pincers 146 is actuated by moving the handle 298 (FIGURE 1) in a forward-rearward direction and the levers 292 associated with the motors 210 for the side pincers 234 are actuated by moving the handles 296 (FIGURES 1, 28 and 30) in sidewise directions. A movement of the handles 296 in a forward direction from the position they had assumed when the side pincers 234 have completed their downward upper-stretching movement will move the side pincers 234 and the upper margin portions gripped thereby forwardly away from the front pincers 146 with the cup 262 (FIGURE 28) bearing against the ledges 264 and compressing the springs 266 and the mounts 254 swinging about the axes of the pins 256. A movement of the handles 296 in a rearward direction from the positions they had assumed when the side pincers 234 have completed their downward upper-stretching movements will move the side pincers 234 and the upper margin portions gripped thereby rearwardly toward the front pincers 146. During these forward and rearward movements, the tubes 228 will slide in the collars 280.

It can thus be seen that by manipulating the handle 298 the downwardly directed pressure of the front pincers 146 may be increased and released, by manipulating the handles 296 in a sidewise direction the downwardly directed pressures of the side pincers 234 may be increased and released, and by manipulating the handles 296 in a foreward-rearward direction, the forward-rearward positions of the side pincers 234 and the upper margin portions gripped thereby may be adjusted. The operator may employ a combination of these several movements to thereby reposition the upper about the last if this is necessary. Should he desire to adjust the forward-rearward position of the side pincers 234 and the upper margin portions gripped thereby, he will first cause the downwardly directed force of the side pincers to be released so that the gripped margin portion will not at this time be under such a downward force as to cause it to drag unduly along the last periphery during this adjustment. After the side pincers has been adjusted to its desired position, the operator causes the original magnitude of the downwardly directed force to be applied to it. After the upper has been repositioned to the operator's satisfaction, the valves 286 are returned to the FIGURE 33 position so that the pincers 146 and 234 are again forced downwardly under relatively low pressure. The operator manually retains the side pincers 234 in the forward or rearward position to which he had moved them by his forward or rearward movement of the handles 296 until the upper is clamped against movement against the last later in the machine cycle as described below. The springs 136 enable the motor 130 together with the front pincers 146 to shift sidewise about the axes of the pins 132 and 134 (FIGURE 13) should this be necessary due to the repositioning of the upper on the last.

At this time the operator may shift the valves 1066, 1068 and 1070 back to their idle positions to return the machine parts to their idle positions and then start the machine cycle anew if he decides that the upper has not been properly pulled over and stretched about the toe of the last. If the operator is satisfied with the way the upper has been pulled over and stretched about the toe of the last, he causes the valve 1072 to be shifted while the valves 1066, 1068 and 1070 remain in shifted condition. The shifting of the valve 1072 cuts off the air entering the valve 1082 from the pilot line 1080, but this does not, at this time, cause any shifting of the valve 1082.

The shifting of the valve 1072 enables pressurized air to pass from the valve 1072 through a line 1142, a low pressure regulator 1144, a shuttle valve 1146 and a line 1148 to the motors 572 to actuate these motors to lower the toe hold-down 576 against the top of the forepart of the shoe assembly. Prior to the shifting of the valve 1072, the toe hold-down 576 had been maintained in its raised idle position by air passing from the valve 1072 through the line 1078 and a line 1150 to the motors 572. Upon shifting of the valve 1072, the air above the pistons of the motors 572 is exhausted to atmosphere through a quick exhaust valve 1152.

The shifting of the valve 1072 also enables pressurized air to pass from the valve 1072 through the line 1142 and a line 1154 to the motor 348 to cause this motor to swing the lever 356 counterclockwise (FIGURE 39) and move the toe head 346 forwardly until the bar 380 abuts against the lower portion of the front wall 378 of the notch 376. During this forward movement of the toe head 346, the motors 336 swing counterclockwise (FIGURE 1) about the axes of the pins 338. Prior to the shifting of the valve 1072, the toe head 346 had been maintained in its idle rearward position by pressurized air passing from the valve 1072 through the line 1078 and a line 1156 to the motor 348.

The shifting of the valve 1072 also enables pressurized air to pass from the valve 1072 through the line 1142, a line 1158, a pilot line 1160 and a restrictor valve 1162 to the left side of a valve 1164 to shift this valve with the restrictor valve 1162 preventing the shifting of the valve 1164 until after the toe head 346 has been moved forwardly. The shifting of the valve 1164 enables pressurized air to pass from the line 1074 through a line 1166, the valve 1164 and a line 1168 to the motors 336 to actuate these motors to lower their piston rods 340 and thereby swing the toe head 346 counterclockwise (FIGURE 39) about the axes of the pins 364 after the completion of the forward movement of the toe head. During this movement, the block 383 at the front end of the toe head 346 moves downwardly, and this movement is terminated when the block 383 engages a stop 1170 (FIGURE 1) that is mounted to the machine frame 10. During this movement of the toe head 346, the bar 380 will rise upwardly along the front wall 378 of the notch 376 (FIGURE 39). Prior to the shifting of the valve 1072, pressurized air had passed from the valve 1072 through the line 1078, a line 1172 and a pilot line 1174 to a valve 1176 to cause the shifting of the valve 1176 which had enabled air to pass from the line 1172 through the valve 1176 and a pilot line 1178 to the right side of the valve 1164 to cause the valve 1164 to be shifted to its idle condition. With the valve 1164 in its idle condition, air had passed from this valve and a line 1180 to the motors 336 to maintain these motors in their idle condition.

To recapitulate the events taking place in response to the shifting of the valve 1072, the toe hold-down 576 is lowered against the top of the vamp of the shoe assembly as indicated in phantom in FIGURE 83. In addition, the toe head 346 is moved forwardly from its initial out-of-the-way position to a forward working position an amount determined by the forward-rearward position of the front wall 378 of the notch 376. The forward movement of the toe head 346 brings the toe wipers 432, the yoke 490 and the bumpers 536 to a position where they can act on the shoe assembly as indicated in phantom in FIGURE 83. When the toe head has completed its forward movement, the motors 336 are actuated to swing the toe head 346 downwardly about the axes of the pins 364 to thereby lower the toe wipers 432, the yoke 490 and the bumpers 536 to a position wherein the wipers 432 are below the level of the bottom of the insole 1062 an amount that is approximately equal to the thickness of the margin of the upper 1064 (see FIGURE 85). It is desirable, up to this point in the machine cycle, to keep the wipers 432, the yoke 490 and the bumpers 536 in an out-of-the-way position so as not to interfere with the placement of the shoe assembly in the machine and the operation of the above described pulling over operation involving the stretching of the upper about the toe portion of the last and so that the operator will be able to see if the pulling over operation is being properly performed.

The shoe assembly was initially so placed on the insole rest 87 that when the yoke 490 was moved to its forward working position the edges of the last 1063 overlapped the inner wall 1182 of the yoke as indicated in FIGURE 84. When the yoke is forced downwardly by the motors 336, the yoke wall 1182 is initially compressed. When the wall can no longer be compressed, the bight 552 of the yoke flexes rearwardly against the pressure exerted by the motor 506 and the yoke legs 554 flex outwardly against the pressures exerted by the springs 556. After this, the brackets 546 and the spring arms 560 swing outwardly about the pins 562 and move the pins 544 outwardly in the slots 542 against the yieldable forces exerted by the springs 548 with the brackets 546 moving away from the mounts 538 (see FIGURE 46). The yieldable pressures exerted by the motor 506, the springs 548 and 556 and the spring arms 560 cause the yoke 490 to snugly engage the upper 1064 and cause the upper to snugly conform to the shape of the last 1063 during the descent of the yoke 490. The bearing of the toe hold-down 576 against the top of the vamp of the shoe assembly during the descent of the yoke 490 prevents the shoe assembly from shifting with respect to the insole rest 87 at this time.

The parts are so constructed that when the toe wipers 432 are lowered in response to the actuation of the motors 336, they cause the side retarders 192 to press the dog ears 1132 against the bottoms of the toe wipers 432 with the relatively light resilient forces afforded by the cylinders 186 (FIGURE 16). The lowering of the toe wipers 432 also causes the front retarder 168 to press the portion of the upper stretched by the front pincers 146 against the bottoms of the toe wipers 432 immediately to the rear of the vertex 436 (FIGURE 37) of the wipers under the force exerted by the pressurized air in the cylinder 156 (FIGURE 17). During the final increment of the lowering movement of the toe wipers 432, after the retarders 168 and 192 have pressed the upper margin against the toe wiper bottoms, the upper is further stretched about the last, and when the upper can no longer be stretched, the pressed margin portions slip between the toe wiper bottoms and the retarders.

By manipulating the rod 375 (FIGURE 39), the forward-rearward position of the notch wall 376 may be adjusted to thereby adjust the working position of the toe head 346 and of the toe wipers 432 carried by the toe head when the toe head has completed its forward movement in response to the actuation of the motor 348. Therefore the forward-rearward position of the vertex 436 (FIGURES 37 and 85) of the toe wipers 432 may be adjusted so as to ensure that the vertex is located in proper position above the front retarder 168 prior to imparting the below described toe wiping stroke to the toe wipers. If the vertex is located too far forward, the toe wipers 432 would interfere with the last and upper during the descent of the toe wipers from the FIGURE 83 to the FIGURE 84 position. If the vertex is located too far to the rear, then the front retarder 168 will not be effective to press the margin of the upper 1064 against the bottoms of the toe wipers 432, as shown in FIGURE 85.

The rise of the bar 380 into the notch 376 during the swinging of the toe head 346 about the axes of the pins 364 positions this bar against the notch's rear wall 381 (FIGURE 39). The abutment of the bar 380 against the rear wall 381 prevents the reaction forces generated during the wiping stroke of the toe wipers 432 from moving the toe head 346 rearwardly.

Referring to FIGURES 48 and 49, a strap 1184 is bolted to the machine frame 10. A bracket 1186, secured to the strap 1184, supports the valve 1090 and a valve 1188 in vertical alignment. A rod 1190 extends slidably through upper and lower fingers 1192 and 1194 of the bracket 1186. A compression spring 1196 is entwined about the rod 1190 between the upper finger 1192 and an enlarged head 1198 at the top of the rod 1190. A cam 1200 is threaded onto the rod 1190 between the fingers 1192 and 1194. The rod 1190 and the cam 1200 are normally urged upwardly by the spring 1196 to a position wherein the cam bears against the upper finger 1192. In this position, the cam is in engagement with the actuator 1202 of the valve 1090 and is out of engagement with the actuator 1204 of the valve 1188. The rod head 1198 is so located as to be in alignment with the block 383 of the toe head 346 when the block is lowered in response to the actuation of the motors 336 (see FIGURE 1). The lowering of the block 383 therefore causes it to engage the rod head 1198 to lower the rod 1190 and the cam 1200 against the force of the spring 1196. The lowering of the cam 1200 causes it to disengage from the valve actuator 1202 and to engage the valve 1204 to thereby cause a shifting of the valves 1090 and 1188. The shifting of the valves 1090 and 1188 cuts off the pressurized air to the motor 138 through the line 141 and supplies pressurized air to the motor 138 from the line 1074 through a line 1206, the valve 1188, the shuttle valve 1096 and the line 1098 to thereby actuate the motor 138 to open the front pincers 146 to release the toe end portion of the upper margin and the pincers 146 can now be moved downwardly and rearwardly to their lowermost position by the motor 130. This arrangement enables the front pincers 146 to be lowered before it can interfere with the toe wipers 432 and enables the front retarder 168 to engage the upper margin without losing any of the stretch in the upper that had been provided by the front pincers 146.

When the shoe assembly is placed on the rest members 88 and 90 of the insole rest 87 at the beginning of the machine cycle, the forepart portion of the insole 1062 will lie in the predetermined plane of the insole rest members and the heel seat 1260 of the insole will be in a plane that extends upwardly and forwardly from the plane of the forepart portion of the insole as shown in FIGURES 82, 83 and 85, the plane of the insole heel seat 1260 being dependent on the style of the particular shoe assembly being worked on. Before placing the shoe assembly in the machine and starting the machine cycle, the motor 584 (FIGURE 1) is caused to swing the arms 578 together with the heel section 14 about the axes of the pins 580 to bring the heel wipers 894 into a plane that is approximately parallel to the plane of the insole heel seat 1260.

As shown in FIGURES 82A, 83A, and 85A, when the shoe assembly is placed on the insole rest members 88 and 90 at the beginning of the machine cycle, the heel portion of the shoe assembly will extend to one side or the other of the center line of the toe portion of the shoe assembly. The angle that the centerline of the heel portion of the shoe assembly makes with the toe portion of the shoe assembly is dependent on the size and style of the shoe assembly. The side of the centerline of the toe portion of the shoe assembly in which the heel portion of the shoe assembly lies depends on whether a left or right foot shoe is being operated on. Prior to placing the shoe assembly to be operated on in the machine and starting the machine cycle, the screw 710 (FIGURE 58) is rotated by the knob 718 so as to move the stop members 716 away from each other an amount suitable for the particular shoe assembly. A line 1262 extends from the line 1074 to a valve 1264, and lines 1266 and 1268 extend from the valve 1264 to the opposite ends of the motor 722. The valve 1264 is manually actuable to connect either the line 1266 or the line 1268 to the line 1262 Therefore, depending on whether a left or right foot shoe assembly is to be operated on, the motor 722 is actuated by the valve 1264 to swing the adjustment plate 700 and the parts carried thereby one way or the other about the axis of the pin 702 with the tail 708 (FIGURE 59) sliding in groove 706 until a trunnion 720 engages a stop member 716. This causes the heel wipers 894 and the heel clamp pad 920 to be symmetrically disposed with respect to the heel portion of the shoe assembly.

Figure 80:
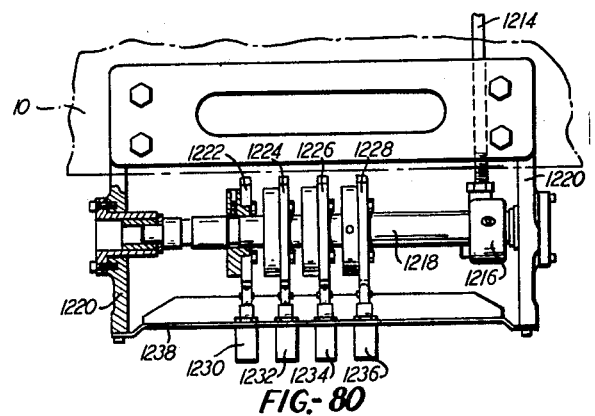
FIGURE 80 is a view taken on the line 80—80 of FIGURE 1.

Referring to FIGURES 1, 41 and 80, a rearwardly extending link 1208 is secured to one of the ears 402 of the primary slide 398 which forms a part of the toe head. The back of the link 1208 is pivoted to one arm of a two armed lever 1210 that is pivoted to a projection 1212 of the frame 10. The top of a link 1214 is pivoted to the other arm of the lever 1210 and extends downwardly thereof. The lower end of the link 1214 is pivoted to a sleeve 1216. The sleeve 1216 is secured to a shaft 1218 that is mounted in a pair of hangers 1220 secured to the frame 10. Four cams 1222, 1224, 1226 and 1228, secured to the shaft 1218, have cam lobes extending partly about their peripheries that are respectively positioned to engage valves 1230, 1232, 1234 and 1236 in response to rotation of the shaft 1218, the valves being mounted on a strap 1238 secured to the hangers 1220.

The aforementioned forward movement of the toe head 346, caused by the actuation of the motor 348, caused a rotation of the shaft 1218 which caused the cam 1222 to engage and shift the valve 1230. The shifting of the valve 1230 enables pressurized air to pass from the line 1074 through a line 1240, the valve 1230 and a pilot ilne 1242 to shift a valve 1244. The shifting of the valve 1244 enables pressurized air to pass from the line 1074 through a line 1246, the valve 1244, a line 1248, a valve 1250 and a line 1252 to the air compartment of an air-oil tank 1254. The air-oil tank 1254 is a conventional item that includes a compartment containing air and a compartment containing substantially incompressible oil with the two compartments being separated by a flexible diaphragm 1256. The motor 614 is maintained in its idle condition by pressurized air passing from the valve 1244 through a line 1258 to this motor. The air in the line 1258 is cut off when the valve 1244 is shifted. The admission of air to the air compartment of the tank 1254 causes the diaphragm 1256 to flex upwardly as seen in FIGURE 81a to thereby force oil from the oil compartment of the tank 1254 through an oil line 1270 and a valve 1272 to the motor 614 to thereby cause the motor 614 to move the heel slide 622 and the parts carried thereby, including the heel rest 732, the heel holddown 778, the heel applicator 816, the heel wipers 894 and the heel clamp pad 920, rearwardly until the bight 922 of the pad 920 engages the heel of the shoe assembly. At this time the heel rest 732 moves below the bottom of the shoe assembly.

Prior to the engagement of the pad bight 922 with the shoe assembly, the piston rod 936 had been projected out of the motor 916 by air entering the motor 916 under relatively low pressure from the line 1074 through a line 1274, a low pressure regulator 1276, a shuttle valve 1278 and a line 1280. The engagement of the pad bight 1278 with the heel of the shoe assembly causes the pad bight to move forwardly against the force of the low pressure air in the motor 916 to thereby move the piston rod 936 together with the strap 938 and cam 966 forwardly to cause the valve actuator 964 to shift the valve 962 (FIGURES 73 and 74). The shifting of the valve 962 enables pressurized air to pass from the line 1158 through a line 1282, the valve 962 and a pilot line 1284 to the left side of a valve 1286 to shift this valve. In the idle condition of the machine, presurized air had passed from the valve 1244 to the right side of the valve 1286 through a pilot line 1288 from the valve 1244, but this air was cut off when the valve 1244 was shifted so that pressurized air entering the valve 1286 from the pilot line 1284 can now shift the valve 1286 from its idle position. The shifting of the valve 1286 enables pressurized air to pass from the line 1074 through a line 1290, the valve 1286, a line 1292, a shuttle valve 1294 and a pilot line 1296 to the valve 1272 to shift the valve 1272. The shifting of the valve 1286 also enables pressurized air to pass from the line 1296 through a pilot line 1298 to the left side of the valve 1250 to shift the valve 1250 from its idle position. The valve 1250 had been maintained in its idle position by pressurized air entering its right side from the line 1078 through a pilot line 1300, but this air had been cut off when the operator had shifted valve 1072. The shifting of the valve 1250 cuts off the flow of pressurized air to the air compartment of the tank 1254. The shifting of the valve 1272 shuts off the flow of oil through the valve 1272 between the oil compartment of the air-oil tank 1254 and the motor 614. Since the oil now trapped between the piston of the motor 614 and the valve 1272 is incompressible, the piston rod 618 of the motor 614 is locked against forward movement. Since the motor 614 is inclined upwardly in its rearward direction (FIGURE 1), the piston rod 618 of the motor 614 can no longer move rearwardly against the force of gravity.

The shifting of the valve 1286 also enables pressurized air to pass from the line 1292 through a line 1302, a valve 1304 and a pilot line 1306 to the right side of a valve 1308 to shift the valve 1308. At the same time, pressurized air passes from the line 1302 through a pilot line 1310 to shift a valve 1312. This enables pressurized air under full line pressure to pass from the line 1074 through a line 1314, the valve 1312, a line 1316, the valve 1308, and a line 1318 to the motor 916 to actuate the motor 916 to move its piston rod 936 and the pad bight 922 of the heel clamp pad 920 (FIGURE 23) forwardly overcoming the low pressure of the air entering the motor 916 through the lines 1274 and 1280. During this forward movement of the piston rod 936, the pins 946 will move forwardly in the slots 944, the parallelism of the axes of the slots 944 and the piston rod 936 permitting this to take place without effecting any relative movement of the heel clamp pad legs 924 so that they remain in their open position.

The air in the pilot line 1306, after shifting the valve 1308, passes through a pilot line 1320 having a restrictor valve 1322 therein to the left side of a valve 1324 to shift the valve 1324. In the idle condition of the machine, air had entered the right side of the valve 1324 from the line 1080 and a pilot line 1326, but this air had been cut off when the operator had shifted the valve 1072. The shifting of the valve 1324 enables pressurized air to pass from the line 1074 through a line 1328, the valve 1324, a line 1330, a valve 1332 and a line 1334 to the air compartment of an air-oil tank 1336. The tank 1336 is constructed similarly to the tank 1254 and also has a compartment containing air and a compartment containing incompressible oil separated by a flexible diaphragm 1338. The motor 602 is maintained in its idle condition by pressurized air passing from the valve 1324 through a line 1340 to the motor 602, which air is cut off upon shifting of the valve 1324 by the pressurized air in the line 1320. The admission of air to the air compartment of the tank 1336 flexes the diaphragm 1338 upwardly as seen in FIGURE 81b to thereby force oil from the oil compartment of the tank 1336 through an oil line 1342 and a valve 1344 to the motor 602 to thereby cause the motor 602 to move the heel head 608 and the parts carried thereby, including the heel rest 732, the heel holddown 778, the heel applicator 816, the heel wipers 894 and the heel clamp pad 920, upwardly until the heel rest 732 and the height sensing pin 738 engage the heel seat portion 1260 of the insole, as indicated in FIGURES 85 and 85A, whereupon the insole forces the height sensing pin 738 downwardly against the force of the spring 746 (FIGURE 62) to shift the valve 734.

The pressurized air passing through the line 1334 in response to the shifting of the valve 1324 also passes through a pilot line 1348 to the right side of a valve 1350 to shift the valve 1350. The shifting of the valve 1350 enables pressurized air to pass from the line 1074 through a line 1352, the valve 1350 and a line 1354 to the motors 50 and 798 to actuate them to project their respective piston rods 52 and 802 outwardly. Prior to the shifting of the valve 1350, the motors 50 and 798 had been maintained in their idle positions by pressurized air passing to these motors from the valve 1350 through a line 1356. The actuation of the motor 50 causes the bar 56 (FIGURE 6) to be raised to force the toe applicator 60 upwardly until its extruding section 72 bears against and supports the margin of the toe portion of the insole 1062. The actuation of the motor 798 causes the heel applicator 816 to swing about the axis of the pin 794 (FIGURE 65) in an upwardly and forwardly directed arc until the applicator plates 826 bear against and support the margin of the heel seat portion 1260 of the insole 1062.

The shifting of the valve 734 in response to the engagement of the height sensing pin 738 with the insole heel seat portion 1260 enables pressurized air to pass from the line 1328 through a line 1358, the valve 734 and a pilot line 1360 to the left side of a valve 1362 to shift this valve. In the idle condition of the machine, pressurized air had passed from the line 1078 through a pilot line 1364 to the right side of the valve 1362 to maintain the valve 1362 in its idle condition. The shifting of the valve 1072 by the operator had shut off the air pressure in the pilot line 1364 so as to enable the pressurized air in the line 1360 to shift the valve 1362 from its idle position. The shifting of the valve 1362 enables pressurized air to pass from the line 1158 through a line 1366, the valve 1362, a line 1368, a shuttle valve 1370 and a pilot line 1372 to the valve 1344 to shift this valve to closed position wherein it blocks the oil line 1342. The shifting of the valve 1362 also causes pressurized air to pass from the line 1368 through a pilot line 1374 to the valve 1332 to shift the valve 1332 to a closed position so as to cut off the flow of air through the line 1334 to the air compartment of the tank 1336. Since the oil trapped between the piston of the motor 602 and the valve 1344 in response to the closure of the valve 1344 is incompressible, the piston rod 604 of the motor 602 is locked against downward movement, and the piston rod 604 is precluded against upward movement by the force of gravity.

The shifting of the valve 734 also enables pressurized air to pass from the line 1360 through a pilot line 1376 to the valve 1304 to shift this valve so as to cut off the pressurized air flowing through the line 1306 to the right side of the valve 1308 and to pass from the line 1376 through a pilot line 1378 to the left side of the valve 1308 to thereby shift the valve 1308. The shifting of the valve 1308 cuts off the flow of air to the motor 916 through the line 1318 and enables air under full line pressure to enter the motor 916 from the valve 1308, a line 1380, the shuttle valve 1278 and the line 1280. The shifting of the valve 1308 also enables pressurized air to pass from the line 1380 through a pilot line 1382 to the left side of the valve 1082 to shift this valve. The shifting of the valve 1082 enables pressurized air to pass from the line 1084 through the valve 1082 and a line 1384 to the motors 934 to actuate the motors 934 to move the legs 924 (FIGURE 73) of the heel clamp pad 920 inwardly. Prior to the shifting of the valve 1082, the motors 934 had been maintained in their idle condition by pressurized air passing from the valve 1082 to the motors 934 through a line 1386. The shifting of the valve 1082 also enables pressurized air to pass from the line 1384 through the line 930 (FIGURE 72) and a low pressure regulator 1388 into the interior of the heel clamp pad 920 to inflate the pad. A relief valve 1390, connected to the line 930 by a line 1392, prevents the pressure of the air in the interior of the pad 920 from exceeding a desired maximum. Therefore, the shifting of the valve 734 causes the bight 922 of the clamp pad 920 to move rearwardly, the legs 924 of the pad 920 to move inwardly and the pad to be inflated so as to cause the pad to engage the heel portion of the upper and press it tightly against the heel portion of the last.

The aforementioned low pressure air is admitted to the motor 506 (FIGURE 46) from the source S through a line 1394 having a low pressure regulator 1396 therein, a shuttle valve 1398 and a line 1400. The shifting of the valve 1082 enables air under full line pressure to pass from the line 1384 through a line 1402, the shuttle valve 1398 and the line 1400 to the motor 506 to cause the motor 506 to urge the bight 522 of the yoke 490 against the toe end of the shoe assembly under heavier clamping pressure. At the same time, air passes from the line 1402 through a line 1404 to the motors 522. This causes the cylinders 526 to be moved inwardly of the pistons 520 against the pressures of the springs 534 and 548. The effect of the admittance of line pressure air to the motor 506 and the admittance of air to the motors 522 is to force the inner wall 1182 (FIGURE 84) of the yoke 490 against the toe and forepart of the shoe assembly under higher pressure than had heretofore been employed. In addition, the inward movement of the cylinders 526 forces the bumpers 536 inwardly against the foreparts of the upper in regions that are rearward of the yoke 490. The bumpers, in engaging the upper, can swing about the pins 544 to accommodate themselves to the curvature of the last.

The shifting of the valve 1082 also enables pressurized air to pass from the line 1384 through a line 1406, a low pressure regulator 1408, a shuttle valve 1410 and a line 1412 to the motors 768 to actuate the motors 768 to lower the heel hold-down 778 against the top of the back 1414 of the last (FIGURE 85) with the hold-down 778 swinging about the pin 780 (FIGURE 57) until it bears squarely against the last top. In the idle condition of the machine, the motors 768 had been maintained in their idle condition by pressurized air passing to these motors from the line 1078 through a line 1416. The shifting of the valve 1072 by the operator had cut off the flow of air to the motors 768 through the line 1416, but this had not affected any movement of the piston rods 771 of these motors or of the heel hold-down 778 due to the frictional resistance to movement of these parts.

The motors 996 and 1046 are maintained in their idle conditions by pressurized air passing from the line 1352 through a line 1418, a spring return valve 1420 and a line 1422 to these motors. From the line 1422 the pressurized air branches off through lines 1423 to pass through a manually actuable valve 1424 for each set of motors 996 and 1046. From each valve 1424 the pressurized air flows to a motor 996 through a line 1426 and to a motor 1046 through a line 1428 and a restrictor valve 1430 whose function will be described below.

The shifting of the valve 1082 also enables pressurized air to pass from the line 1384 through a line 1432 and a pilot line 1434 to the valve 1420 to shift the valve 1420. The shifting of the valve 1420 enables pressurized air to pass through this valve, a line 1436 and branch lines 1438 to the valves 1424. From each valve 1424, the pressurized air passes through a line 1440 to its associated motors 996 and 1046 to thereby concomitantly actuate all of the motors 996 and 1046. The actuation of the motors 996 causes the plungers 1016 of the cement pots 970 (FIGURE 76) to move forwardly until the blocks 1000 (FIGURE 77) engage the studs 1002. The actuation of the motors 1046 causes the valves 1020 to rotate from the FIGURE 79 position to a position wherein the passages 1022 and 1024 are in communication by way of the valve ports 1032 and 1036 and the passages 1026 are blocked. As a result, a predetermined amount of molten cement is forced from the groove 74 (FIGURE 7) of the toe applicator-support 60 against the margin of the toe and forepart of the insole 1062 and a predetermined amount of molten cement is forced from the grooves 844 (FIGURE 64) of the heel applicator 816 against the margin of the heel seat portion 1260 of the insole, the amounts of cement being equal to the volumes of cement that are displaced by the plungers 1016 during their forward movements.

The shifting of the valve 1420 also enables pressurized air to pass from the line 1436 through a pilot line 1442 to the left side of a valve 1444 to shift the valve 1444. In the idle condition of the machine, the valve 1444 had been maintained in its idle condition by pressurized air passing into its right side from the line 1078 through a pilot line 1446. The air in the pilot line 1446 was cut off when the operator shifted the valve 1072. The shifting of the valve 1444 enables pressurized air to pass from the line 1074 through a line 1448, the valve 1444, a line 1449 and a pilot line 1450 to the valve 1104 to shift the valve 1104. The shifting of the valve 1104 cuts off the flow of air to the motors 214 enabling the springs 222 (FIGURE 26) of these motors to lower the piston rods 218 so that the jaws of the side pincers 234 may open under the influence of the elastic bands 242 and thus release the forepart portions of the upper margin that had been gripped by the side pincers 234. After the side pincers 234 release the upper margin they are lowered by further downward movement of the piston rods 216 of the motors 210.

The machine parts now assume the positions with respect to the shoe assembly shown in FIGURES 85 and 85a.

Recapitulating the events that take place from the shifting of the valve 1230 until the FIGURES 85 and 85a position is reached, the motor 614 is actuated to move the heel slide 622, the heel rest 732, the heel hold-down 778, the heel applicator 816, the heel wipers 894 and the heel clamp pad 920 rearwardly from their relatively remote position in a plane that is approximately parallel to the plane of the heel seat portion 1260 of the insole of the shoe assembly being operated on, this plane having been set by the operation of the motor 584 as described above. This rearward movement continues until the bight 922 of the pad 920 engages the heel of the shoe assembly upon which the motor 614 is locked against further movement. In response to the engagement of the pad bight 922 with the heel of the shoe assembly, the motor 916 (FIGURE 73) is actuated to cause its piston rod 936 to move forwardly to move the pad bight 922 forwardly out of engagement with the heel portion of the shoe assembly. During the forward movement of the piston rod 936, the strap 938, the links 940, the links 950, the connections 952 and 954 and the pad 920 are moved in unison with no relative movement between these parts because of the pins 942 sliding in the slots 944 and because the axes of the slots 944 and the piston rod 936 are parallel. Therefore, the pad legs 924 remain in their initial outer position. During the rearward movement of the heel slide 622, the heel rest 732 and the height sensing pin 738 move beneath the heel seat portion 1260 of the insole.

After this the motor 602 is actuated to raise the heel head 608, the heel rest 732, the heel hold-down 778, the heel applicator 816, the heel wipers 894 and the heel clamp pad 920 in a plane that is at right angles to the plane of the heel seat portion 1260 of the insole until the heel rest 732 and the height sensing pin 738 engage the insole heel seat 1260. During this upward movement, the pad bight 922 does not bear against the heel portion of the shoe assembly due to its having been moved forwardly after it had engaged the heel portion of the shoe assembly during its rearward movement. In response to the engagement of the height sensing pin 738 with the insole heel seat 1260, the motor 602 is locked against further upward movement. The parts are so constructed that when this upward movement is terminated the tops of the heel wipers 894 are approximately level with the insole heel seat portion 1260, preferably being spaced below the heel seat portion 1260 an amount that corresponds to the thickness of the margin of the heel portion of the upper 1064. At this time the heel portion of the shoe assembly is supported by the heel rest 732.

From the foregoing it can be seen that by means of the coaction of the heel clamp pad bight 922 and the height sensing pin 738 with the shoe assembly, the heel section 14 is located in the proper wiping position for the below described heel lasting operation regardless of the size and shape of the shoe assembly.

At about the time the heel section 14 has arrived in the wiping position, the motors 50 and 798 are actuated.

The actuation of the motor 50 raises the mount 58 (FIGURES 4-6) to raise the extruding section 72 of the toe applicator-support 60 against the margin of the toe portion of the insole 1062. When the section 72 engages the insole, the pins 62 and 64 will move downwardly with respect to the mount 58 against the force of the springs 64 and 66. The pivot pins 65 and the clearance between the pins 62 and 64 and the mounts 58 through which the pins 62 and 64 extend enable the applicator-support 60 to have limited universal tilting movement with respect to a horizontal plane during its upward movement so that at the end of its upward movement the extruding section 72 will conform to and bear snugly against the insole regardless of whether the insole bottom lies in a true horizontal plane. At the end of the rise of the applicator-support 60, the insole is therefore supported at the margin of its toe and forepart portions by the extruding section 72 and is supported interiorly of its margin by the insole rest members 88 and 90.

The actuation of the motor 798 causes the applicator plates 826 of the heel applicator 816 to be swung counterclockwise (FIGURE 65) about the axis of the pin 794 from the inclined position shown in phantom in FIGURE 85 to the position shown in solid wherein the applicator plates 826 bear against the margin of the insole heel seat portion 1260. During this upward movement, the applicator plates move upwardly and forwardly so as to not interfere with the margin of the heel portion of the upper margin that extends downwardly of the insole as shown in FIGURE 85. The engagement of the applicator plates 826 with the insole causes the pins 820 to move downwardly in the slots 814 and the springs 822 and 824 to be compressed until the applicator plates 826 bear flushly against the insole. Because of the pin and slot connections 814, 820 and the springs 822, 824, the applicator plates 826 are capable of having universal tilting movement when they are forced against the insole and then will bear flushly against the insole under the yieldabe forces provided by the springs 822, 824. At the end of the upward movement of the heel applicator 816, the heel seat portion 1260 of the insole is therefore supported at its margin by the applicator plates 826 and is supported interiorly of its margin by the heel rest 732.

After this the motors 916 and 934 (FIGURE 73) are concurrently actuated. The actuation of the motor 916 causes its piston rod 9936 to move the heel clamp pad bight 922 rearwardly. The actuation of the motors 934 causes their piston rods 948 to move inwardly to thereby, by means of the pin and slot connection 942, 944 swing the links 940 inwardly about the axes of the pins 941. The inward swinging of the links 940, by means of the links 950 and the connections 954, causes the pad legs 924 to move inwardly. The heel clamp pad 920 is thereby caused to move against the heel portion of the upper and press it tightly against the last. At about the same time, pressurized air is admitted into the hollow interior of the heel clamp pad 920 to cause the inner peripheral wall of the pad to expand inwardly against the shoe assembly and thus augment the holding and clamping action of the upper against the last by the pad 920.

At about the same time that the heel clamp pad 920 is forced against the shoe assembly, the motor 506 (FIGURE 46) is actuated to move its piston rod 510 forwardly under greater pressure than had heretofore been provided and the motors 522 are actuated. This causes the inner wall 1182 (FIGURE 84) of the yoke 490 to be forced against the toe and forepart of the shoe assembly under higher pressure than had heretofore been employed to thereby clamp the shoe assembly against movement and also forces the bumpers 536 inwardly against the foreparts of the upper in regions that are rearward of the yoke 490.

At about this time, the heel hold-down 778 is forced against the top of the back 1414 of the last.

Now the motors 996 and 1046 (FIGURES 75–77) of both cement pots 970 are concurrently actuated to apply predetermined amounts of molten cement against the margin of the toe and forepart portion of the shoe insole and against the margin of the heel seat portion of the shoe insole. At about the same time, the side pincers 234 are caused to open to release the forepart portions of the upper margin and the side pincers are caused to move downwardly of the shoe assembly so as to not interfere with the toe wipers 432 during the below described toe wiping operation. The portions of the upper that had been stretched about the last by the side pinchers 234 are now held in place by the bumpers 536.

In the FIGURES 85 and 85a positions, the toe and forepart portions of the upper are maintained in the position to which they had been hitherto stretched about the last by the toe pincers 146 and the side pincers 234 by means of the clamping pressure exerted by the yoke 490, the pressures exerted by the bumpers 536 and the pressure exerted by the toe hold-down 576.

The aforementioned shifting of the valve 1444 also caused pressurized air to pass from the line 1449 to the motors 906 to actuate these motors. Prior to the shifting of the valve 1444, the motors 906 had been maintained in their idle conditions by pressurized air passing to them from the valve 1444 through a line 1452. The actuation of the motors 906 causes the bridge 908 (FIGURE 70) to move rearwardly to thereby cause the pins 914 (FIGURE 69) to move rearwardly. The rearward movement of the pins 914 causes the heel wipers 894 to move rearwardly and inwardly in a heel wiping stroke with the wiper surfaces 896 approaching each other during this stroke to intersect the heel portion of the upper margin, move under the insole and wipe the upper margin against the insole heel seat portion 1260. This causes the wiped upper margin to be attached to the insole heel seat through the cement that had been applied to the insole heel seat. The configuration of the cam tracks 900 and 902 determines the specific path of rearward and inward swinging movement of the heel wipers during their heel wiping stroke, and the pins 914 move outwardly in the slots 912 during the heel wiping stroke to permit the inward movement of the wiper surfaces 896.

The aforementioned shifting of the valve 1444 also caused pressurized air to pass from the line 1449 through a pilot line 1454 and a restrictor valve 1456 to the left side of a valve 1458 to shift the valve 1458. In the idle condition of the machine, the valve 1458 had been had been maintained in its idle condition by pressurized air passing from the line 1446 and a pilot line 1460 to the right side of the valve 1458. The air in the line 1460 was cut off when the operator shifted the valve 1072 earlier in the machine cycle. The shifting of the valve 1458 enables pressurized air to pass from the line 1074 through a line 1462, the valve 1458, a line 1464, a pilot line 1466 and a restrictor valve 1467 to the left side of the valve 1350 to shift the valve 1350. The air that had previously entered the right side of the valve 1350 through the line 1348 was cut off when the valve 1332 was closed by the air in the line 1374 thereby enabling the valve 1350 to be shifted at this time by the air in the line 1466. The shifting of the valve 1350 shuts off the flow of air going from this valve to the motor 798 through the line 1354 and again causes pressurized air to enter the motor 798 through the line 1356 which actuates the motor 798 to lower the heel applicator 816 back to its idle position out of the path of the oncoming heel wipers 894.

As shown in FIGURES 71 and 72, the bridge 908 carries a cam 1468 and the back up plate 876 carries a valve 1470. The cam 1468 and the valve 1470 are in alignment so that the valve 1470 is opened by the cam 1468 during the heel wiping stroke of the heel wipers 894. The opening of the valve 1470 enables pressurized air to pass from the line 1074 through a line 1472, the valve 1470 and a line 1474 to the motor 748 (see FIGURE 61) to actuate this motor to lower the heel rest 732 and the height sensing pin 738 out of the path of the oncoming heel wipers 894. Prior to this actuation of the motor 748, the motor 748 had been maintained in its idle condition with the heel rest 732 and the height sensing pin 738 in their raised position by pressurized air entering the motor 748 from the line 1078 through a line 1476. While the shifting by the operator, earlier in the machine cycle, of the valve 1072 had cut off the flow of air to the motor 748 through the line 1476, this did not effect any movement of the toggle links 754 and 756 (FIGURE 61) or the heel rest 732 and height sensing pin 738. The lowering of the heel rest 732 and the height sensing pin 738 enables the spring 746 to move the plunger stem 746 away from the valve 734 which enables the valve 734 to return to its original closed position. The closing of the valve 734 cuts off the flow of air from the valve 734 through the line 1360 to the left side of the valve 1362, but this does not effect a shifting of the valve 1362 because there is no pressurized air entering the right side of the valve 1362 through the line 1364 at this time.

A valve 1478 (FIGURES 1 and 56) is mounted to one of the uprights 766 and is in alignment with a piston rod 910 of one of the motors 906. At the end of the heel wiper stroke, the valve 1478 is opened by its associated piston rod 910. The opening of the valve 1478 enables pressurized air to pass under full line pressure from the source S through a line 1480, the valve 1478, a line 1482, the shuttle valve 1410, and the line 1412 to the motors 768 to cause the motors 768 to force the heel hold-down 778 downwardly under greater pressure than had heretofore been applied by the heel hold-down. This causes the heel portion of the shoe assembly to be forced against the heel wipers 894 under bedding pressure to thereby iron the wiped heel portion of the upper margin against the heel seat portion 1260 of the insole.

The mounting for the back-up plate 876 causes it to be yieldably urged upwardly by the springs 870 and 884 and to be capable of limited universal movement about the transverse axes of the pins 866 and the longitudinal axis of the bar 880 (see FIGURES 55, 56 and 60). Therefore, if the heel wipers 894 during the heel wiping stroke do not move in a plane that is coplanar with the plane formed by the bottom of the heel seat portion 1260 of the insole, the heel wipers, which are slidably mounted on the back-up plate 876, will shift against the forces of the springs 870 and 884 until they assume this coplanar relationship.

The aforementioned shifting of the valve 1458 had also caused pressurized air to pass from the line 1462 through the valve 1458 and the line 1464 to the motors 396 and 484 to actuate these motors. Prior to the shifting of the valve 1458, the motors 396 and 484 had been maintained in their idle condition by pressurized air passing to these motors from the valve 1458 through a line 1484.

The actuation of the motors 396 causes forward movement of the primary slide 398, the secondary slide 410 and the links 426 (FIGURES 37–41) which in turn causes the toe wiper cams 382 and the toe wipers 432 carried thereby to move with respect to the block 383 in a toe wiping stroke with the pins 384 riding in the cam tracks 386 and 388 in a path determined by the configuration of the cam tracks. The configuration of the cam tracks is such that, when the pins 384 are at the forward or left end (FIGURE 37) of the cam tracks and have relative movement toward the rear of right end, the toe wipers 432 are first swung toward each other about the vertex 436 in an initial closing movement through an arc of about 4 degrees for each wiper or a total of 8 degrees. This is followed by a compound movement comprising a concomitant forward translatory movement of the toe wipers and an inward swinging movement of the toe wipers about the vertex. In setting up the machine for the particular size and shape of shoe assembly to be operated on, the knob 420 is rotated to shift the secondary slide 410 along the gib plate 404 of the primary slide 398 and thus swing the toe wipers 432 about the vertex 436 within the initial closing movement range permitted by the above described cam track configuration so that the divergent wiper surfaces 434 will be spaced close to the sides of the shoe assembly when the toe wipers 432 are positioned to start their toe wiping stroke, thereby enabling the toe wipers to move only a short distance before engaging the upper. The concomitant forward translation and inward swinging movement of the toe wipers causes them to engage the toe and forepart portions of the upper margin, while the upper is stretched tightly about the last, to wipe or fold the upper margin against the insole 1062 and to bond the upper margin to the insole by means of the cement that had been applied to the margin of the toe and forepart portions of the insole. At this time, the bar 380 (FIGURE 39) is bearing against the rear wall 381 of the notch 376 to preclude rearward movement of the toe head 346 in response to the reaction forces created during the toe wiping stroke.

The aforementioned shifting of the valve 1350, in response to the shifting of the valve 1458, which had cut off the flow of pressurized air in the line 1356 and readmitted pressurized air to the line 1354 had actuated the motor 50 to return it to its idle position and lower the extruding section 72 (FIGURE 6) of the toe applicator 60 out of the path of the oncoming toe wipers 432.

During the wiping stroke of the toe wipers 432, the intermediate side surfaces 438 of the toe wipers separate to provide a gap therebetween. The actuation of the motor 484 causes the bedding tool 470 to be moved forwardly under the yieldable force afforded by the pressurized air in the motor 484 so that the bedding tool nose 472 continuously bears against the wiper surfaces 438 during the toe wiping stroke to assist in the operation of wiping the toe end portion of the upper margin against the insole. At the end of the toe wiping, the bedding tool nose 472 will fill most, if not all, of the gap formed by the separation of the wiper surfaces 438, as indicated in FIGURE 86, and underlie the wiped toe end portion of the upper margin.

The actuation of the motors 396 caused a forward movement of the link 1208 (FIGURES 1 and 41) which caused a further rotation of the shaft 1218 so as to cause the cams 1224, 1226 and 1228 (FIGURE 80) to respectively engage and shift the valves 1232, 1234 and 1236.

Up to this point in the machine cycle, the side retarders 192 were urged upwardly under relatively low pressure by pressurized air passing from the line 1074 through a line 1486, a low pressure regulator 1488, a shuttle valve 1490 and a line 1492 to the cylinders 186. The shifting of the valve 1232 enables air to pass from the valve 1082 throught the line 1432, a high pressure regulator 1494, the valve 1232, a line 1496, the shuttle valve 1490 and the line 1492 to the cylinders 186 to force the side retarders 192 upwardly under higher pressure than had heretofore been applied. The pressure applied by the side retarders 192 in forcing the dog ears 1132 against the bottoms of the toe wipers 432 had been relatively light prior to the toe wiping stroke so as to enable the upper margin to slip to some extent between the retarders and the wiper bottoms during the lowering of the toe wipers in response to the actuation of the motors 336. The higher pressure is applied by the side retarders 192 during the wiping stroke to hold the dog ears 1132 more forcefully against the toe wiper bottoms so as to preclude slippage of the upper on the last while the toe wipers are taking control of the upper margin from the side retarders during the toe wiping stroke.

Up to this point in the machine cycle, the front retarder 168 was forced upwardly to force the upper margin against the bottoms of the toe wipers 432 adjacent the wiper vertex 436 by pressurized air entering the cylinder 156 from the line 1074 through a line 1498, the valve 1234 and a line 1500. The shifting of the valve 1234 during the toe wiping stroke shuts off the flow of air to the cylinder 156 to thereby terminate the upwardly directed force applied by the front retarder 168. This takes place after the toe wipers 432 have crossed under the bottom of the insole so that the stretching of the upper about the last that had been maintained by the front retarder is taken over by the toe wipers.

Up to this point in the machine cycle the motor 26 had been maintained in its idle condition to keep the insole rest 87 in its upper position by pressurized air passing from the line 1074 through a line 1502, a valve 1504 and and a line 1506 to the motor 26. The shifting of the valve 1236 enables pressurized air to pass from the line 1240 through a line 1508, the valve 1236 and a pilot line 1510 to shift the valve 1504. The shifting of the valve 1504 enables pressurized air to pass from the line 1502 through the valve 1504 and a line 1512 to the motor 26 to actuate the motor 26 to lower the insole rest 87 out of the path of the oncoming toe wipers 432.

Referring to FIGURES 37, 39 and 46, a rib 1513, secured to the secondary slide 410, has a control cam 1514 mounted thereon for forward-rearward adjustment by screws 1515 that extend through slots 1517 in the rib 1513 and are threated into the cam 1514. The cam 1514 is in alignment with the actuators of a pair of control valves 1516 and 1518 that are mounted on a strap 1520. The strap 1520 is secured to the cover block 478. The valve 1516 is located rearwardly of the valve 1518 so that the valve 1516 is shifted in the middle of the toe wiping stroke and the valve 1518 is shifted at or near the end of the toe wiping stroke.

Up to this point in the machine cycle, the knife 448 had been maintained in its idle condition by pressurized air passing from the line 1074 through a line 1522, a valve 1524 and a line 1526 to the motors 462. The valve 1524 initially had been maintained in position to permit the flow of air therethrough to the line 1526 by pressurized air passing through the line 1078 and a pilot line 1528 to the right side of the valve 1524. Earlier in the machine cycle, the operator had cut off the flow of air through the line 1528 when he had shifted the valve 1072, but this had not caused any shifting of the valve 1526. The shifting of the valve 1516 by the cam 1514 during the toe wiping stroke enables pressurized air to pass from the line 1158 through a line 1530, the valve 1516 and a pilot line 1532 to the left side of the valve 1524 to shift the valve 1524. The shifting of the valve 1524 enables pressurized air to pass from the line 1522 through the valve 1524, a line 1534, and an adjustable restrictor valve 1535 in the line 1534 to the motors 462 to actuate the motors 462 to project the knife 448 forwardly while it is guided by the slots 452 in the toe wipers 432 (see FIGURES 86 and 86A). This causes the knife edge 450 to be projected forwardly of the vertex 436 of the toe wipers at about the time or shortly after the vertex crosses under the insole due to the valve 1524 being shifted after the commencement of the toe wiping stroke. The knife edge 450 therefore cuts into the pleated upper material as it is gathered by the toe wipers at the toe end of the shoe by the inward movement of the toe wipers to thereby prevent the creation of excess stresses in the material.

The speed of forward movement of the knife 448 can be adjusted by adjusting the restrictor valve 1535 and the time, after the commencement of the wiping stroke of the toe wipers 432, that the knife commences its forward movement can be adjusted by adjusting the forward-rearward position of the cam 1514 with respect to the rib 1513. The desired knife speed is dependent on the nature, resistance to cutting and thickness of the upper material gathered by the toe wipers and the density of the gathered material. With a sharp or pointed toe shoe it is desired to have the knife commence its cutting action immediately after the toe wipers have begun to gather the upper material. With more rounded toe shoes, the knife should commence its cutting action somewhat later after the toe wipers have commenced to gather the upper material. By adjusting the valve 1535 and/or the cam 1514, the ideal speed and time of cutting of the knife can be provided for the particular style of shoe and type of upper material being worked on.

The shifting of the valve 1518 by the cam 1514 at or near the end of the toe wiping stroke enables pressurized air under full line pressure to pass from the line 1158 through a line 1536, the valve 1518, a line 1538, the shuttle valve 1146 and the line 1148 to the motors 572 to cause the motors 572 to force the toe hold-down 576 against the shoe assembly under full line pressure. This causes the toe and forepart portions of the now wiped toe and forepart portions of the upper margin to be forced downwardly against the toe wipers 432 and the bedding tool 470 under increased bedding pressure. The application of the bedding pressure to force the wiped upper margin against the toe wipers and the bedding tool serves to flatten the wiped upper margin against the insole and to ensure that the upper margin is effectively bonded to the insole by the cement interposed between the upper margin and the insole. With the bedding tool 470 in the FIGURES 86 and 86A position at the completion of the toe wiping stroke, the bedding pressure is applied by the bedding tool at the toe end extremity of the wiped upper margin despite the gap formed between the toe wiper intermediate side surfaces 438 during the toe wiping stroke. Since the bedding tool was yieldably urged forwardly against the surfaces 438 during the toe wiping stroke by the pressurized air in the motor 484, at the end of the toe wiping stroke it will fill the greater part, if not all, of the gap formed between the surfaces 438. The resistance by the bedding tool 470 to the application of the bedding pressure is borne by the bars 442, the knife 448 and the block 383 (see FIGURE 42).

Thus, during the toe wiping stroke, the toe applicator-support 60 is lowered out of the path of the oncoming toe wipers 432, the bedding tool 470 is yieldably urged forwardly against the intermediate side surfaces 438 of the toe wipers as the surfaces 438 separate, the side retarders 192 are caused to be forced upwardly under higher pressure, the upward pressure applied to the front retarder 168 is relieved, the insole rest 87 is lowered out of the path of the oncoming toe wipers 432, and the knife 448 is caused to move forwardly, after the toe wipers have gone through enough of the toe wiping stroke to start gathering the pleated upper marginal material, and cuts into this material. At or near the end of the toe wiping stroke, bedding pressure is applied by the toe hold-down 576 against the toe and forepart position of the shoe assembly while this portion of the shoe assembly is supported by the toe wipers 432 and the bedding tool 470.

At this time the shoe assembly engaging parts assume the position shown in FIGURES 86 and 86A.

After the lapse of a predetermined time interval the operator causes the valves 1066, 1068, 1070, and 1072 to return to their idle positions to thereby return the machine parts to their idle condition which releases the toe lasted and heel seat lasted shoe assembly from the machine.

During the return of the machine parts to their idle positions, the air in the pilot line 1434 is cut off so that the spring return valve 1420 is shifted back to its initial position to cause pressurized air to again enter the motors 996 through the lines 1426 and the motors 1046 through the lines 1428 and the restrictor valves 1430. The actuation of the motors 996 retracts the plungers 1016 to return them to their FIGURE 76 position and the actuation of the motors 1046 rotates the valves 1020 to their FIGURE 79 position to again provide communication between the passages 1022 and 1026. This serves to cause the valve 1020 to again block the passage 1024 and thus block movement of the cement in the conduits 84 and 842, the toe applicator-support 60 (FIGURE 6) and the heel applicator 816 (FIGURES 64 and 68) and enables molten cement to flow through the ports 1034 and 1032 of the valves 1020 and fill up the portions of the bores 1018 that are forward of the plungers 1016. The restrictor valves 1430 cause the motors 1046 to be moved at a slower rate than the motors 996 so that the valves 1020 do not block the passages 1024 until after the plungers 1016 have started their rearward retractive movement. This causes the cement that lies in the groove 74 (FIGURES 6 and 7)

of the toe applicator 60 to be sucked into the orifices 76 and the cement that lies in the troughs 844 (FIGURES 64 and 68) of the heel applicator 816 to be sucked into the orifices 860 so that the cement will not drip out of the groove 74 and the troughs 844 onto the machine parts between machine cycles. The timing by the restrictor valves 1430 of the actuations of the motors 996 and 1046 is such as to empty the groove 74 and the troughs 844 of cement but retain cement in the entire lengths of the holes 76 and the passages 860 so that the cement in the holes 76 and the passages 860 can be forced into the groove 74 and the troughs 844 and against the insole bottom during the next machine cycle.

When the machine is in its idle position, the motors 996 and 1046 may be manually actuated to manually pump cement into the conduits 84 and 842 and the applicators 60 and 816 as described above, by shifting the manually actuable valves 1424.

The machine parts are so constructed that the actuation of the motor 614 (FIGURE 54) to move the heel slide 622 and the parts carried thereby rearwardly until the bight 922 of the heel clamp pad 920 engages the heel of the shoe assembly will enable the pad 920 to go through a zone of movement which will accommodate the largest and smallest desired shoe assembly. That is, the stroke of the motor 614 is such that when the piston rod 618 is fully retracted into the motor 614 in a starting position the pad bight 920 will be forward of the heel portion of the longest shoe assembly that the machine is intended to work on and the full projection of the piston rod 618 out of the motor 614 in a terminal position will enable the pad bight 920 to engage the heel portion of the shortest shoe assembly that the machine is intended to work on.

The operating cycle described above takes place only when causing the machine to operate on its first shoe assembly with the piston rod 618 fully retracted into the motor 614 in the starting position as shown in FIGURE 54. In the idle position of the machine the piston rod 640 is projected out of the motor 638 to cause the brake 642 to lock against the shaft 628 (FIGURES 50 and 52) by pressurizing air passing from the line 1074 through a line 1540, a spring return valve 1542, a line 1544, a manually actuable valve 1546 and a line 1548 to the motor 638. When, during the machine cycle, pressurized air was caused to flow through the line 1252 to the air compartment of the air-oil tank 1254 to thereby actuate the motor 614 to move the heel slide 622 and the heel clamp pad 920 rearwardly until the pad 920 reached a working position in engagement with the shoe assembly, air had also flowed from the line 1252 through a pilot line 1550 to the valve 1542 to shift the valve 1542 and thus cut off the flow of pressurized air to the motor 638 and enable the return spring 1552 (FIGURE 81a) of the motor 638 to lower the piston rod 640 and release the brake 642 from the shaft 628. The shifting of the valves 1066, 1068, 1070 and 1072 by the operator at the end of the machine cycle cuts off the flow of air in the pilot line 1550 so that the valve 1542 returns to its idle position and pressurized air again flows through the line 1548 to the motor 638 to lock the brake 642 against the shaft 628 (FIGURES 50 and 52) in the working position. The actuation of the motor 614 to move the slide 622 rearwardly had caused the hangers 632 and 634 to move rearwardly along the shaft 628 with the hanger 632 pushing the brake 642, the bracket 636 and the motor 638 rearwardly. Therefore the portion of the shaft 628 engaged by the brake 642 at the end of the machine cycle will be dependent on the position of the slide 622 at the time its rearward movement was stopped in its working position by the engagement of the pad bight 920 with the heel portion of the shoe assembly, and this position is dependent on the length of the shoe assembly.

The actuation of the motor 614 to move the slide 622 forwardly by the admission of air into this motor through the line 1258, pursuant to the operator returning the valve 1072 to its idle position at the end of the machine cycle, causes the hanger 634 to move forwardly against the force of the spring 645 until the stud 648 (FIGURE 50) engages and shifts the valve 646, the valve 646 being locked against movement at this time by the brake 642. During the forward movement of the slide 622, the oil in the motor 614 flows from this motor through the line 1270 and the now open valve 1272 (the valve 1272 having been opened pursuant to the return by the operator of the valve 1072 to its idle position) back to the oil compartment of the tank 1254. The shifting of the valve 646 enables pressurized air to pass from the line 1078 (which was pressurized in response to the return by the operator of the valve 1072 to its idle position) through a line 1554, the valve 646, a line 1556, the shuttle valve 1294 and the pilot line 1296 to shift to shift the valve 1272 to closed position and thus cut off the flow of incompressible oil between the motor 614 and the oil compartment of the tank 1254. Due to the incompressible nature of the oil trapped between the motor 614 and the valve 1272 and the inclination of the motor 614, the motor 614 stops its rearward movement with the pad 920 in an intermediate position in response to the shifting of the valve 646 despite the continued admission of pressurized air to the motor 614 through the line 1258. During the next machine cycle, the motor 638 will again be actuated to release the brake 642 from the shaft 628 at the same time as the motor 614 is actuated to move the slide rearwardly from the intermediate position and the slide will stop its rearward movement and the brake 628 will again look against the shaft 628 in response to the engagement of the heel clamp pad bight 922 with the heel portion of the shoe assembly.

Thus the amount of the forwardly directed retractive movement of the slide 622 and the parts carried thereby is determined by the relatively short distance between the valve 646 and the stud 248 as seen in FIGURE 50 and not by the longer distance that would be traversed by the slide 622 if the piston rod 618 were fully retracted into the motor 614 to reach the FIGURE 54 position. In the following machine cycles, assuming a shoe assembly of the same length as or a shorter length than the shoe assembly of the preceding machine cycle is being operated on, the slide 622 will start its rearward movement towards the heel of the shoe assembly from the intermediate position in which it has been stopped by the engagement of the stud 648 with the valve 646 during the preceding machine cycle. When, in this next machine cycle, the operator shifts the valve 1072, the air flowing to the valve 1272 from the line 1078 through the valve 646 is cut off which causes the valve 1272 to open so that oil can flow into the motor 614 from the oil compartment of the tank 1254 to move the slide 622 rearwardly. This arrangement enables the slide 622 to move a relatively short distance during succeeding machine cycles, to thereby shorten the machine cycles, so long as a longer shoe assembly is not placed in the machine.

If it is desired in a certain machine cycle to operate on a longer shoe assembly than that of the preceding machine cycle, the manually actuable valve 1546 is shifted to closed position by the operator which enables the return spring 1552 of the motor 638 to release the brake 642 from the shaft 628. This in turn enables the spring 646 to move the bracket 636 and the valve 646 forwardly along the shaft 628 toward the hanger 632 to thereby close the valve 646 and cut off the air going to the valve 1272 from the valve 646 through the line 1556, the shuttle valve 1294 and the pilot line 1296. The valve 1272 is therefore opened so that oil can flow from the motor 614 through the valve 1272 to the tank 1254 and the pressurized air in the line 1258 can cause the motor 614 to move the slide 622 to its most forward position as shown in FIGURE 54.

In a shoe having a relatively low heel, when the shoe assembly is placed in the insole rest 87, as shown in FIGURE 85, the insole heel seat portion 1260 will be located a relatively small distance above the plane in which the forepart and toe portion of the insole lies. In a shoe having a relatively high heel, when the shoe assembly is placed on the insole rest 87, the insole heel seat portion 1260 will be located a relatively large distance above the plane in which the forepart and toe portion of the insole lies. The machine parts are so constructed that the actuation of the motor 602 (FIGURE 51) to raise the heel head 608 and the parts carried thereby until the height sensing pin 738 engages the insole heel seat portion 1260 will enable the height sensing pin to move through a zone of movement between a starting position and a terminal position which accommodates shoe assemblies having the lowest and highest desired heel.

The arrangement for actuating the motor 602, described above, takes place only when causing the machine to operate on its first shoe assembly with the piston rod 606 fully retracted into the motor 602 in the starting position as shown in FIGURE 51. In the idle position of the machine, the piston rod 696 is projected out of the motor 692 to cause the brake 698 to lock against the shaft 682 (FIGURE 50) by pressurized air passing from the line 1340, that leads from the valve 1324 to the motor 602, through a line 1558, a manually actuable valve 1560 and a line 1562 to the motor 692. When, during the machine cycle, the valve 1324 was shifted to cause oil to be forced from the tank 1336 through the oil line 1342 to thereby actuate the motor 602 to move the heel head 608 and the height sensing pin 738, the air in the lines 1340, 1558 and 1562 going to the motor 692 had been cut off to enable the return spring 1564 (FIGURE 81a) of the motor 692 to move the piston rod 966 forwardly and release the brake 698 from the shaft 682. The shifting of the valves 1066, 1068, 1070 and 1072 by the operator at the end of the machine cycle causes the valve 1324 to be shifted to its idle position by pressurized air entering the right side of this valve through the line 1326 so that pressurized air again flows to the motor 692 from the valve 1324 to lock the brake 698 against the shaft 682. The actuation of the motor 602 to raise the head 608 had caused the bolts 658 and 672 (FIGURES 50 and 53) to raise the bracket 662, the shaft 682 and the valve 678. Therefore the portion of the shaft 682 engaged by the brake 698 at the end of the machine cycle with the height sensing pin 738 in a working position will be dependent on the position of the head 608 at the time its upward movement was stopped by the engagement of the height sensing pin 738 with the insole heel seat portion 1260, and this position is dependent on the height of the heel of the shoe assembly. The actuation of the motor 602 to move the head 608 downwardly by the admission of air into this motor through the line 1340, pursuant to the operator returning the valve 1072 to its idle position at the end of the machine cycle, causes the bar 658 to be moved downwardly of the now stationary upper limb 664 of the bracket 662 against the force of the spring 670 until the bolt head 668 (FIGURE 50) engages and shifts the valve 678, the valve 678 being locked against movement at this time by the brake 698. During the lowering of the head 608, the oil in the motor 602 flows from this motor through the line 1342 and the now open valve 1344 (the valve 1344 having been opened pursuant to the return by the operator of the valve 1072 to its idle position) back to the oil compartment of the tank 1336. The shifting of the valve 678 enables pressurized air to flow from the line 1340 through a line 1566, the valve 678, a line 1568, the shuttle valve 1370 and the pilot line 1372 to shift the valve 1344 to closed position and thus cut off the flow of incompressible oil between the motor 602 and the oil compartment of the tank 1336. Due to the incompressible nature of the oil trapped between the motor 602 and the valve 1334 and the heightwise inclination of the axis of the motor 602, the motor 602 stops its downward movement in response to the shifting of the valve 1344 despite the continued admission of pressurized air to the motor 602 through the line 1340 to place the height sensing pin 738 in an intermediate position. During the next machine cycle, the motor 692 will again be actuated to release the brake 698 from the shaft 682 at the same time as the motor 602 is actuated to raise the head 608 together with the height sensing pin from its intermediate position, and the head will stop its upward movement and the brake 698 will again lock against the shaft 682 in response to the engagement of the height sensing pin 738 with the insole heel seat portion 1260.

Thus the amount of the upwardly directed movement of the head 608 and the parts carried thereby is determined by the relatively short distance between the valve 678 and the bolt head 668 as seen in FIGURE 50 and not the longer distance that would be traversed by the head 608 if the piston 606 were fully retracted into the motor 602 to reach the FIGURE 51 position. In the following machine cycles, assuming a shoe assembly having the same or a higher heel height than the shoe of the proceding machine cycle is being operated on, the head 608 will start its upward movement toward the shoe assembly from the intermediate position in which it has been stopped by the engagement of the bolt head 668 with the valve 678 during the preceding machine cycle. When, in this next machine cycle, the operator shifts the valve 1072 to cause the shifting of the valve 1324 by means of air in the pilot line 1320, the air flowing to the valve 1344 from the valve 1324 through the valve 678 is cut off which causes the valve 1344 to open so that oil can flow into the motor 602 from the oil compartment of the tank 1336 to raise the head 608. This arrangement enables the head 608 to move a relatively short distance during succeeding machine cycles, to thereby shorten the machine cycles, so long as a shoe assembly having a lower heel height is not placed in the machine.

If it is desired in a certain machine cycle to operate on a shoe assembly having a lower heel height than that of the preceding machine cycle, the manually actuable valve 1560 is shifted to closed position which enables to return spring 1564 of the motor 692 to release the brake 698 from the shaft 682. This in turn enables the spring 670 to move the bracket 662, the shaft 682 and the valve 678 downwardly until the bracket limb 664 hits the bolt head 668 to thereby cut off the air going to the valve 1344 from the valve 678 through the line 1568, the shuttle valve 1370 and the pilot line 1372. The valve 1344 is therefore opened so that oil can flow from the motor 602 through the valve 1344 to the tank 1336 and pressurized air in the line 1340 can cause the motor 602 to move the head 608 to its lowermost position as shown in FIGURE 51.

The bolt 672 (FIGURE 50) serves to stabilize the bracket 662 and prevent its twisting about the axis of the shaft 682.

Summarizing the events taking place during a machine cycle, the shoe assembly is presented to the machine in the position shown in FIGURES 82, 82A and 82B. The front pincers 146 are caused to close on the toe end portion of the upper margin, after which the side pincers 234 are caused to close on the forepart portions of the upper margin. Then the front pincers 146 are caused to move downwardly and forwardly to stretch the toe portion of the upper margin about the last, after which the side pincers 234 are caused to move downwardly to stretch the forepart portions of the upper margin about the last. During their downward pulling movement the side pincers move toewardly and inwardly, and the parts reach the position drawn in solid lines in FIGURES 83, 83A and 83B when the front and side pincers have completed their downward movement with the portions of the upper margin between the front and side pincers outspread into dog ears 1132.

At this time the operator may inspect the upper to see if it is properly centered or located on the last for the subsequently performed toe wiping operation. If necessary, the operator may selectively and individually increase or diminish the downwardly directed pressure of each of the pincers 146 and 234 to thereby relocate the position of the upper on the last. The operator may also move the side pincers 234 towards or away from the toe end extremity of the shoe assembly to adjust the position of the forepart portions of the upper margin that are gripped by the side pincers. When the upper has been positioned to the operator's satisfaction, the front and side pincers are again forced downwardly under the original pressures.

After this, the toe hold-down 576 is lowered against the top of the forepart of the shoe assembly and the toe head 346 is moved forwardly from its initial out-of-the-way position to the position shown in phantom in FIGURE 83. This is followed by a downward swinging of the toe head from the FIGURE 83 position to the FIGURES 85 and 85A position to bring the toe wipers 432 down to the appropriate level to perform its toe wiping operation. During the downward movement of the toe head 346, the yoke 490 engages the upper 1064 and causes the upper to conform snugly to the shape of the last 1063 as indicated in FIGURE 84, the side retarders 192 press the dog ears 1132 against the bottoms of the toe wipers 432 under relatively light forces, and the front retarder 168 presses the toe end portion of the upper margin against the bottoms of the toe wipers 432 in a position that is immediately to the rear of the vertex 436 of the toe wipers.

Towards the end of the downward movement of the toe head 346, the front pincers 146 is caused to release the toe end portion of the upper margin and move downwardly and rearwardly away from the downwardly travelling toe wipers 432.

In response to the forward movement of the toe head 346, the heel slide 622 together with the heel rest 732, the heel hold-down 778, the heel applicator 186, the heel wipers 894 and the heel clamp pad 920 are caused to move rearwardly until the bight 922 of the pad 920 engages the heel of the shoe assembly. This is followed by a forward movement of the pad bight 922 away from the heel of the shoe assembly and a raising of the heel head 608 together with the heel rest 732, the heel hold-down 778, the heel applicator 816, the heel wipers 894 and the heel clamp pad 920 until the heel rest 732 and the height sensing pin 738 engage the heel seat portion 1260 of the insole as indicated in FIGURES 85 and 85A. At about this time the toe applicator 60 is raised to bear against the margin of the toe portion of the insole and the heel applicator 816 is raised to bear against the margin of the heel seat portion 1260 of the insole.

Now the heel clamp pad 920 is caused to move against the heel portion of the upper and press it tightly against the last and pressurized air is admitted to the interior of the heel clamp pad to augment the holding and clamping action of the upper against the last by the pad 920. At the same time, the yoke 490 is forced against the toe and forepart portion of the shoe assembly under greater pressure than had heretofore been applied to thereby clamp this position of the shoe assembly against movement and the bumpers 536 are forced inwardly against the forepart of the upper in regions that are rearward of the yoke 490. At about this time, the heel hold-down 778 is forced against the top of the back of the last.

This is followed by the application of cement against the margin of the toe and forepart portion of the insole through the toe applicator 60 and the application of cement against the margin of the heel seat portion of the insole through the heel applicator 816. At about the same time, the side pincers 234 are caused to open to release the forepart portions of the shoe and the side pincers are caused to move downwardly of the shoe assembly so as not to interfere with the toe wipers 432 during the toe wiping operation.

The machine parts now are in the position shown in FIGURES 85 and 85A with respect to the shoe assembly, after which the heel wipers 894 move through a heel wiping stroke and the toe wipers 432 move through a toe wiping stroke.

In the heel wiping stroke, the heel wipers 894 move rearwardly and inwardly from the FIGURES 85 and 85A position to the FIGURE 86 position to wipe the heel portion of the upper margin against the insole to thereby cementitiously attach the wiped upper margin to the insole. During the heel wiping stroke, the heel applicator 816 and the heel rest 732 together with the height sensing pin 738 are lowered out of the path of the oncoming heel wipers. At the end of the heel wiping stroke, the heel hold-down 778 is forced downwardly against the shoe assembly under increased bedding pressure.

In the toe wiping stroke, the toe wipers 432 move forwardly and inwardly from the FIGURES 85 and 85A position to the FIGURE 86 position to wipe the toe and forepart portions of the upper margin against the insole and cementitiously attach the wiped upper margin to the insole. During the toe wiping stroke, the toe applicator 60 is lowered out of the path of the oncoming toe wiper 432, the bedding tool 470 is yieldably urged forwardly against the intermediate side surfaces 438 of the toe wipers, the side retarders 192 are caused to be forced upwardly under higher pressure, the upward pressure applied to the front retarder 168 is relieved, the insole rest 87 is lowered out of the path of the oncoming toe wipers 432, and the knife 488 is caused to move forwardly and cut into the pleated upper material gathered by the toe wipers. At or near the end of the toe wiping stroke, increased bedding pressure is applied by the toe hold-down 576 against the toe and forepart portion of the shoe assembly.

After the shoe assembly is maintained in the FIGURE 86 position for a predetermined time interval, the machine parts are returned to their idle position and the shoe assembly is released.

We claim:

1. In a machine having a frame and a support mounted to the frame for suporting bottom-down a shoe assembly that includes a last having an upper draped thereon, an arrangement for stretching a selected portion of the margin of the upper about the last prior to wiping said margin portion against the corresponding portion of the insole comprising: a motor mounted to the frame below the support for movement along the periphery of said selected portion of the shoe assembly; constraining means to locate the motor in a prescribed position; a gripping means mounted to said motor for heightwise movement; means for initially causing the motor to maintain the gripping means in an upper position; means for causing the gripping means to grip said upper margin portion while the gripping means is in said upper position; means for thereafter causing the motor to apply a downwardly directed force of a predetermined magnitude to the gripping means to thereby stretch said selected margin portion about the last; a handle movably mounted in the frame; a mount mounted in the frame for movement in a first path along the periphery of said shoe assembly portion; means mounting the handle to the mount for movement in a second path that is transverse to said first path; means connecting the mount to the motor to provide a connection between the handle and the motor so constructed as to move the motor together with the gripping means along the periphery of said selected portion of the shoe assembly away from said prescribed position in response to manipulation of the handle in said first path; a control for said motor operable to decrease the magnitude of the downwardly directed force applied by the motor to the gripping means; means mounting said control to the mount; and a connection between the handle and the control so constructed as to operate the control in response to the movement of the handle in said second path; whereby the gripped margin portion may be shifted along the shoe assembly periphery by first causing the motor control to diminish the magnitude of said downwardly directed force, then manipulating the handle to move the gripping means along the shoe assembly periphery, and then stretching the gripped upper margin portion about the last in its shifted position by causing the motor control to increase said downwardly directed force to said predetermined magnitude.

2. The machine as defined in claim 1 further comprising: an abutment connected to and extending away from the mount; and a ledge secured to the frame and located in intersecting relationship with the abutment; said abutment and ledge serving as the constraining means to locate the motor in said prescribed position.

3. The machine as defined in claim 2 further comprising: spring means yieldably urging the abutment away from the mount toward the ledge.

4. A pulling over machine comprising: a frame; a support mounted to the frame for supporting bottom-down a shoe assembly that comprises a last having an upper draped thereon with the toe of the shoe assembly facing rearwardly; a motor mounted to the frame on each side of the support below the support for movement in a forward-rearward path; constraining means to locate each motor in a prescribed position along said path; a gripping means mounted to each motor for heightwise movement; means for initially causing the motors to maintain each gripping means in an upper position; means for causing each gripping means to grip a forepart portion of the upper margin while the gripping means are in said upper positions; means for thereafter causing each motor to apply a downwardly directed force of a predetermined magnitude to its associated gripping means to thereby stretch the forepart portion of the upper about the last; a pair of handles movably mounted in the frame; a pair of mounts mounted in the frame for movement in a forward-rearward path; means mounting each handle to a mount for movement in a path that is transverse to said forward-rearward path; means connecting each mount to a motor to provide a connection between each handle and each motor so constructed so to move the gripping means in said forward-rearward path away from said prescribed position in response to manipulation of the handle; a control for each motor operable to decrease the magnitude of the downwardly directed force applied by each motor to its associated gripping means; means mounting a control to each mount; and a connection between each handle and its associated mount so constructed as to operate its associated control in response to the movement of the handle in said transverse path; whereby each gripped forepart upper margin portion may be shifted along the last periphery in a forward-rearward path by first causing its associated motor control to diminish the magnitude of the downwardly directed force of its associated motor, then manipulating each handle to move its associated gripping means in a forward-rearward path, and then stretching the gripped forepart portions of the upper margin about the last in their shifted positions by causing the motor controls to increase said downwardly directed forces to said predetermined magnitudes.

5. The machine as defined in claim 4 wherein each of said manually manipulable controls is operable to increase the magnitude of the downwardly directed force applied by its associated motor to its associated gripping means above said predetermined magnitude and further comprising: means so constructing the connections between each handle and each mount as to operate its associated control to decrease the magnitude of the downwardly directed force of the motor in response to the movement of the handle in a first direction along said transverse path and to operate the control to increase the magnitude of the downwardly directed force of the motor in response to the movement of the handle in a second direction along said transverse path.

6. The machine as defined in claim 4 further comprising: an abutment connected to and extending away from each mount; and a ledge secured to the frame and located in intersecting relationship with each abutment; said abutments and ledges serving as the constraining means to locate the motors in said prescribed positions.

7. The machine as defined in claim 6 further comprising: spring means yieldably urging the abutments away from the mounts toward the ledges.

8. A pulling over mechanism, for pulling over the toe and forepart portion of a shoe upper, preparatory to wiping the margin of said upper portion forwardly and inwardly against a shoe insole, comprising: a frame; a support mounted to the frame for supporting bottom-down a shoe assembly that includes a last having an upper draped thereon with the bottom of the toe and forepart portion of the shoe assembly lying in a predetermined plane; a front pincers located rearwardly of the support; means mounting the front pincers for heightwise movement in a downward and rearward direction with respect to said plane; a motor mounted to the frame on each side of the support below the support in such a manner as to permit the motor to move rearwardly and inwardly; constraining means yieldably locating each motor in a first outward and forward position; side pincers mounted to each motor for heightwise movement; means for initially maintaining the front pincers and each of the side pincers in an upper position; means for causing the front pincers to grip the toe end portion of the upper margin and the side pincers to grip the forepart portions of the upper margin; means for thereafter causing the front pincers to move downwardly and rearwardly in said direction and for causing each of the motors to apply a downwardly directed force of a predetermined magnitude to its associated side pincers to thereby stretch the toe and forepart portions of the upper about the last with the gripped forepart portions together with the motors and side pincers moving inwardly and rearwardly from said first positions to second positions; a pair of handles movably mounted in the frame; a pair of mounts mounted in the frame for movement in a forward-rearward path; means mounting each handle to a mount for movement in a path that is transverse to said forward-rearward path; means connecting each mount to a motor to provide a connection between each handle and each motor so constructed as to move the motors and side pincers together with the gripped forepart portions away from said second position in forward-rearward paths in response to manipulation of the handle; a control for each motor operable to decrease the magnitude of the downwardly directed force applied by each motor to its associated gripping means; means mounting a control to each mount; and a connection between each handle and its associated mount so constructed as to operate its associated control in response to the movement of the handle in said transverse path; whereby each gripped forepart upper margin portion may be shifted along the last periphery in a forward-rearward path by first causing its associated motor control to diminish the magnitude of the downwardly directed force of its associated motor, then manipulating each handle to move its associated side pincers in a forward-rearward path, and then stretching the gripped forepart portions of the upper margin about the last in their shifted positions by causing the motor controls to increase said downwardly directed forces to said predetermined magnitudes.

9. The machine as defined in claim 8 further comprising: means mounting the front pincers for shifting movement in a transverse plane that intersects said downward and rearward direction.

10. The machine as defined in claim 9 further comprising: means yieldably locating the front pincers in a central position in said transverse plane.

11. The machine as defined in claim 8 wherein the front pincers mounting means comprises: a housing; a front pincers retainer pivotally mounted in the housing for swinging movement in a transverse plane that intersects said downward and rearward direction; and means mounting the front pincers for heightwise movement in said downward and rearward direction in said retainer.

12. The machine as defined in claim 11 further comprising: spring means interposed between said housing and said retainer for yieldably locating the retainer in a central position in the housing.

13. The machine as defined in claim 8 wherein each of said manually manipulable controls is operable to increase the magnitude of the downwardly directed force applied by its associated motor to its associated gripping means above said predetermined magnitude and further comprising: means so constructing the connections between each handle and each mount as to operate its associated control to decrease the magnitude of the downwardly directed force of the motor in response to the movement of the handle in a first direction along said transverse path and to operate the control to increase the magnitude of the downwardly directed force of the motor in response to the movement of the handle in a second direction along said transverse path.

14. The machine as defined in claim 13 wherein the means to move the front pincers downwardly and rearwardly is operable to apply a force of a predetermined magnitude to the front pincers and further comprising: a manually manipulable control for the front pincers selectively operable to decrease or increase the magnitude of the force applied to the front pincers.

15. The machine as defined in claim 8 further comprising: an abutment connected to and extending away from each mount; a ledge secured to the frame and located in intersecting relationship with each abutment; said abutments and ledges serving as part of the constraining means to locate the motors in said forward position; a stop extending inwardly of each mount; a member mounted for movement with each motor; and means yieldably urging each member together with its associated motor inwardly against a stop to thereby form the remainder of the constraining means to locate the motors in said outward positions.

16. The machine as defined in claim 15 further comprising: spring means yieldably urging the abutments away from the mounts toward the ledges.

17. The machine as defined in claim 15 further comprising: a tube extending from each of said motors to each of said side pincers; a collar slidably mounted on each tube, which collars constitute said members; a pair of limbs extending inwardly of each stop, which limbs slidably receive their associated collars for inward-outward movement; a plate connected to and straddling the inner ends of each pair of limbs; and a spring interposed between each plate and each collar to constitute the means yieldably urging the members inwardly against the stops.

18. A pulling over mechanism comprising: a support for supporting bottom-down a shoe assembly that comprises a last having an upper draped thereon with the toe of the shoe assembly facing rearwardly; a side gripping means mounted on each side of the support for heightwise movement and for movement in a forward-rearward path; constraining means to locate each side gripping means in a prescribed position along said path; a front gripping means located rearwardly of the support; means mounting the front gripping means for heightwise movement and for shifting movement in a plane that is transverse to said forward-rearward paths; means for initially maintaining the front gripping means and each of the side gripping means in an upper position; means for causing the front gripping means to grip the toe end portion of the upper margin and the side gripping means to grip the forepart portions of the upper margin; means for thereafter causing each of said gripping means to move downwardly to stretch the toe and forepart portions of the upper about the last; and means to selectively move each of said side gripping means forwardly or rearwardly along said path to thereby shift each gripped forepart portion along the last periphery, said mounting of the front gripping means enabling the front gripping means to shift in said transverse plane pursuant to the shifting of the gripped forepart portions along the last periphery.

19. The machine as defined in claim 18 further comprising: means yieldably locating the front gripping means in a central position in said transverse plane.

20. The machine as defined in claim 18 wherein the mounting means for the front gripping means comprises: a housing; a front gripping means retainer pivotally mounted in the housing for movement in said transverse plane; and means mounting the front gripping means for heightwise movement in said retainer.

21. The machine as defined in claim 20 further comprising: spring means interposed between said housing and said retainer for yieldably locating the retainer in a central position in the housing.

22. A pulling over mechanism for pulling over the toe and forepart portion of a shoe upper preparatory to wiping the margin of said upper portion forwardly and inwardly against a shoe insole, comprising: a frame; a support mounted to the frame for supporting bottom-down a shoe assembly that includes a last having an upper draped thereon with the bottom of the toe and forepart portion of the shoe assembly lying in a predetermined plane; a front pincers located rearwardly of the support; means mounting the front pincers for heightwise movement in a downward and rearward direction with respect to said plane; a motor mounted to the frame on each side of the support below the support in such a manner as to permit the motor to move rearwardly and inwardly; a side pincers mounted to each motor for heightwise movement; a pair of mounts mounted in the frame for movement in a forward-rearward path; means connecting each mount to a motor; an abutment connected to and extending away from each mount; a ledge secured to the frame and located in intersecting relationship with each abutment; said abutments and ledges serving to yieldably constrain each motor in a forward position by the engagement of the abutments and the ledges; a stop extending inwardly of each mount; a member mounted for movement with each motor; means yieldably urging each member together with its associated motor inwardly against a stop to thereby yieldably constrain each motor in an outward position; means for initially maintaining the front pincers and each of the side pincers in an upper position; means for causing the front pincers to grip the toe end portion of the upper margin and the side pincers to grip the forepart portions of the upper margin; and means for thereafter causing the front pincers to move downwardly and rearwardly in said direction and for causing each of the motors to apply a downwardly directed force to its associated side pincers to thereby stretch the toe and forepart portions of the upper about the last with the gripped forepart portions together with the motors and side pincers moving inwardly from the positions determined by the members and stops and rearwardly from the positions determined by the abutments and ledges.

23. The machine as defined in claim 22 further comprising: a tube extending from each of said motors to each of said side pincers; a collar slidably mounted on each tube, which collars constitute said members; a pair of limbs extending inwardly of each mount and of each stop, which limbs slidably receive their associated collars for inward-outward movement; a plate connected to and straddling the inner ends of each pair of limbs; and a spring interposed between each plate and each collar to constitute the means yieldably urging the members inwardly against the stops.

24. A lasting machine for wiping a selected portion of the margin of a shoe upper against the corresponding portion of a shoe insole comprising: a frame; a support for supporting bottom-down a shoe assembly that includes a last having the insole located on its bottom and the upper draped thereon with the selected portion of the shoe assembly facing rearwardly; a head located rearwardly of the support; a first motor pivoted to the frame; a rod extending toward the head and mounted for heightwise movement in response to actuations of said first motor; a front pivot means pivotally connecting the rod to the front of the head; an arm pivoted to the frame for forward-rearward movement and extending toward the head; a back pivot means pivotally connecting the arm to the back of the head; a second motor mounted to the frame; means so connecting the second motor to the arm as to impart forward-rearward movement to the arm in response to actuations of the second motor; wiping means mounted on the head for movement in a wiping stroke from a retracted to an advanced position; means for initially maintaining the wiping means in its retracted position; means for initially actuating the first motor to apply an upwardly directed force to the rod; means for initially actuating the second motor to so locate the arm that the head is mounted on the front and rear pivot means in a rearward position relatively remote from the shoe assembly; means for thereafter actuating the second motor while maintaining the application of the upwardly directed force by the first motor to the rod to thereby force the head forwardly from its rearward position to a working position wherein the wiping means is located proximate to and above said selected portion of the insole; means for thereafter actuating the first motor to apply a downwardly directed force to the rod to thereby rock the head about the back pivot means and lower the wiping means an amount sufficient to bring the top of the wiping means to the approxmiate level of the bottom of said insole portion; means mounted to the head operative during the lowering of the wiping means to constrain said selected portion of the upper to the shape of the last; and means operative to thereafter impart a wiping stroke to the wiping means to wipe said upper margin portion against said insole portion.

25. The machine as defined in claim 24 further comprising: a wall mounted to the frame; and a bar mounted to the head, said bar being located in registry with and rearwardly of the wall when the head is in said upper and rearward position, the engagement of the bar with the wall terminating said forward movement of the head and determining the working position of the head.

26. The machine as defined in claim 24 further comprising: a block mounted to the frame; a notch in the bottom wall of the block having a front wall and a rear wall, the front wall extending further downwardly than the rear wall; and a bar mounted to the head having a diameter that is less than the distance between said front wall and said rear wall, said bar being located in registry with said front wall and out of registry with said rear wall when the head is in said upper and rearward position; whereby the engagement of the bar with the front wall terminates said forward movement of the head and determines the working position of the head and the bar moves upwardly between said front and rear walls during the rocking of the head about the back pivot means to prevent the reaction forces generated during the wiping stroke from moving the head rearwardly.

27. A lasting machine for wiping a selected portion of the margin of a shoe upper against the corresponding portion of a shoe insole comprising: a frame; a support for supporting bottom-down a shoe assembly that includes a last having the insole located on its bottom and the upper draped thereon with the selected portion of the shoe assembly facing rearwardly; a head located rearwardly of the support; a pivot means; means pivotally mounting the head to pivot means for heightwise swinging movement; wiping means mounted on the head for movement in a wiping stroke from a retracted to the advanced position; means for initially maintaining the wiping means in its retracted position; means for initially maintaining the head in a rearward position relatively remote from the shoe assembly; a block mounted to the frame; a notch in the bottom wall of the block having a front wall and a rear wall, the front wall extending further downwardly than the rear wall; a bar mounted to the head having a diameter that is less than the distance between said front wall and said rear wall, said bar being located in registry with said front wall and out of registry with said rear wall when the head is in said rearward position; means for forcing the head forwardly from its rearward position until the bar engages the front wall to thereby locate the head in a working position wherein the wiping means is located proximate to and above said selected portion of the insole; means for thereafter rocking the head about the pivot means in a direction to lower the wiping means an amount sufficient to bring the top of the wiping means to the approximate level of the bottom of said insole portion, the bar moving upwardly between said front and rear walls during said rocking of the head to prevent the reaction forces generated during a wiping stroke from moving the head rearwardly; means mounted to the head operative during the lowering of the wiping means to constrain said selected portion of the upper to the shape of the last; and means operative to thereafter impart a wiping stroke to the wiping means to wipe said upper margin portion against said insole portion.

28. A lasting apparatus comprising: a frame; a support arrangement for supporting bottom-down a shoe assembly, that comprises a last having an insole located on its bottom and an upper mounted thereon with the heel portion of the upper margin extending downwardly of the heel seat portion of the insole, in such a manner that the toe of the shoe assembly faces in a rearward direction, the heel of the shoe assembly faces in a forward direction, the fore-part portion of the shoe assembly bottom is supported on the support arrangement so as to lie in a predetermined location, and the bottom of the heel seat portion of the shoe assembly extends forwardly of said forepart portion and substantially lies in a particularly plane; a heel mount located forwardly of said support arrangement; heel wiping means mounted to the heel mount for substantially planar rearward movement in a wiping stroke to wipe said heel portion of the upper margin against the insole heel seat; and means mounting the heel mount to the frame for swinging movement about an axis that is located in the vicinity of the support arrangement and that is transverse to said forward-rearward direction to thereby adjust the position of the heel wiping means and bring its plane of wiping stroke movement into substantially parallel relationship with the plane of the bottom of the heel seat portion of the insole.

29. The apparatus as defined in claim 28 further comprising: means mounting the heel wiping means to the heel mount for heightwise movement in a direction that is at right angles to the plane of wiping stroke movement to thereby adjust the heel wiping means to a position wherein its top lies in a plane that is proximate to the plane of the insole heel seat portion.

30. The apparatus as defined in claim 28 further comprising: means mounting the heel wiping means to the heel mount for swinging movement about an axis that is tranverse to the plane of wiping stroke movement of the heel wiping means to thereby adjust the heel wiping means to a position wherein it is symmetrically disposed with respect to the heel portion of the shoe assembly.

31. The apparatus as defined in claim 28 wherein the means mounting the heel mount to the frame comprises: at least one arm pivotally mounted to the frame for swinging movement about said axis and extending downwardly and forwardly from said axis; means securing the heel mount to said arm; and drive means, mounted on the frame and operatively connected to the arm, to effect the swinging of the arm about said axis.

32. The apparatus as defined in claim 28 wherein the means mounting the heel mount to the frame comprises: at least one arm pivotally mounted to the frame for swinging movement about said axis and extending downwardly and forwardly from said axis; means securing the heel mount to said arm; a nut pivoted to said arm; a bolt threaded into the nut; means pivotally mounting the bolt to the frame; and drive means for rotating the bolt.

33. A lasting apparatus comprising: a support arrangement for supporting bottom-down a shoe assembly, that comprises a last having an insole located on its bottom and an upper mounted thereon with the heel portion of the upper margin extending downwardly of the heel seat portion of the insole in such a manner that the forepart potrion of the shoe assembly substantially lies in a predetermined location and the heel seat portion of the shoe assembly bottom extends forwardly of said forepart portion and substantially lies in a particular plane; a wiper mount located forwardly of the support arrangement; heel wiping means mounted to the wiper mount for movement in a wiping stroke from a retracted forward position to an advanced rearward position in a plane that is substantially parallel to said particular plane; a pad, mounted to the wiper mount above the wiping means, having a portion that is mounted to the wiper mount for forward-rearward movement; means for initially locating the wiper mount in a remote position wherein the wiping means is out of registry with the heel seat portion of the insole in a location that is forward of and lower than the heel seat portion of the insole; means for initially maintaining the wiping means in its retracted position; means for initially yieldably urging said pad portion rearwardly with respect to the wiper mount; means for moving the wiper mount rearwardly from said remote position, while maintaining the wiping means parallel to said particular plane, in such a path as to cause said pad portion to engage the heel end of the shoe assembly; means responsive to the engagement of said pad portion with the heel end of the shoe assembly to terminate the rearward movement of the wiper mount; means operative subsequent to the engagement of said pad portion with the heel end of the shoe assembly to move said pad portion forwardly with respect to the wiper mount to disengage the pad portion from the shoe assembly; means for thereafter raising the wiper mount, while maintaining the wiping means parallel to said particular plane, an amount sufficient to bring the wiping means into registry with the heel seat portion of the insole; and means to thereafter impart a wiping stroke to the wiping means to wipe the heel portion of the upper margin against the heel seat portion of the insole.

34. The apparatus as defined in claim 33 further comprising: a motor mounted to said wiper mount; a rod extending from the motor that is actuable to move in forward-rearward directions in response to actuations of the motor; a connection between the rod and said pad portion providing said mounting of said pad portion to the mount; an actuator connected to the rod for movement therewith; means for initially causing the motor to urge the rod rearwardly to provide said initial yieldable rearward urging of said pad portion, said rod being pushed forwardly with respect to the motor in response to the engagement of the pad portion with the heel end of the shoe assembly; a motor control member so located as to be actuated by the actuator during said forward pushing movement of the rod; means responsive to the actuation of the motor control member by the actuator to effect the termination of said rearward movement of the wiper mount; and means to cause the motor to move the rod forwardly to effect the disengagement of the pad portion from the shoe assembly.

35. The apparatus as defined in claim 33 further comprising: means, operative subsequent to the completion of the rise of the wiper mount and prior to the imparting of the wiping stroke, to move said pad portion rearwardly to thereby cause said pad portion to press the heel portion of the upper against the last.

36. The apparatus as defined in claim 34 further comprising: means, operative subsequent to the completion of the rise of the wiper mount and prior to the imparting of the wiping stroke, to cause the motor to move the rod rearwardly to thereby cause said pad portion to press the heel portion of the upper against the last.

37. A lasting apparatus comprising: a support arrangement for supporting bottom-down a shoe assembly, that comprises a last having an insole located on its bottom and an upper mounted thereon with the heel portion of the upper margin extending downwardly of the heel seat portion of the insole, in such a manner that the forepart portion of the shoe assembly substantially lies in a predetermined location and the heel seat portion of the shoe assembly bottom extends forwardly of said forepart portion and substantially lies in a particular plane; a wiper mount located forwardly of the support arrangement; heel wiping means mounted to the wiper mount for movement in a wiping stroke from a retracted forward position to an advanced rearward position in a plane that is substantially parallel to said particular plane; a heel clamp pad, located above the wiping means, having a bight and a pair of legs extending rearwardly and divergently from the bight; means mounting the pad bight to the wiper mount that includes a pad bight connection mounted for forward-rearward movement; means mounting each pad leg to the wiper mount that includes a pad leg connection mounted for inward-outward movement; means for initially locating the wiper mount in a remote position wherein the wiping means is out of registry with the heel seat portion of the insole in a location that is forward of and lower than the heel seat portion of the insole; means for initially maintaining the wiping means in its retracted position; means for initially yieldably urging the pad bight connection rearwardly with respect to the wiper mount to thereby yieldably urge the pad bight rearwardly; means for initially forcing the pad leg connections outwardly with respect to the wiper mount to thereby force the pad legs to outer positions; means for moving the wiper mount rearwardly from said remote position, while maintaining the wiping means parallel to said particular plane, in such a path as to cause the pad bight to engage the heel end of the shoe assembly; means responsive to the engagement of the pad bight with the heel end of the shoe assembly to terminate the rearward movement of the wiper mount; means operative subsequent to the engagement of the pad bight with the heel end of the shoe assembly to move the pad bight connection forwardly to thereby move the pad bight forwardly and out of engagement with the shoe assembly, the means mounting the pad legs to the wiper mount being so constructed and arranged as to maintain the pad legs in their outer positions during the forward movement of the pad bight; means for thereafter raising the wiper mount, while maintaining the wiping means parallel to said particular plane, an amount sufficient to bring the wiping means into registry with the heel seat portion of the insole; means for thereafter moving the pad bight connection rearwardly and the pad leg connections inwardly to thereby force the pad bight rearwardly and the pad legs inwardly to cause the pad to press the heel portion of the upper against the last; and means to thereafter impart a wiping stroke to the wiping means to wipe the heel portion of the upper margin against the heel seat portion of the insole.

38. The machine as defined in claim 37 further comprising: a pad bight motor mounted to said wiper mount; a rod extending from mid pad bight motor that is actuable to move in forward-rearward directions in response to actuations of the pad bight motor, said pad bight connection being interposed between and connected to the rod and the pad bight; an actuator connected to the rod for movement therewith; means for initially causing the pad bight motor to urge the rod rearwardly to provide said initial yieldable rearward urging of the pad bight, said rod being pushed forwardly with respect to the pad bight motor in response to the engagement of the pad bight with the heel end of the shoe assembly; a motor control member so located as to be actuated by the actuator during said forward pushing movement of the rod; means responsive to the actuation of the motor control member by the actuator to effect the termination of said rearward movement of the wiper mount, means, operative subsequent to the engagement of the pad bight with the heel end of the shoe assembly, to cause the pad bight motor to move the rod forwardly to thereby effect the disengagement of the pad bight from the shoe assembly; and means, operative subsequent to the completion of the rise of the wiper mount, to cause the pad bight motor to move the rod rearwardly to thereby effect the pressing of the pad bight against the last.

39. The machine as defined in claim 38 further comprising: a pair of pad leg motors mounted to said wiper mount; a cam located exteriorly of each pad leg; means connecting each cam to a pad leg motor for movement between an outer cam position and an inner cam position; a slot in each cam so constructed that its axis is parallel to the axis of forward-rearward movement of the rod at least when the cams are in their outer cam positions; a linkage connecting the rod and each pad leg connection; a member in each linkage that is slidably received in its associated slot, said linkages forming a part of said means mounting the pad legs to the wiper mount; means for initially causing each pad leg motor to force its associated cam to its outer cam position to thereby effect the initial forcing of the pad legs to their outer positions, said members moving forwardly in said slots during the forward movement of the pad bight to maintain the pad legs in their outer positions during the forward movement of the pad bight; and means, operative subsequent to the completion of the rise of the wiper mount, to cause the pad leg motors to move the cams inwardly from said outer cam positions toward said inner cam positions to thereby effect the pressing of the pad legs against the last.

40. The machine as defined in claim 37 further comprising: a pad bight motor mounted to said wiper mount; a rod extending from said pad bight motor that is actuable to move in forward-rearward directions in response to actuations of the pad bight motor, said pad bight connection being interposed between and connected to the rod and the pad bight; a pair of pad leg motors mounted to said wiper mount; a cam located exteriorly of each pad leg; means connecting each cam to a pad leg motor for movement between an outer cam position and an inner cam position; a slot in each cam so constructed that its axis is parallel to the axis of forward-rearward movement of the rod at least when the cams are in their outer cam positions; a linkage connecting the rod and each pad leg connection; a member in each linkage that is slidably received in its associated slot, said linkages forming a part of said means mounting the pad legs to the wiper mount; means for initially causing the pad bight motor to urge the rod rearwardly to provide said initial rearward urging of the pad bight; means for initially causing each pad leg motor to force its associated cam to its outer cam position to thereby effect the initial forcing of the pad legs to their outer positions; means, operative subsequent to the engagement of the pad bight with the heel end of the shoe assembly, to cause the pad bight motor to move the rod forwardly to thereby effect the disengagement of the pad bight from the shoe assembly, said members moving forwardly in said slots during the forward movement of the pad bight to maintain the pad legs in their outer positions during the forward movement of the pad bight; and means, operative subsequent to the completion of the rise of the wiper mount, to cause the pad bight motor to move the rod rearwardly and to cause the pad leg motors to move the cams inwardly to thereby effect the pressing by the pad of the heel portion of the upper against the last.

41. A lasting machine, for wiping a selected portion of the margin of an upper that is mounted on a last against the corresponding portion of an insole located on the last bottom, comprising: a pair of wipers that have front side surfaces diverging forwardly from a vertex and confronting rear side surfaces located rearwardly of the vertex; a bedding tool located rearwardly of the confronting side surfaces; wiper drive means operative to impart a wiping stroke to the wipers wherein the wipers move forwardly and the wipers swing about the vertex in such a manner as to cause the front side surfaces to approach each other and the rear side surfaces to separate; yieldable drive means operative to move the bedding tool forwardly under a yieldable force; and means to actuate the yieldable drive means during the wiping stroke to cause the bedding tool to bear against the separating rear side surfaces and fill at least part of the gap created by the separation of the rear side surafces.

42. The machine as defined in claim 41 wherein the yieldable drive means comprises: means to move the bedding tool under the force of pressurized air.

43. The machine as defined in claim 41 wherein the last is supported bottom down and wherein the bedding tool is so mounted that its upper surface is substantially coplanar with the upper surfaces of the wipers, and further comprising: a knife, mounted for forward movement below the bedding tool, above the wiper bottoms and between said wiper side surfaces, that has a forwardly directed cutting edge that is initially located rearwardly of the vertex; and knife drive means operative, during the wiping stroke, to move the knife forwardly and project the cutting edge forwardly of the vertex to cut into the upper stock gathered during the inward movement of the front side surfaces.

44. A lasting machine, for wiping a selected portion of the margin of an upper that is mounted on a last against the corresponding portion of an insole located on the last bottom, comprising: a pair of wipers that have front side surfaces diverging forwardly from a vertex; means mounting the wipers for movement in a wiping stroke from a retracted position to an advanced position wherein the wipers are moved forwardly and the front side surfaces are caused to swing toward each other about the vertex; a knife located between the wipers having a forwardly directed cutting edge that is located rearwardly of the vertex when the wipers are in their retracted position; wiper drive means operative to impart a wiping stroke to the wipers; knife drive means actuable to move the knife forwardly during the wiping stroke at a greater speed than the component of forward movement of the wipers whereby the knife is projected forwardly of the vertex during the wiping stroke to cut into the upper material gathered by said front side surfaces during the wiping stroke; and means to adjust the speed of forward movement of the knife in relation to the component of forward movement of the wipers.

45. The machine as defined in claim 44 further comprising: control means, operative after the wipers have commenced their wiping stroke, to actuate the knife drive means; and means to adjust the control means so as to adjust the time, after the commencement of the wiping stroke, that the knife drive means is actuated.

46. The machine as defined in claim 45 wherein said control means and the means to adjust the control means comprises: a slide forming a part of the wiper drive means; a first control member secured to the slide; a second control member mounted in position to be intersected by the first control member during the wiping stroke; means responsive to the intersection of the two control members to actuate the knife drive means; and means to adjust the spacing between the two control members in the retracted position of the wipers.

47. A lasting machine, for wiping a selected portion of the margin of an upper that is mounted on a last against the corresponding portion of an insole located on the last bottom, comprising: a pair of wipers that have front side surfaces diverging forwardly from a vertex; means mounting the wipers for movement in a wiping stroke from a retracted position to an advanced position wherein the wipers are moved forwardly and the front side surfaces are caused to swing toward each other about the vertex; a knife located between the wipers having a forwardly directed cutting edge that is located rearwardly of the vertex when the wipers are in their retracted position; wiper drive means operative to impart a wiping stroke to the wipers; knife drive means actuable to move the knife forwardly during the wiping stroke at a greater speed than the component of forward movement of the wipers whereby the knife is projected forwardly of the vertex during the wiping stroke to cut into the upper material gathered by said front side surfaces during the wiping stroke; control means, operative after the wipers have commenced their wiping stroke, to actuate the knife drive means; and means to adjust the control means so as to adjust the time, after the commencement of the wiping stroke, that the knife drive means is actuated.

48. The machine as defined in claim 47 wherein said control means and the means to adjust the control means comprises: a slide forming a part of the wiper drive means; a first control member secured to the slide; a second control member mounted in position to be intersected by the first control member during the wiping stroke; means responsive to the intersection of the two control members to actuate the knife drive means; and means to adjust the spacing between the two control members in the retracted position of the wipers.

49. An apparatus for locating a work treating instrumentality in a desired position with respect to two successively introduced workpieces comprising: a support for initially supporting a first workpiece in a desired location; a work engageable member mounted for movement between a starting position that is relatively remote from the workpiece that is supported on the support and a terminal position in a path that is in intersecting relationship with the workpiece that is supported on the support; means for initially maintaining said work engageable member in said starting position; means for moving the work engageable member in said path towards said first workpiece; means responsive to the engagement of the work engageable member with said first workpiece to terminate said movement with the work engageable member in a working position; means to thereafter retract the work engageable member from said working position towards said starting position a prescribed distance that is less than the distance between said working position and said starting position to thereby locate the work engageable member in an intermediate position wherein the first workpiece may be removed from the support and a second workpiece may be supported on the support; means for thereafter moving the work engageable member in said path from said intermediate position toward said second workpiece; means responsive to the engagement of the work engageable member with said second workpiece to terminate the work engageable member movement; and means to thereafter retract the work engageable member away from said second workpiece through said prescribed distance.

50. The apparatus as defined in claim 49 further comprising: optionally operable means for retracting the work engageable member from said intermediate position to said starting position prior to moving the work engageable member in said path toward said second workpiece.

51. An apparatus for locating a work treating instrumentality in a desired location with respect to two successively introduced workpieces comprising: a support for initially supporting a first workpiece in a desired location; a first frame part; a second frame part; a work engageable member mounted to the second frame part; means mounting the second frame part to the first frame part for such movement as to enable the work engageable member to move between a retracted starting position that is relatively remote from the workpiece that is supported on the support and an advanced terminal position in a path that is in intersecting relationship with the workpiece that is supported on the support; a motor connected to the second frame part for effecting said movement; an actuating member rigidly connected to the second frame part for movement therewith; a motor control member, in alignment with the actuating member, that is located on the starting position side of the actuating member; means so connecting the motor control member to the first and second frame parts as to yieldably urge the motor control member under a resilient force a prescribed distance away from the actuating member and to enable the motor control member to move in unison with the actuating member in response to operation of said motor; a braking arrangement associated with the first and second frame parts so constructed and arranged as to be actuable to lock the motor control member against movement; means for initially causing the motor to maintain the work engageable member in said starting position; means for causing the motor to move the second frame part and the work engageable member in said path towards said first workipece with the motor control member remaining said prescribed distance away from said actuating member; means responsive to the engagement of the work engageable member with said first workpiece to terminate said movement with the work engageable member in a working position; means to thereafter cause the braking arrangement to lock the motor control member against movement and to cause the motor to retract the second frame part and the work engageable member from said working position with the actuating member moving towards the motor control member against said spring force; means responsive to the engagement of the actuating member with the motor control member, when the work engageable member has been retracted said prescribed distance, to cause the motor to terminate its retractive movement of the second frame part and the work engageable member to thereby locate the work engageable member in an intermediate position between said starting position and said working position wherein the first workpiece may be removed from the support and a second workpiece may be supported on the support; means for thereafter causing the braking arrangement to release the motor control member for movement with the actuating member and for thereafter causing the motor to advance the second frame part and the work engageable member in said path from said intermediate position toward said second workpiece with the motor control member following the actuating member by said prescribed distance; means responsive to the engagement of the work engageable member with said second workpiece to terminate the advance of the second frame part and the work engageable member; means to thereafter cause the braking arrangement to lock the motor control member against movement and to cause the motor to retract the second frame part and the work engageable member away from said second workpiece with the actuating member moving towards the motor control member against said spring force; and means responsive to the engagement of the actuating member with the motor control member, when the work engageable member has been retracted said prescribed distance from the second workpiece, to cause the motor to terminate the retractive movement of the second frame part and the work engageable member.

52. The aparatus as defined in claim 51 further comprising: means, optionally operable when the work engageable member is in said intermediate position, for causing the braking arrangement to release the motor control member to cause the actuating member to be moved out of engagement with the motor control member under said resilient force; and means responsive to the disengagement of the actuating member and the motor control member to cause said motor to retract the second frame part and the work engageable member from said intermediate position to said starting position prior to advancing the work engageable member in said path toward said second workpiece.

53. The apparatus as defined in claim 51 wherein the actuating member, the motor control member, the braking arrangement and the means connecting the motor control member to the first and second frame parts comprise: a shaft rigidly mounted to the first frame part; a front hanger and a back hanger secured in spaced relation to the second frame part and slidably mounted on the shaft; a bracket slidably mounted on the shaft between the hangers; a brake mounted to the bracket between the bracket and the front hanger; means for effecting movement of the brake into and out of engagement with the shaft; means mounting the actuating member to the back hanger; means mounting the motor control member to the bracket; and a spring interposed between the back hanger and the bracket for yieldably urging the bracket and the brake towards the front hanger.

54. The apparatus as defined in claim 51 wherein the actuating member, the motor control member, the braking arrangement and the means connecting the motor control member to the first and second frame parts comprise: a shaft slidably mounted to the first frame part; an upper limb and a lower limb secured to the shaft in spaced relation; a bar secured to the second frame part; a stud secured to the bar and extending through the upper limb; a head on the stud, that serves as the actuating member, located below the upper limb; a spring interposed between the bar and the upper limb for yieldably urging the upper limb against the head; means mounting the motor control member to the lower limb; a brake mounted to the first frame part; and means for effecting movement of the brake into and out of engagement with the shaft.

References Cited
UNITED STATES PATENTS

| | | | |
|---|---|---|---|
| 3,087,176 | 4/1963 | Deschenes | 12—12.5 |
| 3,164,852 | 1/1965 | Bowler et al. | 12—10.5 |
| 3,266,072 | 8/1966 | Schindler | 12—7.1 |
| 3,343,191 | 9/1967 | Harriman | 12—7.1 |
| 3,039,121 | 6/1962 | Weinschenk | 12—145 X |
| 3,220,034 | 11/1965 | Lottler et al. | 12—12.4 X |
| 3,241,517 | 3/1966 | Hooper. | |
| 3,251,081 | 5/1966 | Springer | 12—10.1 |

PATRICK D. LAWSON, Primary Examiner

U.S. Cl. X.R.

12—12.4